US012637527B2

(12) United States Patent
Nakano et al.

(10) Patent No.: US 12,637,527 B2
(45) Date of Patent: May 26, 2026

(54) METHOD OF PRODUCING FLUOROPOLYMER

(71) Applicant: DAIKIN INDUSTRIES, LTD., Osaka (JP)

(72) Inventors: Marina Nakano, Osaka (JP); Masahiro Higashi, Osaka (JP); Sumi Ishihara, Osaka (JP); Yosuke Kishikawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 869 days.

(21) Appl. No.: 17/849,364

(22) Filed: Jun. 24, 2022

(65) Prior Publication Data

US 2022/0348699 A1 Nov. 3, 2022

Related U.S. Application Data

(63) Continuation of application No. PCT/JP2020/047090, filed on Dec. 17, 2020.

(30) Foreign Application Priority Data

Dec. 25, 2019 (JP) ................................ 2019-235053

(51) Int. Cl.

| | |
|---|---|
| ***C08F 14/26*** | (2006.01) |
| ***C08F 2/26*** | (2006.01) |
| ***C08F 2/38*** | (2006.01) |
| ***C08F 214/26*** | (2006.01) |

(52) U.S. Cl.

CPC ................ *C08F 14/26* (2013.01); *C08F 2/26* (2013.01); *C08F 2/38* (2013.01)

(58) Field of Classification Search

None

See application file for complete search history.

(56) References Cited

U.S. PATENT DOCUMENTS

| | | | | |
|---|---|---|---|---|
| 6,777,513 | B1 | 8/2004 | Destarac et al. | |
| 7,317,050 | B2 | 1/2008 | Destarac et al. | |
| 9,447,256 | B2 * | 9/2016 | Amin-Sanayei | .......... C08F 2/26 |
| 2017/0081447 | A1 | 3/2017 | Dossi et al. | |
| 2022/0049029 | A1 | 2/2022 | Nakano et al. | |

FOREIGN PATENT DOCUMENTS

| | | | | |
|---|---|---|---|---|
| CN | 103254344 | A | 8/2013 | |
| JP | 2003-501528 | A | 1/2003 | |
| JP | 2017-515948 | A | 6/2017 | |
| WO | 2015/173194 | A1 | 11/2015 | |
| WO | WO-2015173193 | A1 * | 11/2015 | .............. C08F 14/22 |
| WO | 2020/226178 | A1 | 11/2020 | |

OTHER PUBLICATIONS

Gerard Puts, et al., "Conventional and RAFT Copolymerization of Tetrafluoroethylene with Isobutyl Vinyl Ether", Macromolecules, 2018, vol. 51, pp. 6724-6739 (16 pages).

Extended European Search Report dated Dec. 21, 2023 in Application No. 20907203.2.

International Preliminary Report on Patentability dated Jun. 28, 2022 with a Translation of the Written Opinion of the International Searching Authority in Application No. PCT/JP2020/047090.

International Search Report of PCT/JP2020/047090 dated Mar. 2, 2021 [PCT/ISA/210].

* cited by examiner

*Primary Examiner* — Catherine S Branch

(74) *Attorney, Agent, or Firm* — Sughrue Mion, PLLC

(57) ABSTRACT

Provided is a method for producing a fluoropolymer, the method including a polymerizing step of polymerizing tetrafluoroethylene in an aqueous medium in the presence of an initiator, a chain transfer agent, and a surfactant to provide a fluoropolymer containing more than 80 mol % of a polymerized unit based on tetrafluoroethylene, the chain transfer agent including at least one selected from the group consisting of a dithioester compound, a dithiocarbamate compound, a trithiocarbonate compound, and a xanthate compound. Also provided is a fluoropolymer represented by the formula Af-CRP defined in the description.

8 Claims, No Drawings

METHOD OF PRODUCING FLUOROPOLYMER

CROSS REFERENCE TO RELATED APPLICATIONS

This application is a Rule 53(b) Continuation of PCT Application No. PCT/JP2020/047090 filed on Dec. 17, 2020, claiming priority based on Japanese Patent Application No. 2019-235053 filed on Dec. 25, 2019, the respective disclosures of which are incorporated herein by reference in their entireties.

TECHNICAL FIELD

The disclosure relates to methods for producing fluoropolymers.

BACKGROUND ART

Emulsion polymerization and solution polymerization have been use for producing fluoropolymers.

For example, Patent Literature 1 discloses polymerization of tetrafluoroethylene, vinylidene fluoride, and hexafluoropropylene in the presence of O-ethyl-S-(1-methoxycarbonylethyl)dithiocarbonate as a chain transfer agent and a microemulsion obtained in advance by mixing a perfluoropolyoxyalkylene having acidic end groups of formula: $CF_2ClO(CF_2—CF(CF_3)O)_n(CF_2O)_mCF_2COOH$ (where n/m=10) having an average molecular weight of 600 and perfluoropolyether of formula: $CF_3O(CF_2CF(CF_3)O)_n(CF_2O)_mCF_3$ (where n/m=20) having an average molecular weight of 450.

Patent Literature 2 discloses a method for producing a polymer, the method including contacting at least one ethylenically unsaturated monomer, at least one free radical source, and a compound having a specific structure. Patent Literature 3 discloses a method for producing a polymer, the method including preparation of miniemulsion containing at least one control agent selected from xanthates, dithiocarbamates, thioetherthiones, and phosphorus-containing xanthates, and reaction of the miniemulsion in the presence of a free-radical source.

CITATION LIST

Patent Literature

Patent Literature 1: JP 2017-515948 T
Patent Literature 2: JP 2003-501528 T
Patent Literature 3: U.S. Pat. No. 7,317,050

SUMMARY

The disclosure relates to a method for producing a fluoropolymer (hereinafter, also referred to as "a first production method of the disclosure"; the production method of the disclosure as used herein means the "first production method of the disclosure"), the method including:

a polymerizing step of polymerizing tetrafluoroethylene in an aqueous medium in the presence of an initiator, a chain transfer agent, and a surfactant to provide a fluoropolymer containing more than 80 mol % of a polymerized unit based on tetrafluoroethylene, the chain transfer agent including at least one selected from the group consisting of a dithioester compound, a dithiocarbamate compound, a trithiocarbonate compound, and a xanthate compound.

Advantageous Effects

The disclosure can provide novel methods for producing fluoropolymers.

DESCRIPTION OF EMBODIMENTS

Before the specific description of the disclosure, some terms used in the description are defined or described below.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means an ability of a polymer to be processed in a molten state using a conventional processing device such as an extruder or an injection molding machine. Thus, a melt-fabricable fluororesin usually has a melt flow rate of 0.01 to 500 g/10 min measured by a measurement method to be described later.

The perfluoromonomer as used herein means a monomer free from a carbon-hydrogen bond in the molecule. The perfluoromonomer may be a monomer which contains carbon atoms and fluorine atoms and in which some fluorine atoms binding to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer giving a crosslinking site.

The monomer giving a crosslinking site is a monomer (cure-site monomer) containing a crosslinkable group that can give a fluoropolymer a crosslinking site to form a crosslink with the use of a curing agent.

The amounts of the respective monomers constituting the fluoropolymer as used herein can be calculated by any appropriate combination of NMR, FT-IR, elemental analysis, and X-ray fluorescence analysis in accordance with the types of the monomers.

The term "organic group" as used herein means a group having a carbon number of 1 or greater or a group formed by removing one hydrogen atom from an organic compound.

Examples of the "organic group" include an alkyl group optionally containing one or more substituents, an alkenyl group optionally containing one or more substituents, an alkynyl group optionally containing one or more substituents, a cycloalkyl group optionally containing one or more substituents, a cycloalkenyl group optionally containing one or more substituents, a cycloalkadienyl group optionally containing one or more substituents, an aryl group optionally containing one or more substituents, an aralkyl group optionally containing one or more substituents, a non-aromatic heterocyclic group optionally containing one or more substituents, a heteroaryl group optionally containing one or more substituents, a cyano group,
a formyl group,
RaO—,
RaCO—,
$RaSO_2$—,
RaCOO—,
RaNRaCO—,
RaCONRa—,
RaOCO—,
$RaOSO_2$—, and
$RaNRbSO_2$— wherein Ras are each independently an alkyl group optionally containing one or more substituents,
an alkenyl group optionally containing one or more substituents,
an alkynyl group optionally containing one or more substituents,
a cycloalkyl group optionally containing one or more substituents,
a cycloalkenyl group optionally containing one or more substituents,
a cycloalkadienyl group optionally containing one or more substituents,
an aryl group optionally containing one or more substituents,
an aralkyl group optionally containing one or more substituents,
a non-aromatic heterocyclic group optionally containing one or more substituents, or
a heteroaryl group optionally containing one or more substituents, and
Rbs are each independently H or an alkyl group optionally containing one or more substituents.

The organic group is preferably an alkyl group optionally containing one or more substituents.

The "substituent" as used herein means a group that can substitute for an atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoylamino group, a halogen atom, a sulfamoylcarbamoyl group, a carbamoylsulfamoyl group, a dialiphatic oxyphosphinyl group, and a diaromatic oxyphosphinyl group.

The aliphatic group may be either saturated or unsaturated, and may contain a group such as a hydroxy group, an aliphatic oxy group, a carbamoyl group, an aliphatic oxycarbonyl group, an aliphatic thio group, an amino group, an aliphatic amino group, an acylamino group, or a carbamoylamino group. Examples of the aliphatic group include alkyl groups having a total carbon number of 1 to 8, preferably 1 to 4, such as a methyl group, an ethyl group, a vinyl group, a cyclohexyl group, and a carbamoylmethyl group. In these groups, any or all of the hydrogen atoms bonded to any carbon atom may be replaced by fluorine atoms.

The aromatic group may contain, for example, a nitro group, a halogen atom, an aliphatic oxy group, a carbamoyl group, an aliphatic oxycarbonyl group, an aliphatic thio group, an amino group, an aliphatic amino group, an acylamino group, or a carbamoylamino group. Examples of the aromatic group include aryl groups having a total carbon number of 6 to 12, preferably having a total carbon number of 6 to 10, such as a phenyl group, a 4-nitrophenyl group, a 4-acetylaminophenyl group, and a 4-methanesulfonylphenyl group.

The heterocyclic group may contain, for example, a halogen atom, a hydroxy group, an aliphatic oxy group, a carbamoyl group, an aliphatic oxycarbonyl group, an aliphatic thio group, an amino group, an aliphatic amino group, an acylamino group, or a carbamoylamino group. Examples of the heterocyclic group include 5- to 6-membered hetero rings having a total carbon number of 2 to 12, preferably 2 to 10, such as a 2-tetrahydrofuryl group and a 2-pyrimidyl group.

The acyl group may contain, for example, an aliphatic carbonyl group, an aryl carbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, or a carbamoylamino group. Examples of the acyl group include acyl groups having a total carbon number of 2 to 8, preferably 2 to 4, such as an acetyl group, a propanoyl group, a benzoyl group, and a 3-pyridinecarbonyl group.

The acylamino group may contain a group such as an aliphatic group, an aromatic group, or a heterocyclic group, and may contain, for example, an acetylamino group, a benzoylamino group, a 2-pyridinecarbonylamino group, or a propanoylamino group. Examples of the acylamino group include an acylamino group having a total carbon number of 2 to 12, preferably 2 to 8, and an alkylcarbonylamino group having a total carbon number of 2 to 8, such as an acetylamino group, a benzoylamino group, a 2-pyridinecarbonylamino group, or a propanoylamino group.

The aliphatic oxycarbonyl group may be either saturated or unsaturated, and may contain a group such as a hydroxy group, an aliphatic oxy group, a carbamoyl group, an aliphatic oxycarbonyl group, an aliphatic thio group, an amino group, an aliphatic amino group, an acylamino group, or a carbamoylamino group. Examples of the aliphatic oxycarbonyl group include alkoxycarbonyl groups having a total carbon number of 2 to 8, preferably 2 to 4, such as a methoxycarbonyl group, an ethoxycarbonyl group, and a (t)-butoxycarbonyl group.

The carbamoyl group may contain a group such as an aliphatic group, an aromatic group, or a heterocyclic group. Examples of the carbamoyl group include an unsubstituted carbamoyl group and an alkylcarbamoyl group having a total carbon number of 2 to 9. Preferred are an unsubstituted carbamoyl group and an alkylcarbamoyl group having a total carbon number of 2 to 5, such as a N-methylcarbamoyl group, a N,N-dimethylcarbamoyl group, and a N-phenylcarbamoyl group.

The aliphatic sulfonyl group may be either saturated or unsaturated, and may contain a group such as a hydroxy group, an aromatic group, an aliphatic oxy group, a carbamoyl group, an aliphatic oxycarbonyl group, an aliphatic thio group, an amino group, an aliphatic amino group, an acylamino group, or a carbamoylamino group. Examples of the aliphatic sulfonyl group include alkylsulfonyl groups having a total carbon number of 1 to 6, preferably a total carbon number of 1 to 4, such as a methanesulfonyl group.

The aromatic sulfonyl group may contain a group such as a hydroxy group, an aliphatic group, an aliphatic oxy group, a carbamoyl group, an aliphatic oxycarbonyl group, an aliphatic thio group, an amino group, an aliphatic amino group, an acylamino group, or a carbamoylamino group. Examples of the aromatic sulfonyl group include aryl sulfonyl groups having a total carbon number of 6 to 10, such as a benzenesulfonyl group.

The amino group may contain a group such as an aliphatic group, an aromatic group, or a heterocyclic group.

The acylamino group may contain a group such as an acetylamino group, a benzoylamino group, a 2-pyridinecarbonylamino group, or a propanoylamino group. Examples of the acylamino group include acylamino groups having a total carbon number of 2 to 12, preferably a total carbon number of 2 to 8. More preferred are an alkylcarbonylamino group having a total carbon number of 2 to 8, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, and a 2-pyridinesulfonamide group.

The sulfamoyl group may contain a group such as an aliphatic group, an aromatic group, or a heterocyclic group. Examples of the sulfamoyl group include a sulfamoyl group, an alkylsulfamoyl group having a total carbon number of 1 to 9, a dialkylsulfamoyl group having a total carbon number of 2 to 10, an aryl sulfamoyl group having a total carbon number of 7 to 13, and a heterocyclic sulfamoyl group having a total carbon number of 2 to 12. Preferred are a sulfamoyl group, an alkylsulfamoyl group having a total carbon number of 1 to 7, a dialkylsulfamoyl group having a total carbon number of 3 to 6, an aryl sulfamoyl group having a total carbon number of 6 to 11, and a heterocyclic sulfamoyl group having a total carbon number of 2 to 10, such as a sulfamoyl group, a methylsulfamoyl group, a N,N-dimethylsulfamoyl group, a phenylsulfamoyl group, and a 4-pyridinesulfamoyl group.

The aliphatic oxy group may be either saturated or unsaturated, and may contain a group such as a methoxy group, an ethoxy group, an i-propyloxy group, a cyclohexyloxy group, or a methoxyethoxy group. Examples of the aliphatic oxy group include alkoxy groups having a total carbon number of 1 to 8, preferably 1 to 6, such as a methoxy group, an ethoxy group, an i-propyloxy group, a cyclohexyloxy group, and a methoxyethoxy group.

The aromatic amino group and the heterocyclic amino group may each contain an aliphatic group, an aliphatic oxy group, a halogen atom, a carbamoyl group, a heterocyclic group fused with the aryl group, or an aliphatic oxycarbonyl group, preferably contain an aliphatic group having a total carbon number of 1 to 4, an aliphatic oxy group having a total carbon number of 1 to 4, a halogen atom, a carbamoyl group having a total carbon number of 1 to 4, a nitro group, or an aliphatic oxycarbonyl group having a total carbon number of 2 to 4.

The aliphatic thio group may be either saturated or unsaturated. Exampled thereof include alkylthio groups having a total carbon number of 1 to 8, more preferably a total carbon number of 1 to 6, such as a methylthio group, an ethylthio group, a carbamoylmethylthio group, and a t-butylthio group.

The carbamoylamino group may contain a group such as an aliphatic group, an aryl group, or a heterocyclic group. Examples of the carbamoylamino group include a carbamoylamino group, an alkylcarbamoylamino group having a total carbon number of 2 to 9, a dialkylcarbamoylamino group having a total carbon number of 3 to 10, an aryl carbamoylamino group having a total carbon number of 7 to 13, and a heterocyclic carbamoylamino group having a total carbon number of 3 to 12. Preferred are a carbamoylamino group, an alkylcarbamoylamino group having a total carbon number of 2 to 7, a dialkylcarbamoylamino group having a total carbon number of 3 to 6, an aryl carbamoylamino group having a total carbon number of 7 to 11, and a heterocyclic carbamoylamino group having a total carbon number of 3 to 10, such as a carbamoylamino group, a methylcarbamoylamino group, a N,N-dimethylcarbamoylamino group, a phenylcarbamoylamino group, and a 4-pyridinecarbamoylamino group.

Herein, the numerical ranges expressed by the endpoints each include all numbers within the range (e.g., the range of 1 to 10 includes 1.4, 1.9, 2.33, 5.75, 9.98, and the like).

The phrase "at least one" as used herein includes all numbers equal to or greater than 1 (e.g., at least 2, at least 4, at least 6, at least 8, at least 10, at least 25, at least 50, at least 100, and the like).

The disclosure will be specifically described hereinbelow.

The production method of the disclosure includes a polymerizing step of polymerizing tetrafluoroethylene (TFE) in an aqueous medium in the presence of an initiator, a chain transfer agent, and a surfactant to provide a fluoropolymer containing more than 80 mol % of a polymerized unit based on TFE, the chain transfer agent including at least one selected from the group consisting of a dithioester compound, a dithiocarbamate compound, a trithiocarbonate compound, and a xanthate compound.

The production method of the disclosure, which includes polymerizing TFE in the presence of an initiator, a specific chain transfer agent, and a surfactant, enables polymerization even with a high TFE proportion, i.e., more than 80 mol % of a polymerized unit based on TFE. The polymerizing is so-called emulsion polymerization.

The production method of the disclosure having the above feature can achieve efficient production of a fluoropolymer even containing more than 80 mol % of a polymerized unit based on TFE.

When fluoropolymers with a large number of polymerized units based on TFE are produced by polymerization, no chain transfer agent is usually used because it may decrease the molecular weight. The production method of the disclosure is completed based on the finding that polymerization proceeds surprisingly efficiently even when fluoropolymers with a large number of polymerized units based on TFE are produced by polymerization.

The chain transfer agent includes at least one selected from the group consisting of a dithioester compound, a dithiocarbamate compound, a trithiocarbonate compound, and a xanthate compound. The chain transfer agent preferably includes at least one selected from the group consisting of a dithiocarbamate compound and a xanthate compound, with a xanthate compound being more preferred.

Specific examples of the chain transfer agent include a dithioester represented by the formula (c1-1), a trithiocarbonate represented by the formula (c1-2) or (c1-2'), a dithiocarbamate represented by the formula (c1-3), and a xanthate represented by the formula (c1-4).

[Chem. 1]

(c1-1)

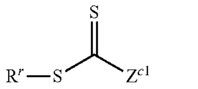

(c1-2)

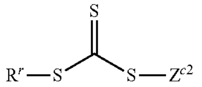

(c1-2')

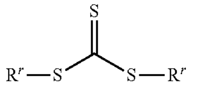

(c1-3)

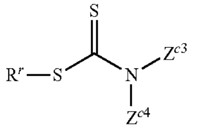

(c1-4)

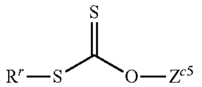

In the formulas (c1-1) to (c1-4), $Z^{c1}$ is an aryl group or an alkyl group. Examples thereof include a C6-C20 aryl group such as a phenyl group or a cyanophenyl group and a C1-C15 alkyl group such as an ethyl group. $Z^{c2}$ is an aryl group or an alkyl group. An example thereof is a C1-C15 alkyl group such as a dodecyl group. $Z^{c3}$ and $Z^{c4}$ are each independently an alkyl group, an aryl group, or a 4-pyridyl group. Examples thereof include a C1-C15 alkyl group such as a methyl group and a C6-C20 aryl group such as a phenyl group. $Z^{c3}$ and $Z^{c4}$ are optionally bonded to each other to form a heterocycle such as a pyrrole ring or a pyrrolidone ring together with the N atom in the formula (c1-3). $Z^{c5}$ is an aryl group or an alkyl group. Examples thereof include a C1-C15 alkyl group such as an ethyl group or a trifluoroethyl group and a C6-C20 aryl group such as a phenyl group or a perfluorophenyl group.

The aryl group for $Z^{c5}$ is preferably a phenyl group, a cyanophenyl group, or a perfluorophenyl group, more preferably a phenyl group or a perfluorophenyl group.

The alkyl group for $Z^{c5}$ is preferably a methyl group, an ethyl group, a butyl group, a dodecyl group, or a trifluoroethyl group, more preferably a methyl group, an ethyl group, or a trifluoroethyl group.

In the formulas (c1-1) to (c1-4), $R^r$ is a monovalent organic group. Examples thereof include (i) an alkyl group and (ii) a group prepared by replacing one or two or more of the hydrogen atoms of an alkyl group by at least one group selected from the group consisting of a phenyl group, a cyano group, a hydroxy group, a carboxy group, a C1-C4 alkoxycarbonyl group, a phenoxycarbonyl group, an acetoxy group, and c1 to c4 described below.

In the formula (c1-2'), two $R^r$s may be the same as or different from each other.

The alkyl group for $R^r$ usually has a carbon number of 1 to 18, preferably 2 to 12.

[Chem. 2]

(c1)

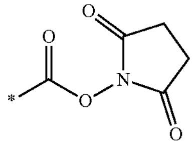

(c2)

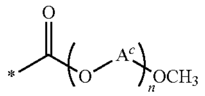

(c3)

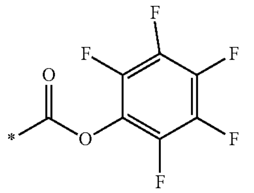

(c4)

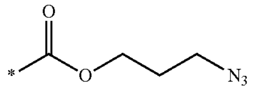

In the formulas (c1) to (c4), the symbol "*" indicates a binding site. In the formula c2, $A^c$ is a C2-C5 alkylene group and n is an integer of 10 to 300.

Examples of the dithioester (c1-1) include the following compounds.

[Chem. 3]

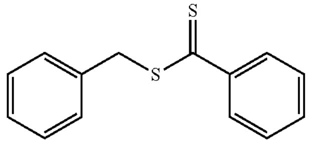

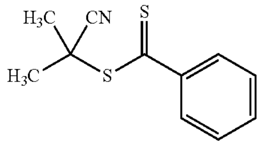

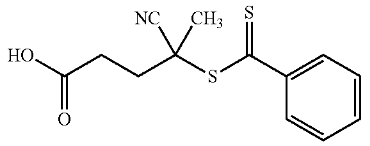

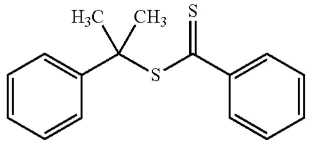

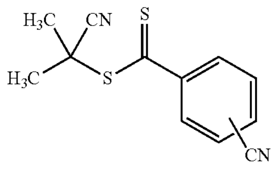

-continued
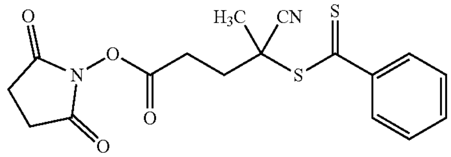
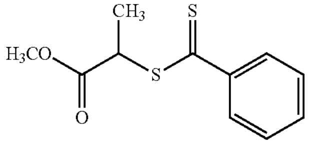
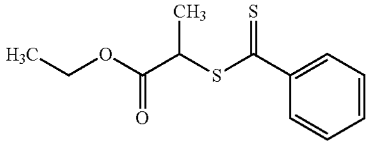
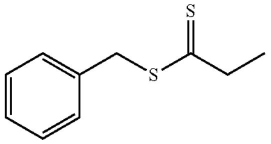
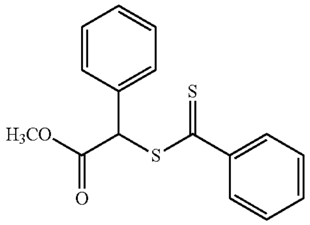
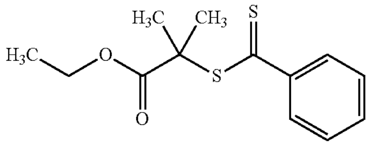
Examples of the trithiocarbonates (c1-2) and (c1-2') include the following compounds.
[Chem. 4]
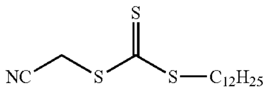
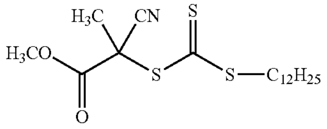
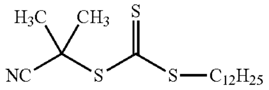
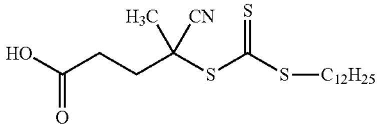
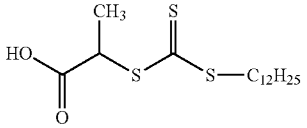
-continued
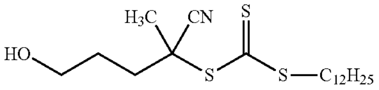
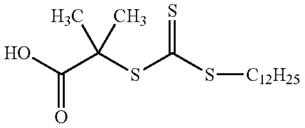
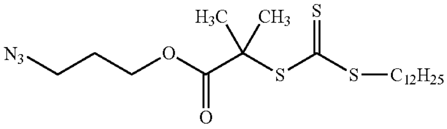
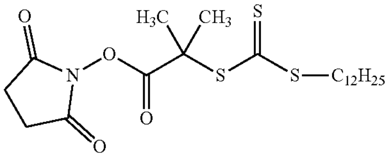
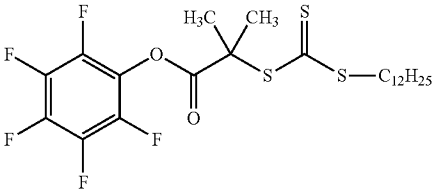
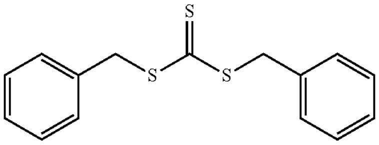
[Chem. 5]
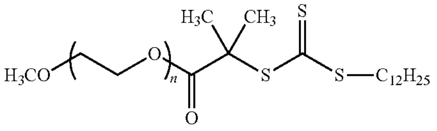
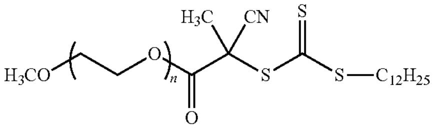
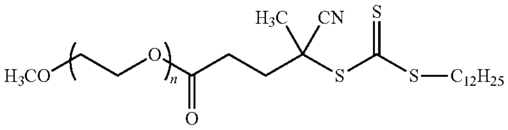
In the formula, n is an integer of 10 to 300.
Examples of the dithiocarbamate (c1-3) include the following compounds.
[Chem. 6]
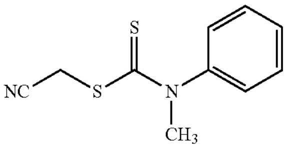

-continued
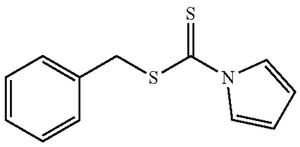
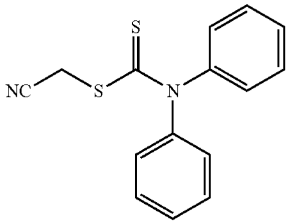
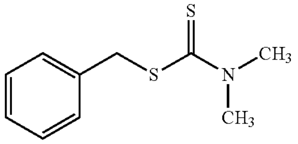
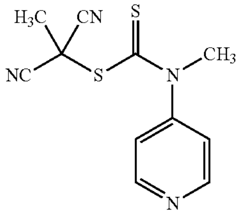
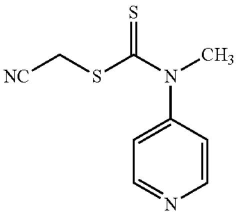
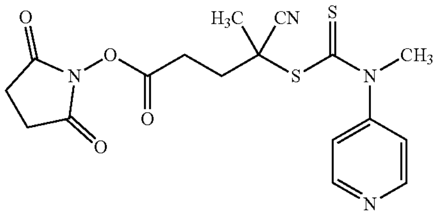
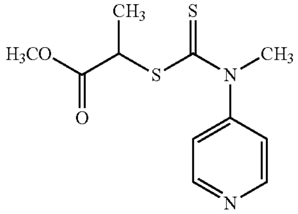
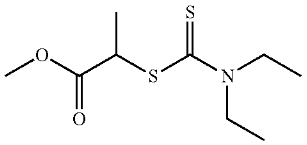
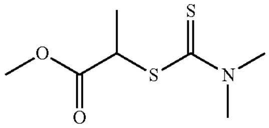
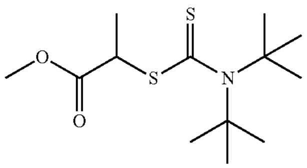
-continued
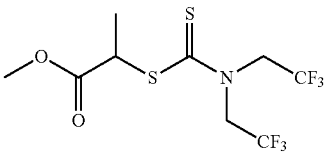
Examples of the xanthate (c1-4) include the following compounds.
[Chem. 7]
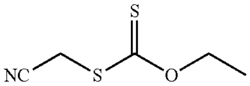
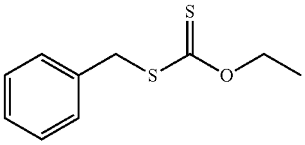
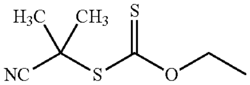
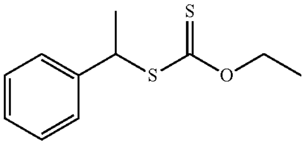
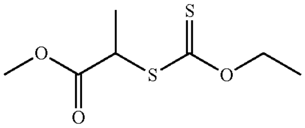
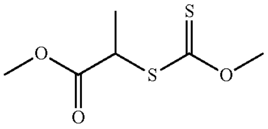
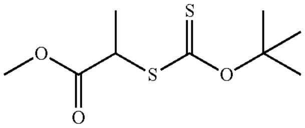
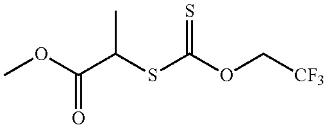
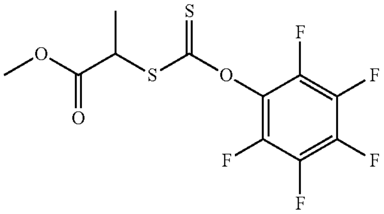
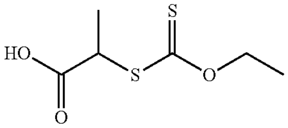

-continued

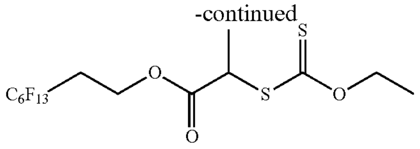

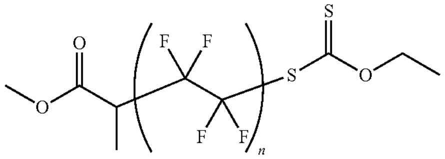

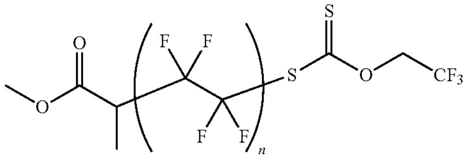

In the formulas, n is an integer of 1 to 50.

Of these, the following compound (O-ethyl-S-(1-methoxycarbonylethyl)dithiocarbonate) is preferred.

[Chem. 8]

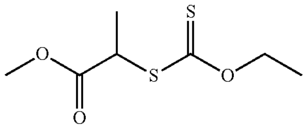

In the polymerizing step, the concentration of the chain transfer agent is $0.1\times10^{-3}$ to 0.01 mol/L relative to the aqueous medium. The chain transfer agent at a concentration within the above range allows polymerization to proceed more efficiently. The concentration of the chain transfer agent relative to the aqueous medium is more preferably $0.2\times10^{-3}$ mol/L or higher, still more preferably $0.3\times10^{-3}$ mol/L or higher, while more preferably $0.9\times10^{-2}$ mol/L or lower, still more preferably $0.8\times10^{-2}$ mol/L or lower.

Use of the chain transfer agent enables reversible addition-fragmentation chain transfer (RAFT) polymerization. RAFT polymerization enables living radical polymerization in the presence of the chain transfer agent.

The production method of the disclosure includes polymerizing TFE in the presence of an initiator. Examples of a suitable initiator include a peroxide initiator, an inorganic agent, an azo compound, and a redox initiator.

Specific examples of the peroxide initiator include hydrogen peroxide, sodium peroxide, barium peroxide, diacyl peroxides such as diacetylperoxide, disuccinylperoxide, dipropionylperoxide, dibutyrylperoxide, dibenzoylperoxide, benzoyl acetylperoxide, diglutaric acid peroxide, and dilaurylperoxide, and peracids and salts thereof (e.g., an ammonium salt, a sodium salt, and a potassium salt). An example of the peracids is peracetic acid. Esters of peracids may also be used, and examples thereof include tert-butylperoxyacetate and tert-butylperoxypivalate.

Examples of the inorganic agent include manganic acid and ammonium salts, alkaline salts, and alkaline earth salts of persulfuric acid, permanganic acid, or manganic acid. The persulfate initiator such as ammonium persulfate (APS) may be used alone or may be used in combination with a reducing agent. Examples of a suitable reducing agent include bisulfites such as ammonium bisulfite and sodium metabisulfite, thiosulfates such as ammonium thiosulfate, potassium thiosulfate, and sodium thiosulfate, hydrazine, azodicarboxylate, and azodicarboxyldiamide (ADA). The reducing agent to be used may also be, for example, sodium formaldehyde sulfoxylate (Rongalit) or a fluoroalkyl sulfinate disclosed in U.S. Pat. No. 5,285,002. The reducing agent typically reduces the half-life of a persulfate initiator. A metal salt catalyst such as a copper salt, an iron salt, or a silver salt may also be added, for example.

Examples of the azo compound include 2,2'-azobisisobutyronitrile, 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobis(2-methylbutyronitrile), 1,1'-azobis(cyclohexane-1-carbonitrile), 2-(carbamoylazo)isobutyronitrile, 2-phenylazo-4-methoxy-2,4-dimethylvaleronitrile, 2,2'-azobis(2-amidinopropane)dihydrochloride, 2,2'-azobis(N,N'-dimethyleneisobutyramidine), 2,2'-azobis(2-methyl-N-(2-hydroxyethyl)-propionamide), 2,2'-azobis(isobutyramide)dihydrate, 4,4'-azobis(4-cyanopentanoic acid), 2,2'-azobis(2-cyanopropanol), dimethyl-2,2'-azobis(2-methylpropionate), and 2,2'-azobis(2-methyl-N-(2-hydroxyethyl)propionamide).

The initiator is more preferably a peracid ester, a persulfate, diacylperoxide, 2,2'-azobis(2-methylbutyronitrile), or 2,2'-azobis(2-methylbutyronitrile), still more preferably tert-butyl peroxypivalate, dibenzoylperoxide, tert-butyl peroxyacetate, or 2,2'-azobis(2-methylbutyronitrile).

In the polymerizing step, the concentration of the initiator is preferably $1\times10^{-5}$ to 0.01 mol/L relative to the aqueous medium. The initiator at a concentration within the above range allows polymerization to proceed more efficiently. The concentration of the initiator relative to the aqueous medium is more preferably $2\times10^{-5}$ mol/L or higher, still more preferably $3\times10^{-5}$ mol/L or higher, while more preferably $0.9\times10^{-2}$ mol/L or lower, still more preferably $0.8\times10^{-2}$ mol/L or lower.

In order to efficiently proceed the polymerization, the mole ratio of the chain transfer agent to the initiator (chain transfer agent/initiator) is preferably 0.1 to 40. The mole ratio is more preferably 0.2 to 30, still more preferably 0.3 to 20, further more preferably 0.4 to 15, particularly preferably 0.5 to 10.

A mole ratio of the chain transfer agent to the initiator within the above specific range allows polymerization to proceed efficiently.

Non-limiting examples of the surfactant include a fluorine-containing surfactant and a hydrocarbon surfactant.

An example of the fluorine-containing surfactant is a fluorine-containing anion surfactant.

The fluorine-containing anion surfactant may be a surfactant containing a fluorine atom represented by the following formula ($N^0$) wherein a portion excluding the anion group $Y^0$ has a total carbon number of 20 or smaller.

The fluorine-containing surfactant may also be a fluorine-containing surfactant in which the anion portion has a molecular weight of 800 or lower.

The "anion portion" means a portion excluding the cation in the fluorine-containing surfactant. For example, in the case of $F(CF_2)_{n1}COOM$ represented by the formula (I) to be described later, the anion portion refers to the portion "$F(CF_2)_{n1}COO$".

The fluorine-containing surfactant may also be a fluorine-containing surfactant having a Log POW value of 3.5 or lower, preferably 3.4 or lower. Log POW is a 1-octanol/water partition coefficient which is represented by Log P where P is the ratio between the concentration of the fluorine-containing surfactant in octanol and the concentration of the fluorine-containing surfactant in water in a phase-separated octanol/water (1:1) liquid mixture containing the fluorine-containing surfactant.

Log POW is determined as follows. Specifically, HPLC is performed on standard substances (heptanoic acid, octanoic acid, nonanoic acid, and decanoic acid) each having a known octanol/water partition coefficient using TOSOH ODS-120T (ϕ4.6 mm×250 mm, available from Tosoh Corp.) as a column and an acetonitrile/0.6% by mass $HClO_4$ aqueous solution (=1/1 (vol/vol %)) as an eluent at a flow rate of 1.0 ml/min, a sample amount of 300 μL, and a column temperature of 40° C. with a detection light of 210-nm UV. For each standard substance, a calibration curve is drawn with respect to the elution time and the known octanol/water partition coefficient. Based on this calibration curve, Log POW is calculated from the elution time of the sample liquid in HPLC.

Specific examples of the fluorine-containing surfactant include those described in US 2007/0015864, US 2007/0015865, US 2007/0015866, US 2007/0276103, US 2007/0117914, US 2007/142541, US 2008/0015319, U.S. Pat. Nos. 3,250,808, 3,271,341, JP 2003-119204 A, WO 2005/042593, WO 2008/060461, WO 2007/046377, WO 2007/119526, WO 2007/046482, WO 2007/046345, US 2014/0228531, WO 2013/189824, and WO 2013/189826.

An example of the fluorine-containing anion surfactant is a compound represented by the following formula)($N^0$):

$$X^{n0}—Rf^{n0}—Y^0 \quad (N^0)$$

wherein $X^{n0}$ is H, Cl, or/and F; $Rf^{n0}$ is a C3-C20 linear, branched, or cyclic alkylene group in which any or all of H atoms are replaced by F atoms, the alkylene group optionally containing one or more ether bonds with any of H atoms being optionally replaced by Cl; and $Y^0$ is an anion group.

The anion group for $Y^0$ may be —COOM, —$SO_2M$, or —$SO_3M$, and may be —COOM or —$SS_3M$.

M is H, a metal atom, $NR^7_4$, imidazolium optionally containing a substituent, pyridinium optionally containing a substituent, or phosphonium optionally containing a substituent, where $R^7$ is H or an organic group.

Examples of the metal atom include an alkali metal (Group 1) and an alkaline earth metal (Group 2), such as Na, K, and Li.

$R^7$ may be H or a C1-C10 organic group, may be H or a C1-C4 organic group, and may be H or a C1-C4 alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

In $Rf^{n0}$, 50% or more of H atoms may be replaced by fluorine.

Examples of the compound represented by the formula) ($N^0$) include:

a compound represented by the following formula ($N^1$):

$$X^{n0}—Rf^{n}—Y^0 \quad (N^1)$$

wherein $X^{n0}$ is H, Cl, or F; $Rf^{n}$ is a C3-C15 linear or branched perfluoroalkylene group; and $Y^0$ is defined as described above (specifically, a compound represented by the following formula ($N^{1a}$):

$$X^{n0}—(CF_2)_{m1}—Y^0 \quad (N^{1a})$$

wherein $X^{n0}$ is H, Cl, or F; m1 is an integer of 3 to 15; and $Y^0$ is defined as described above);

a compound represented by the following formula ($N^2$):

$$Rf^{n1}—O—(CF(CF_3)CF_2O)_{m2}CFX^{n1}—Y^0 \quad (N^2)$$

wherein $Rf^{n1}$ is a C1-C5 perfluoroalkyl group; m2 is an integer of 0 to 3; $X^{n1}$ is F or $CF_3$; and $Y^0$ is defined as described above;

a compound represented by the following formula ($N^3$):

$$Rf^{n2}(CH_2)_{m3}—(Rf^{n3})_q—Y^0 \quad (N^3)$$

wherein $Rf^{n2}$ is a C1-C13 partially or completely fluorinated alkyl group optionally containing an ether bond; m3 is an integer of 1 to 3; $Rf^{n3}$ is a C1-C3 linear or branched perfluoroalkylene group; q is 0 or 1; and $Y^0$ is defined as described above;

a compound represented by the following formula ($N^4$):

$$Rf^{n4}—O\text{-}L^4\text{-}Y^0 \quad (N^4)$$

wherein $Rf^{n4}$ is a linear or branched partially or completely fluorinated aliphatic group optionally containing an ether bond; L4 is a partially or completely fluorinated linear alkylene group or aliphatic hydrocarbon group; and $Y^0$ is defined as described above (specifically, a compound represented by the following formula ($N^{4a}$):

$$Rf^{n4}—O—(CY^{n1}Y^{n2})_pCF_2—Y^0 \quad (N^{4a})$$

wherein $Rf^{n4}$ is a C1-C12 linear or branched partially or completely fluorinated alkyl group optionally containing an ether bond; $Y^{n1}$ and $Y^{n2}$ are the same as or different from each other, and are each H or F; p is 0 or 1; and $Y^0$ is defined as described above); and a compound represented by the following formula ($N^5$):

[Chem. 9]

($N^5$)

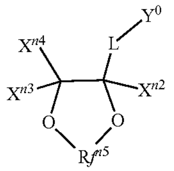

wherein $X^{n2}$, $X^{n3}$, and $X^{n4}$ are the same as or different from each other, and are each H, F, or a C1-C6 linear or branched partially or completely fluorinated alkyl group optionally containing an ether bond; $Rf^{n5}$ is a C1-C3 linear or branched partially or completely fluorinated alkylene group optionally containing an ether bond; L is a linking group; and $Y^0$ is defined as described above, where $X^{n2}$, $X^{n3}$, $X^{n4}$, and $Rf^{n5}$ have a total carbon number of 18 or less.

Specific examples of the compound represented by the formula ($N^0$) include a perfluorocarboxylic acid (I) represented by the following formula (I), an ω-H perfluorocarboxylic acid (II) represented by the following formula (II), a perfluoropolyether carboxylic acid (III) represented by the following formula (III), a perfluoroalkylalkylenecarboxylic acid (IV) represented by the following formula (IV), a perfluoroalkoxyfluorocarboxylic acid (V) represented by the following formula (V), a perfluoroalkylsulfonic acid (VI) represented by the following formula (VI), an ω-H perfluorosulfonic acid (VII) represented by the following formula (VII), a perfluoroalkylalkylenesulfonic acid (VIII) represented by the following formula (VIII), an alkylalkylenecarboxylic acid (IX) represented by the following formula (IX), a fluorocarboxylic acid (X) represented by the following formula (X), an alkoxyfluorosulfonic acid (XI) represented by the following formula (XI), and a compound (XII) represented by the following formula (XII).

The perfluorocarboxylic acid (I) is represented by the following formula (I):

$$F(CF_2)_{n1}COOM \quad (I)$$

wherein n1 is an integer of 3 to 14; and M is H, a metal atom, $NR^7_4$, imidazolium optionally containing a substituent, pyridinium optionally containing a substituent, or phosphonium optionally containing a substituent, where $R^7$ is H or an organic group.

The ω-H perfluorocarboxylic acid (II) is represented by the following formula (II):

$$H(CF_2)_{n2}COOM \quad (II)$$

wherein n2 is an integer of 4 to 15; and M is defined as described above.

The perfluoropolyether carboxylic acid (III) is represented by the following formula (III):

$$Rf^1—O—(CF(CF_3)CF_2O)_{n3}CF(CF_3)COOM \quad (III)$$

wherein $Rf^1$ is a C1-C5 perfluoroalkyl group; n3 is an integer of 0 to 3; and M is defined as described above.

The perfluoropolyether carboxylic acid (III) is preferably a perfluoropolyether carboxylic acid having a total carbon number of 7 or less and having a Log POW value of 3.5 or lower. The total carbon number is particularly preferably 5 to 7 and the Log POW value is more preferably 3.4 or lower.

The perfluoroalkylalkylenecarboxylic acid (IV) is represented by the following formula (IV):

$$Rf^2(CH_2)_{n4}Rf^3COOM \quad (IV)$$

wherein $Rf^2$ is a C1-C5 perfluoroalkyl group; $Rf^3$ is a C1-C3 linear or branched perfluoroalkylene group; n4 is an integer of 1 to 3; and M is defined as described above.

The alkoxyfluorocarboxylic acid (V) is represented by the following formula (V):

$$Rf^4—O—CY^1Y^2CF_2—COOM \quad (V)$$

wherein $Rf^4$ is a C1-C12 linear or branched partially or completely fluorinated alkyl group optionally containing an ether bond; $Y^1$ and $Y^2$ are the same as or different from each other, and are each H or F; and M is defined as described above.

The perfluoroalkylsulfonic acid (VI) is represented by the following formula (VI):

$$F(CF_2)_{n5}SO_3M \quad (VI)$$

wherein n5 is an integer of 3 to 14; and M is defined as described above.

The ω-H perfluorosulfonic acid (VII) is represented by the following formula (VII):

$$H(CF_2)_{n6}SO_3M \quad (VII)$$

wherein n6 is an integer of 4 to 14; and M is defined as described above.

The perfluoroalkylalkylenesulfonic acid (VIII) is represented by the following formula (VIII):

$$Rf^5(CH_2)_{n7}SO_3M \quad (VIII)$$

wherein $Rf^5$ is a C1-C13 perfluoroalkyl group; n7 is an integer of 1 to 3; and M is defined as described above.

The alkylalkylenecarboxylic acid (IX) is represented by the following formula (IX):

$$Rf^6(CH_2)_{n8}COOM \quad (IX)$$

wherein $Rf^6$ is a C1-C13 linear or branched partially or completely fluorinated alkyl group optionally containing an ether bond; n8 is an integer of 1 to 3; and M is defined as described above.

The fluorocarboxylic acid (X) is represented by the following formula (X):

$$Rf^7—O—Rf^8—O—CF_2—COOM \quad (X)$$

wherein $Rf^7$ is a C1-C6 linear or branched partially or completely fluorinated alkyl group optionally containing an ether bond; $Rf^8$ is a C1-C6 linear or branched partially or completely fluorinated alkyl group; and M is defined as described above.

The alkoxyfluorosulfonic acid (XI) is represented by the following formula (XI):

$$Rf^9—O—CY^1Y^2CF_2—SO_3M \quad (XI)$$

wherein $Rf^9$ is a C1-C12 linear or branched partially or completely fluorinated alkyl group optionally containing an ether bond and optionally containing chlorine; $Y^1$ and $Y^2$ are the same as or different from each other, and are each H or F; and M is defined as described above.

The compound (XII) is represented by the following formula (XII):

[Chem. 10]

(XII)

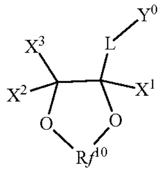

wherein $X^1$, $X^2$, and $X^3$ are the same as or different from each other, and are each H, F, or a C1-C6 linear or branched partially or completely fluorinated alkyl group optionally containing an ether bond; $Rf^{10}$ is a C1-C3 perfluoroalkylene group; L is a linking group; and $Y^0$ is an anion group.

$Y^0$ may be —COOM, —$SO_2M$, or —$SO_3M$, and may be —$SO_3M$ or COOM where M is defined as described above.

Examples of L include a single bond and a C1-C10 partially or completely fluorinated alkylene group optionally containing an ether bond.

As described above, examples of the fluorine-containing anion surfactant include a carboxylic acid-based surfactant and a sulfonic acid-based surfactant.

In the case of using a compound represented by the formula ($N^1$) in the fluorine-containing anion surfactant, the carbon number of Rf''' in the formula ($N^1$) is preferably an integer of 3 to 6. Also, m1 in the formula ($N^{1a}$) is preferably an integer of 3 to 6. In the case of using a perfluorocarboxylic acid (I), n1 in the formula (I) is preferably an integer of 3 to 6.

In particular, the fluorine-containing anion surfactant is preferably a compound selected from the group consisting of a fluorine-containing carboxylic acid having a carbon number of 4 to 7 and optionally containing etheric oxygen and salts thereof. The carbon number as used herein means the total carbon number of one molecule. The fluorine-containing anion surfactant used may be a combination of two or more thereof.

The fluorine-containing anion surfactant is preferably a compound selected from the group consisting of a fluorine-containing carboxylic acid having a carbon number of 4 to 7 and containing etheric oxygen and salts thereof. The fluorine-containing carboxylic acid containing etheric oxygen is a compound containing etheric oxygen in the middle of the main carbon chain having a carbon number of 4 to 7, and having —COOH at an end. The terminal —COOH may form a salt.

The number of etheric oxygen atoms in the middle of the main chain is one or more, preferably 1 to 4, more preferably 1 or 2.

The carbon number is preferably 5 to 7.

In particular, the fluorine-containing anion surfactant is preferably a partially or completely fluorinated carboxylic acid whose main chain has a carbon number of 6 or 7 and an etheric oxygen number of 1 to 4, and is linear, branched, or cyclic, or a salt thereof. The "main chain" as used herein means a continuous chain having the maximum carbon atom number.

Examples of such a fluorine-containing surfactant include $CF_3O(CF_2)_3OCHFCF_2COONH_4$, $CF_3CF_2CF_2OCF(CF_3)COONH_4$, $CF_3CF_2OCF_2CF_2OCF_2COONH_4$, $CF_3OCF(CF_3)CF_2OCF(CF_3)COONH_4$, and a compound represented by the following formula:

[Chem. 11]

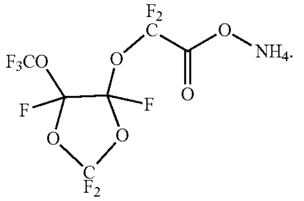

Examples of the hydrocarbon surfactant used include those listed in JP 2013-542308 T, JP 2013-542309 T, and JP 2013-542310 T.

The hydrocarbon surfactant may be a surfactant with a hydrophilic moisty and a hydrophobic moiety on the same molecule. These hydrocarbon surfactants may be cationic, nonionic, or anionic.

Cationic hydrocarbon surfactants usually have a positively charged hydrophilic moiety such as an alkylated ammonium halide (e.g., alkylated ammonium bromide) and a hydrophobic moiety such as a long-chain fatty acid.

Anionic hydrocarbon surfactants usually have a hydrophilic moiety such as a carboxylate, sulfonate, or sulfate and a hydrophobic moiety which is a long-chain hydrocarbon moiety such as an alkyl.

Nonionic hydrocarbon surfactants are usually free from a charged group, but have a hydrophobic moiety that is a long-chain hydrocarbon. The hydrophilic moiety of nonionic surfactants contains a water-soluble functional group such as an ethylene ether chain derived from polymerization with ethylene oxide.

Examples of nonionic hydrocarbon surfactants include: polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, and derivatives of these.

Specific examples of polyoxyethylene alkyl ethers include: polyoxyethylene lauryl ether, polyoxyethylene cetyl ether, polyoxyethylene stearyl ether, polyoxyethylene oleyl ether, and polyoxyethylene behenyl ether.

Specific examples of polyoxyethylene alkyl phenyl ethers include: polyoxyethylene nonyl phenyl ether and polyoxyethylene octyl phenyl ether.

Specific examples of polyoxyethylene alkyl esters include: polyethylene glycol monolaurylate, polyethylene glycol monooleate, and polyethylene glycol monostearate.

Specific examples of sorbitan alkyl esters include: polyoxyethylene sorbitan monolaurylate, polyoxyethylene sorbitan monopalmitate, polyoxyethylene sorbitan monostearate, and polyoxyethylene sorbitan monooleate.

Specific examples of polyoxyethylene sorbitan alkyl esters include: polyoxyethylene sorbitan monolaurylate, polyoxyethylene sorbitan monopalmitate, and polyoxyethylene sorbitan monostearate.

Specific examples of glycerol esters include: glycerol monomyristate, glycerol monostearate, and glycerol monooleate.

Specific examples of the derivatives include: polyoxyethylene alkylamines, polyoxyethylene alkylphenyl-formaldehyde condensates, and polyoxyethylene alkyl ether phosphates.

The ethers and esters may have HLB values of 10 to 18.

Examples of the nonionic hydrocarbon surfactants include Triton® X series (e.g., X15, X45, and X100), Tergitol® 15-S series, Tergitol® TMN series (e.g., TMN-6, TMN-10, and TMN-100), and Tergitol® L series, which are available from Dow Chemical Company, and Pluronic® R series (31R1, 17R2, 10R5, and 25R4 (m~22, n~23)) and Iconol® TDA series (TDA-6, TDA-9, and TDA-10), which are available from BASF.

Examples of the anionic hydrocarbon surfactants include Versatic® 10 available from Resolution Performance Products and Avanel S series (e.g., S-70, S-74) available from BASF.

The hydrocarbon surfactant may be a surfactant free from a fluorine atom, preferably a surfactant containing a hydrophilic group (e.g., a carbonyl, ether, ester, amide, or sulfonyl group) and a linear or branched C8-C30 alkyl group optionally containing a substituent or a linking group (e.g., a carbonyl, ether, ester, amide, or sulfonyl group), but free from a fluorine atom; or preferably a hydrocarbon anionic surfactant free from a fluorine atom.

The hydrocarbon surfactant is preferably an anionic hydrocarbon surfactant.

An example of the anionic hydrocarbon surfactant is an anionic surfactant represented by $R^2$-L-M (where Rz is a linear or branched alkyl group having a carbon number of 1 or greater and optionally containing a substituent or a cyclic alkyl group having a carbon number of 3 or greater and optionally containing a substituent, each alkyl group optionally containing a monovalent or divalent heterocycle or optionally forming a ring when having a carbon number of 3 or greater; L is $—ArSO_3^-$, $—SO_3^-$, $—SO_4^-$, $—PO_3^-$, or $—COO^-$; and M is H, a metal atom, $NR^{5z}_4$, imidazolium optionally containing a substituent, pyridinium optionally containing a substituent, or phosphonium optionally containing a substituent, with $R^{5z}$ being H or an organic group and $—ArSO_3^-$ being an arylsulfonate).

A specific example is a surfactant represented by $CH_3—(CH_2)_n$-L-M, typified by lauric acid, where n is an integer of 6 to 17 and L and M are defined as described above.

The anionic hydrocarbon surfactant may also be a mixture of surfactants in which $R^z$ is a C12-C16 alkyl group and L-M is a sulfate or sodium dodecyl sulfate (SDS).

The anionic hydrocarbon surfactant may also be an anionic surfactant represented by $R^{6z}(\text{-L-M})_2$ (where $R^{6z}$ is a linear or branched alkylene group having a carbon number of 1 or greater and optionally containing a substituent or a cyclic alkylene group having a carbon number of 3 or greater and optionally containing a substituent, each alkylene group optionally containing a monovalent or divalent heterocycle or optionally forming a ring when having a carbon number of 3 or greater; L is $—ArSO_3^-$, $—SO_3^-$, $—SO_4^-$, $—PO_3^-$, or —$COO^-$; and M is H, a metal atom, $NR^{5z}{}_4$, imidazolium optionally containing a substituent, pyridinium optionally containing a substituent, or phosphonium optionally containing a substituent, with $R^{5z}$ being H or an organic group and —$ArSO_3^-$ being an arylsulfonate).

The anionic hydrocarbon surfactant may also be an anionic surfactant represented by $R^{7z}$(-L-M)$_3$ (where $R^{7z}$ is a linear or branched alkylidine group having a carbon number of 1 or greater and optionally containing a substituent or a cyclic alkylidine group having a carbon number of 3 or greater and optionally containing a substituent, each alkylidine group optionally containing a monovalent or divalent heterocycle or optionally forming a ring when having a carbon number of 3 or greater; L is —$ArSS_3^-$, —$SS_3^-$, —$SO_4^-$, —$PO_3^-$, or —$COO^-$; and M is H, a metal atom, $NR^{5z}{}_4$, imidazolium optionally containing a substituent, pyridinium optionally containing a substituent, or phosphonium optionally containing a substituent, with $R^{5z}$ being H or an organic group and —$ArSO_3^-$ being an arylsulfonate).

$R^{5z}$ is preferably H or an alkyl group, more preferably H or a C1-C10 alkyl group, still more preferably H or a C1-C4 alkyl group.

Examples of siloxane hydrocarbon surfactants include those described in Silicone Surfactants, R. M. Hill, Marcel Dekker, Inc., ISBN: 0-8247-00104. A siloxane surfactant has a structure containing a distinct hydrophobic moiety and a distinct hydrophilic moiety. The hydrophobic moiety contains one or more dihydrocarbylsiloxane units, where the substituents on the silicone atoms are completely hydrocarbon groups.

In the sense that the carbon atoms of the hydrocarbyl groups are fully substituted with hydrogen atoms where they can be substituted by halogen such as fluorine, these siloxane surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties, including ionic groups such as a sulfate, a sulfonate, a phosphonate, a organophosphate, a carboxylate, a carbonate, a sulfosuccinate, a taurate (in the form of a free acid, salt, or ester), a phosphine oxide, a betaine, a betaine copolyol, and a quaternary ammonium salt. The ionic hydrophobic moiety can also contain an ionically functionalized siloxane graft.

Examples of such a siloxane hydrocarbon surfactant include polydimethylsiloxane-grafted (meth)acrylates, polydimethylsiloxane-grafted polyacrylate salts, and polydimethylsiloxane-grafted quaternary amines.

The polar moiety of the hydrophilic moiety of the siloxane surfactant can contain a nonionic group including a polyethylene oxide (PEO), a polyether such as a mixture of polyethylene oxide/propylene oxide polyether (PEO/PPO), a monosaccharide, a disaccharide, or a water-soluble heterocycle such as pyrrolidinone. The ratio of ethylene oxide to propylene oxide (EO/PO) may vary in the mixture of polyethylene oxide/propylene oxide polyether.

The hydrophilic moiety of the siloxane hydrocarbon surfactant can also contain a combination of an ionic moiety and a nonionic moiety. Examples of such a moiety include polyethers or polyols that are ionically end-functionalized or randomly functionalized. In a preferred embodiment of the disclosure, siloxanes with nonionic moieties, i.e., nonionic siloxane surfactants are preferred.

The hydrophobic moiety and the hydrophilic moiety in the structure of the siloxane hydrocarbon surfactant may have an arrangement of a diblock polymer (AB), a triblock polymer (ABA) (where "B" represents the siloxane moiety of the molecule), or a multiblock polymer. Alternatively, the siloxane surfactant may contain a graft polymer.

Siloxane hydrocarbon surfactants are also disclosed in U.S. Pat. No. 6,841,616.

Examples of siloxane-based anionic hydrocarbon surfactants include Noveon® available from Lubrizol Advanced Materials, Inc. and SilSense™ PE-100 silicone and SilSense™ CA-1 silicone available from Consumer Specialties.

The anionic hydrocarbon surfactant may also be a sulfosuccinate surfactant Lankropol® K8300 available from Akzo Nobel Surface Chemistry LLC.

Examples of the sulfosuccinate surfactant include a diisodecyl sulfosuccinate sodium salt Emulsogen® SB10 available from Clariant and a diisotridecyl sulfosuccinate sodium salt Polirol® TR/LNA available from Cesapinia Chemicals.

The hydrocarbon surfactant may also be PolyFox® surfactant (e.g., PolyFox™ PF-156A or PolyFox™ PF-136A) available from Omnova Solutions, Inc.

The hydrocarbon surfactant is preferably an anionic hydrocarbon surfactant. The anionic hydrocarbon surfactant may be one described above. For example, the following compound can be suitably used.

The anionic hydrocarbon surfactant is, for example, a compound (α) represented by the following formula (α):

$$R^{100}\text{—COOM} \quad (\alpha)$$

wherein $R^{100}$ is a monovalent organic group having a carbon number of 1 or greater; and M is H, a metal atom, $NR^{101}{}_4$, imidazolium optionally containing a substituent, pyridinium optionally containing a substituent, or phosphonium optionally containing a substituent, where $R^{101}$s are each H or an organic group and are the same as or different from each other. The organic group for $R^{101}$ is preferably an alkyl group. $R^{101}$ is preferably H or a C1-C10 organic group, more preferably H or a C1-C4 organic group, still more preferably H or a C1-C4 alkyl group.

From the viewpoint of interfacial activity, $R^{100}$ preferably has a carbon number of 2 or greater, more preferably 3 or greater. From the viewpoint of water solubility, $R^{100}$ preferably has a carbon number of 29 or smaller, more preferably 23 or smaller.

Examples of the metal atom for M include alkali metals (Group 1) and alkaline earth metals (Group 2). Preferred is Na, K, or Li. M is preferably H, a metal atom, or $NR^{101}{}_4$, more preferably H, an alkali metal (Group 1), an alkaline earth metal (Group 2), or $NR^{101}{}_4$, still more preferably H, Na, K, Li, or $NH_4$, further more preferably Na, K, or $NH_4$, particularly preferably Na or $NH_4$, most preferably $NH_4$.

The compound (α) may also be an anionic hydrocarbon surfactant represented by $R^{102}$—COOM (where $R^{102}$ is a linear or branched alkyl, alkenyl, alkylene, or alkenylene group having a carbon number of 1 or greater and optionally containing a substituent or a cyclic alkyl, alkenyl, alkylene, or alkenylene group having a carbon number of 3 or greater and optionally containing a substituent, each group optionally containing an ether bond, and when having a carbon number of 3 or greater, each group optionally containing a monovalent or divalent heterocycle or optionally forming a ring; and M is defined as described above).

Specific examples include one represented by $CH_3$—$(CH_2)_n$—COOM where n is an integer of 2 to 28 and M is defined as described above.

The compound (α) may be free from a carbonyl group (other than the carbonyl group in the carboxy group) from the viewpoint of emulsion stability.

A preferred example of the carbonyl group-free hydrocarbon-containing surfactant is a compound represented by the following formula (A):

$$R^{103}\text{—COO-M} \quad \text{(A)}$$

wherein $R^{103}$ is a C6-C17 alkyl, alkenyl, alkylene, or alkenylene group, which may contain an ether bond; and M is H, a metal atom, $NR^{101}_4$, imidazolium optionally containing a substituent, pyridinium optionally containing a substituent, or phosphonium optionally containing a substituent, with $R^{100}$s being the same as or different from each other and each being H or an organic group.

In the formula (A), $R^{103}$ is preferably an alkyl or alkenyl group (which may contain an ether group). The alkyl or alkenyl group for $R^{103}$ may be linear or branched. The carbon number of $R^{103}$ is, but not limited to, 2 to 29, for example.

When the alkyl group is linear, $R^{103}$ preferably has a carbon number of 3 to 29, more preferably 5 to 23. When the alkyl group is branched, $R^{103}$ preferably has a carbon number of 5 to 35, more preferably 11 to 23.

When the alkenyl group is linear, $R^{103}$ preferably has a carbon number of 2 to 29, more preferably 9 to 23. When the alkenyl group is branched, $R^{103}$ preferably has a carbon number of 2 to 29, more preferably 9 to 23.

Examples of the alkyl and alkenyl groups include methyl, ethyl, isobutyl, t-butyl, and vinyl groups.

Examples of the anionic hydrocarbon surfactant include butyric acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)-linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, osbondic acid, sardonic acid, tetracosapentaenoic acid, docosahexaenoic acid, and herring acid, and salts thereof.

The anionic hydrocarbon surfactant preferably includes at least one selected from the group consisting of lauric acid, capric acid, myristic acid, pentadecylic acid, palmitic acid, and salts thereof.

Non-limiting examples of the salts include those in which the hydrogen atom of the carboxy group is a metal atom, $NR^{101}_4$, imidazolium optionally containing a substituent, pyridinium optionally containing a substituent, or phosphonium optionally containing a substituent, for the above-described M.

The anionic hydrocarbon surfactant may also be a hydrocarbon surfactant containing one or more carbonyl groups (other than the carbonyl group in the carboxy group).

The hydrocarbon surfactant containing one or more carbonyl groups (other than the carbonyl group in the carboxy group) is preferably a surfactant represented by the formula: $R^X$—$X^X$ (where $R^X$ is a C1-C2000 fluorine-free organic group containing one or more carbonyl groups (other than the carbonyl group in the carboxy group); and $X^X$ is —$OSO_3X^{X1}$, —$COOX^{X1}$, or —$SO_3X^{X1}$, with $X^{X1}$ being H, a metal atom, $NR^{x1}_4$, imidazolium optionally containing a substituent, pyridinium optionally containing a substituent, or phosphonium optionally containing a substituent, with $R^{x1}$ is each being H or an organic group and being the same as or different from each other). $R^x$ preferably has a carbon number of 500 or smaller, more preferably 100 or smaller, still more preferably 50 or smaller, further more preferably 30 or smaller. The organic group for $R^{X1}$ is preferably an alkyl group. $R^{X1}$ is preferably H or a C1-C10 organic group, more preferably H or a C1-C4 organic group, still more preferably H or a C1-C4 alkyl group.

The specific hydrocarbon surfactant more preferably includes at least one selected from the group consisting of:

a surfactant (a) represented by the following formula (a):

[Chem. 12]

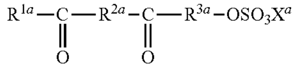

(wherein $R^{1a}$ is a linear or branched alkyl group having a carbon number of 1 or greater or a cyclic alkyl group having a carbon number of 3 or greater, with a hydrogen atom that binds to a carbon atom therein being optionally replaced by a hydroxy group or a monovalent organic group that contains an ester bond, each alkyl group optionally containing a carbonyl group when having a carbon number of 2 or greater or optionally containing a monovalent or divalent heterocycle or optionally forming a ring when having a carbon number of 3 or greater; $R^{2a}$ and $R^{3a}$ are each independently a single bond or a divalent linking group; the sum of the carbon numbers of $R^{1a}$, $R^{2a}$, and $R^{3a}$ is 6 or greater; $X^a$ is H, a metal atom, $NR^{4a}_4$, imidazolium optionally containing a substituent, pyridinium optionally containing a substituent, or phosphonium optionally containing a substituent, with $R^{4a}$s each being H or an organic group and being the same as or different from each other; and any two of $R^{1a}$, $R^{2a}$, and $R^{3a}$ are optionally bonded to each other to form a ring);

a surfactant (b) represented by the following formula (b):

[Chem. 13]

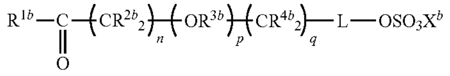

(wherein $R^{1b}$ is a linear or branched alkyl group having a carbon number of 1 or greater and optionally containing a substituent or a cyclic alkyl group having a carbon number of 3 or greater and optionally containing a substituent, each alkyl group optionally containing a monovalent or divalent heterocycle or optionally forming a ring when having a carbon number of 3 or greater; $R^{2b}$ and $R^{4b}$ are each independently H or a substituent; $R^{3b}$ is a C1-C10 alkylene group optionally containing a substituent; n is an integer of 1 or greater; p and q are each independently an integer of 0 or greater; $X^b$ is H, a metal atom, $NR^{5b}_4$, imidazolium optionally containing a substituent, pyridinium optionally containing a substituent, or phosphonium optionally containing a substituent, with $R^{5b}$s each being H or an organic group and being the same as or different from each other;

any two of $R^{1b}$, $R^{2b}$, $R^{3b}$, and $R^{4b}$ are optionally bonded to each other to form a ring; and L is a single bond, —$CO_2$—B—*, —OCO—B—*, —$CONR^{6b}$—B—*, —$NR^{6b}$—CO—B—*, or —CO—(other than the carbonyl groups in —$CO_2$—B—, —OCO—B—, —$CONR^{6b}$—B—, and —$NR^{6}$CO—B—), with B being a single bond or a C1-C10 alkylene group optionally containing a substituent, $R^{6b}$ being H or a C1-C4 alkyl group optionally containing a substituent, and * indicating the bond to —$OS_3X^b$ in the formula);

a surfactant (c) represented by the following formula (c):

[Chem. 14]

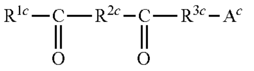

(wherein $R^{1c}$ is a linear or branched alkyl group having a carbon number of 1 or greater or a cyclic alkyl group having a carbon number of 3 or greater, with a hydrogen atom that binds to a carbon atom therein being optionally replaced by a hydroxy group or a monovalent organic group that contains an ester bond, each alkyl group optionally containing a carbonyl group when having a carbon number of 2 or greater or optionally containing a monovalent or divalent heterocycle or optionally forming a ring when having a carbon number of 3 or greater; $R^{2c}$ and $R^{3c}$ are each independently a single bond or a divalent linking group; the sum of the carbon numbers of $R^{1c}$, $R^{2c}$, and $R^{3c}$ is 5 or greater; Ac is —$COOX^c$ or —$SO_3X^c$, with $X^c$ being H, a metal atom, $NR^{4c}{}_4$, imidazolium optionally containing a substituent, pyridinium optionally containing a substituent, or phosphonium optionally containing a substituent, with $R^{4c}$s each being H or an organic group and being the same as or different from each other; and any two of $R^{1c}$, $R^{2c}$, and $R^{3c}$ are optionally bonded to each other to form a ring); and a surfactant (d) represented by the following formula (d):

[Chem. 15]

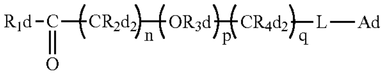

(wherein $R^{1d}$ is a linear or branched alkyl group having a carbon number of 1 or greater and optionally containing a substituent or a cyclic alkyl group having a carbon number of 3 or greater and optionally containing a substituent, each alkyl group optionally containing a monovalent or divalent heterocycle or optionally forming a ring when having a carbon number of 3 or greater; $R^{2d}$ and $R^{4d}$ are each independently H or a substituent; $R^{3d}$ is a C1-C10 alkylene group optionally containing a substituent; n is an integer of 1 or greater; p and q are each independently an integer of 0 or greater; $A^d$ is —$SO_3X^d$ or —$COOX^d$, with $X^d$ being H, a metal atom, $NR^{5d}4$, imidazolium optionally containing a substituent, pyridinium optionally containing a substituent, or phosphonium optionally containing a substituent, with $R^{5d}$s each being H or an organic group and being the same as or different from each other; any two of $R^{1d}$, $R^{2d}$, $R^{3d}$, and $R^{4d}$ are optionally bonded to each other to form a ring; and L is a single bond, —$CO_2$—B—*, —OCO—B—*, —$CONR^{6d}$—B—*, —$NR^{6d}$CO—B—*, or —CO— (other than the carbonyl groups in —$CO_2$—B—, —OCO—B—, —$CONR^{6d}$—B—, and —$NR^{6d}$CO—B—), with B being a single bond or a C1-C10 alkylene group optionally containing a substituent, $R^{6d}$ being H or a C1-C4 alkyl group optionally containing a substituent, and * indicating the bond to Ad in the formula).

The surfactant (a) is described below.

In the formula (a), $R^{1a}$ is a linear or branched alkyl group having a carbon number of 1 or greater or a cyclic alkyl group having a carbon number of 3 or greater.

When having a carbon number of 3 or greater, the alkyl group may optionally contain a carbonyl group (—C(═O)—) between two carbon atoms. When having a carbon number of 2 or greater, the alkyl group may optionally contain a carbonyl group at an end of the alkyl group. In other words, the alkyl group encompasses an acyl group such as an acetyl group represented by $CH_3$—C(═O)—.

When having a carbon number of 3 or greater, the alkyl group may optionally contain a monovalent or divalent heterocycle, or may optionally form a ring. The heterocycle is preferably an unsaturated heterocycle, more preferably an oxygen-containing unsaturated heterocycle, and may be a furan ring, for example. In $R^{1a}$, a divalent heterocycle may be present between two carbon atoms, a divalent heterocycle may be present at an end and bind to —C(═O)—, or a monovalent heterocycle may be present at an end of the alkyl group.

The "carbon number" of the alkyl group as used herein includes the number of carbon atoms constituting the carbonyl groups and the number of carbon atoms constituting the heterocycles. For example, the carbon number of the group represented by $CH_3$—C(═O)—$CH_2$— is 3, the carbon number of the group represented by $CH_3$—C(═O)—$C_2H_4$—C(═O)—$C_2H_4$— is 7, and the carbon number of the group represented by $CH_3$—C(═O)— is 2.

In the alkyl group, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{101a}$ where $R^{101a}$ is an alkyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula, $R^{2a}$ and $R^{3a}$ are each independently a single bond or a divalent linking group.

Preferably, $R^{2a}$ and $R^{3a}$ are each independently a single bond, a linear or branched alkylene group having a carbon number of 1 or greater, or a cyclic alkylene group having a carbon number of 3 or greater.

The alkylene group constituting each of $R^{2a}$ and $R^{3a}$ is preferably free from a carbonyl group.

In the alkylene group, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{102a}$ where $R^{102a}$ is an alkyl group.

In the alkylene group, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The sum of the carbon numbers of $R^{1a}$, $R^{2a}$, and $R^{3a}$ is 6 or greater. The sum of the carbon numbers is preferably 8 or greater, more preferably 9 or greater, still more preferably 10 or greater, while preferably 20 or smaller, more preferably 18 or smaller, still more preferably 15 or smaller.

Any two of $R^{1a}$, $R^{2a}$, and $R^{3a}$ may be optionally bonded to each other to form a ring.

In the formula (a), $X^a$ is H, a metal atom, $NR^{4a}_4$, imidazolium optionally containing a substituent, pyridinium optionally containing a substituent, or phosphonium optionally containing a substituent, where $R^{4a}$ is H or an organic group, and the four $R^{4a}$s are the same as or different from each other. The organic group for $R^{4a}$ is preferably an alkyl group. $R^{4a}$ is preferably H or a C1-C10 organic group, more preferably H or a C1-C4 organic group, still more preferably H or a C1-C4 alkyl group. The metal atom may be a monovalent or divalent metal atom, and examples thereof include alkali metals (Group 1) and alkaline earth metals (Group 2). Preferred is Na, K, or Li.

$X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, most preferably $NH_4$ because it can be easily removed. When $X^a$ is $NH_4$, the surfactant has excellent solubility in an aqueous medium and the metal component is less likely to remain in PTFE or the final product.

$R^{1a}$ is preferably a C1-C8 linear or branched alkyl group free from a carbonyl group, a C3-C8 cyclic alkyl group free from a carbonyl group, a C2-C45 linear or branched alkyl group containing 1 to 10 carbonyl groups, a C3-C45 cyclic alkyl group containing a carbonyl group, or a C3-C45 alkyl group containing a monovalent or divalent heterocycle.

$R^{1a}$ is more preferably a group represented by the following formula:

[Chem. 16]

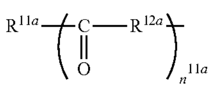

wherein $n^{11a}$ is an integer of 0 to 10; $R^{11a}$ is a C1-C5 linear or branched alkyl group or a C3-C5 cyclic alkyl group; $R^{12a}$ is a C0-C3 alkylene group; and when $n^{11a}$ is an integer of 2 to 10, $R^{12a}$s are the same as or different from each other.

In the formula, $n^{11a}$ is preferably an integer of 0 to 5, more preferably an integer of 0 to 3, still more preferably an integer of 1 to 3.

The alkyl group for $R^{11a}$ is preferably free from a carbonyl group.

In the alkyl group for $R^{11a}$, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{103a}$ where $R^{103a}$ is an alkyl group.

In the alkyl group for $R^{11a}$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12a}$ is a C0-C3 alkylene group. The carbon number is preferably 1 to 3.

The alkylene group for $R^{12a}$ may be either linear or branched.

The alkylene group for $R^{12a}$ is preferably free from a carbonyl group. $R^{12a}$ is more preferably an ethylene group (—$C_2H_4$—) or a propylene group (—$C_3H_6$—).

In the alkylene group for $R^{12a}$, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{104a}$ where $R^{104a}$ is an alkyl group.

In the alkylene group for $R^{12a}$, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2a}$ and $R^{3a}$ are preferably each independently an alkylene group free from a carbonyl group and having a carbon number of 1 or greater, more preferably a C1-C3 alkylene group free from a carbonyl group, still more preferably an ethylene group (—$C_2H_4$—) or a propylene group (—$C_3H_6$—).

Examples of the surfactant (a) include the following surfactants. In each formula, $X^a$ is defined as described above.

[Chem. 17]

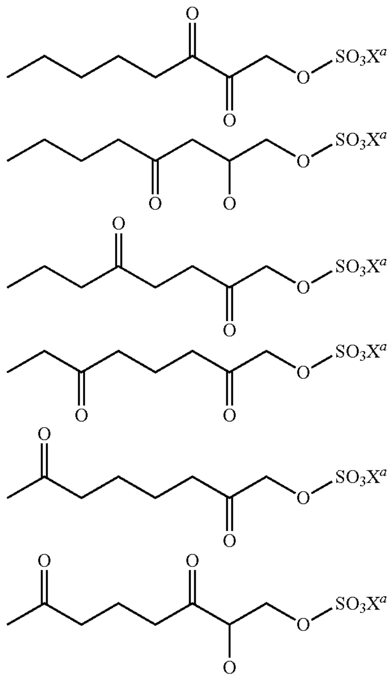

-continued
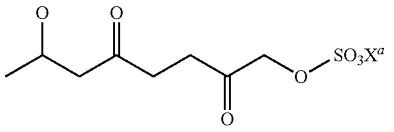
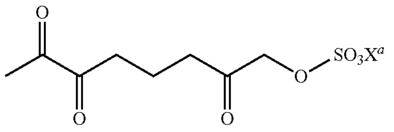
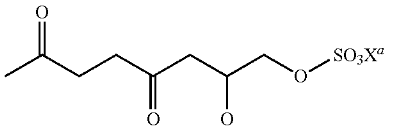
[Chem. 18]
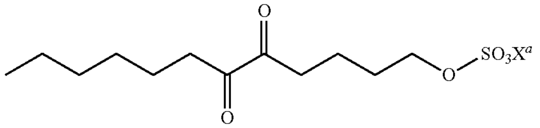
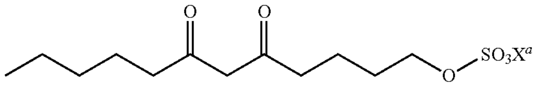
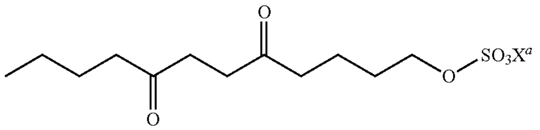
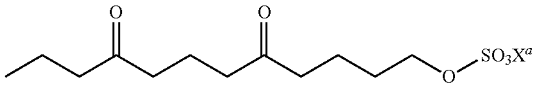
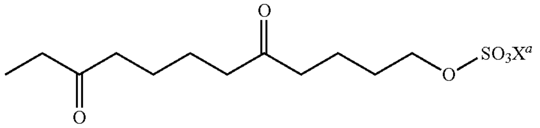
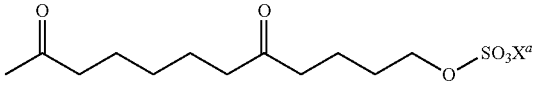
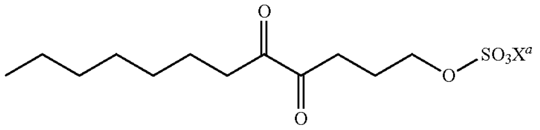
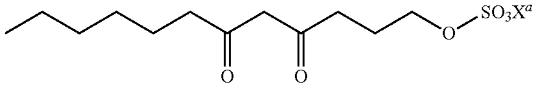
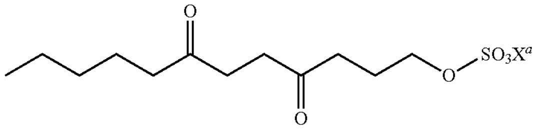
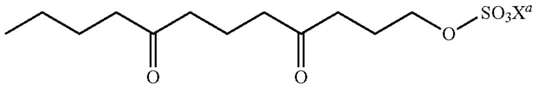
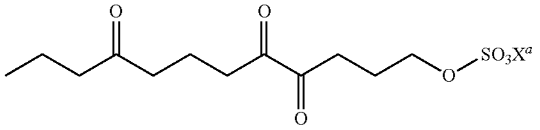
-continued
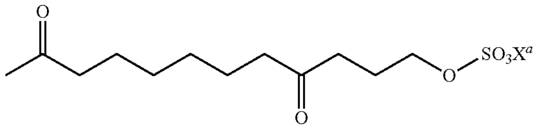
[Chem. 19]
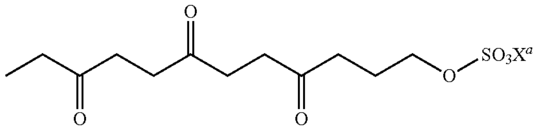
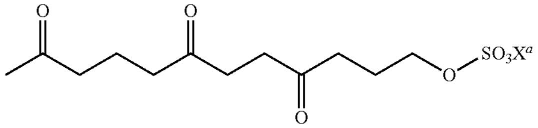
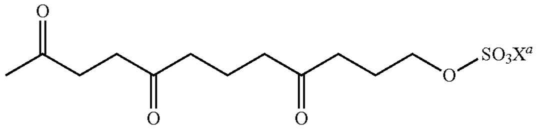
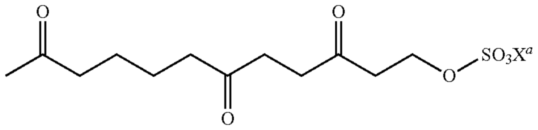
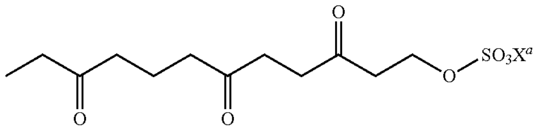
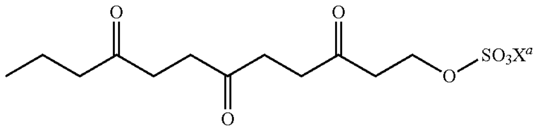
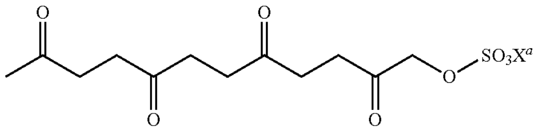
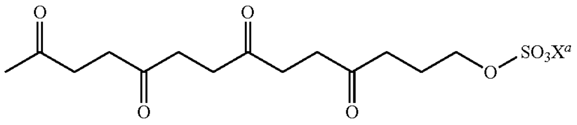
[Chem. 20]
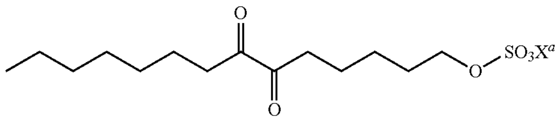
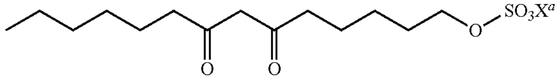
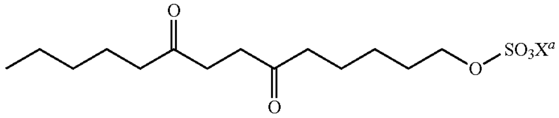
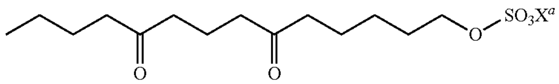

-continued
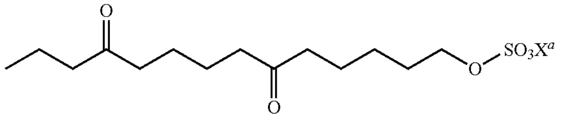
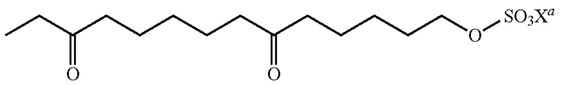
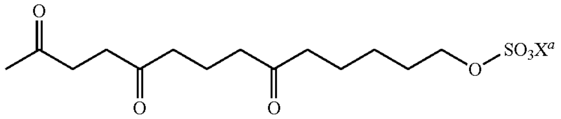
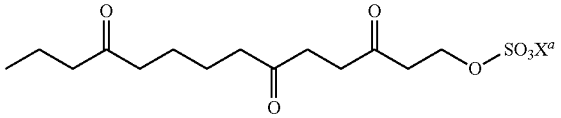
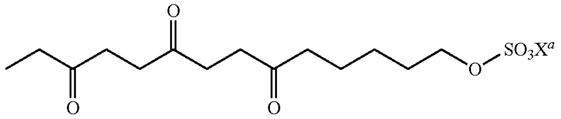
[Chem. 21]
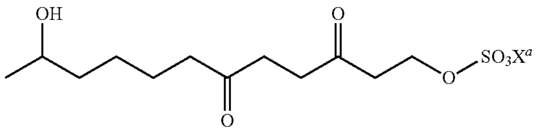
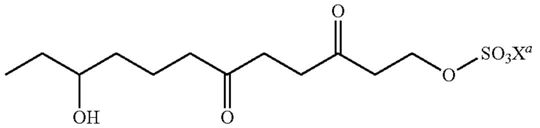
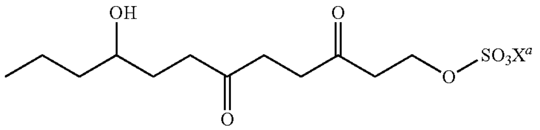
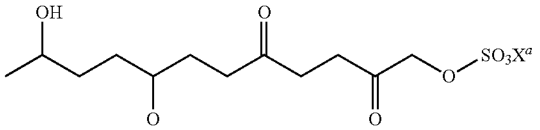
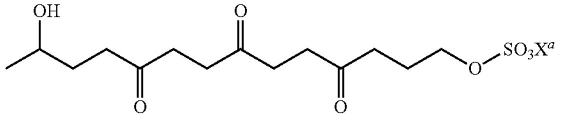
[Chem. 22]
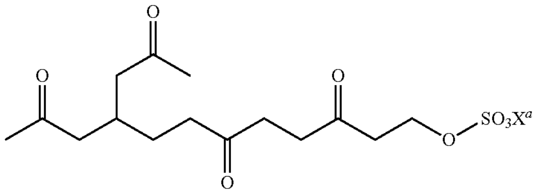
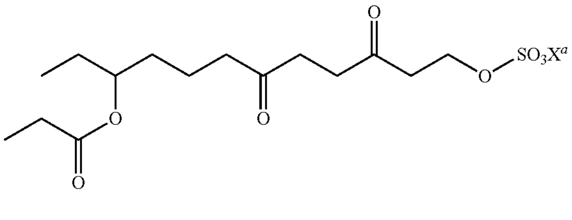
-continued
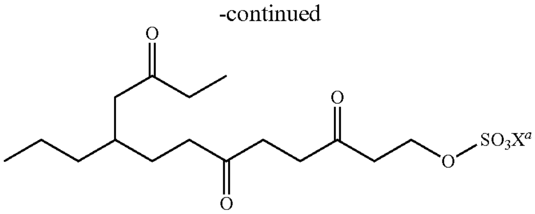
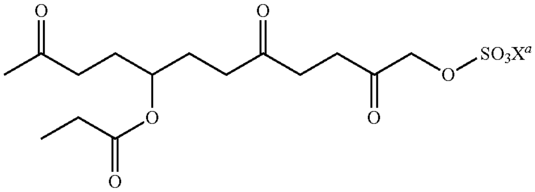
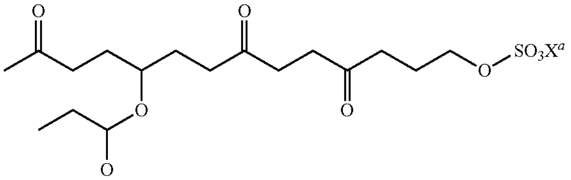
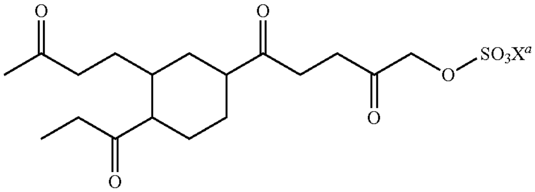
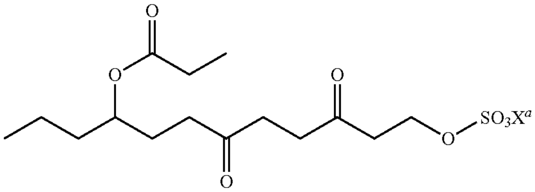
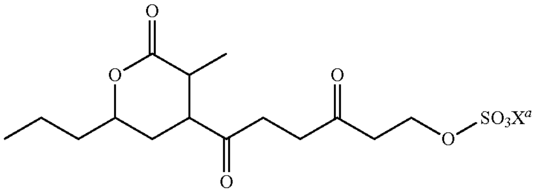
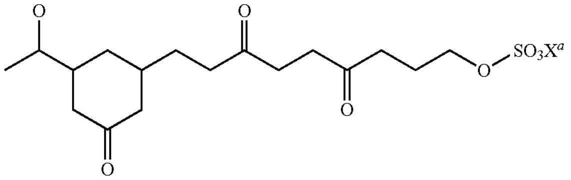
[Chem. 23]
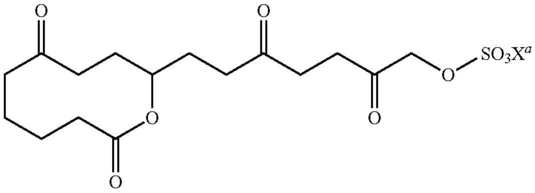
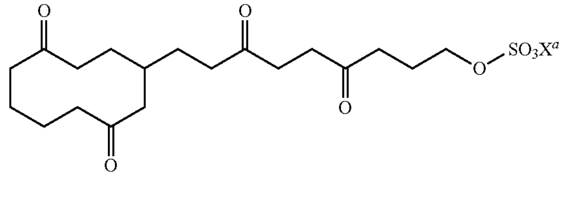

-continued

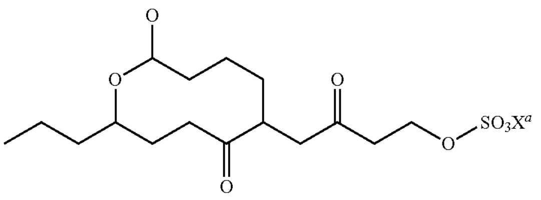

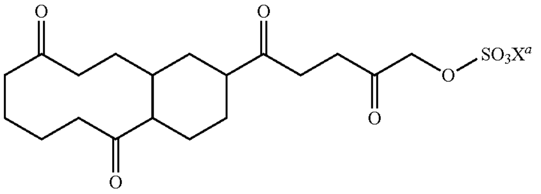

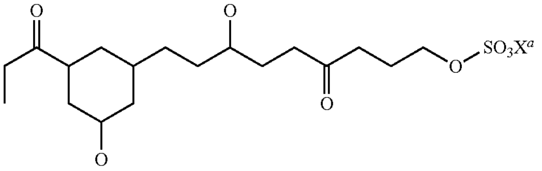

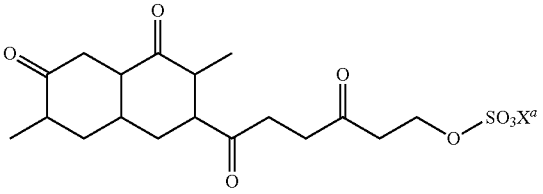

[Chem. 24]

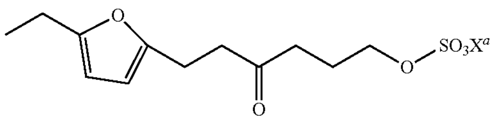

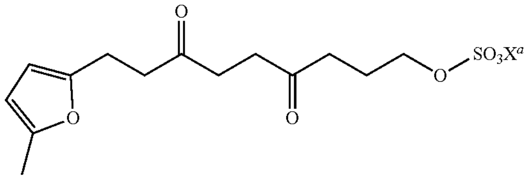

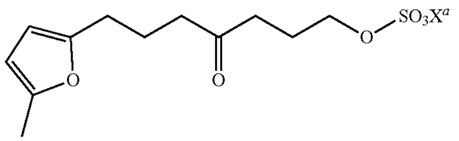

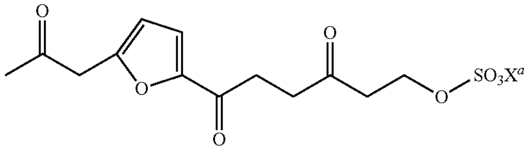

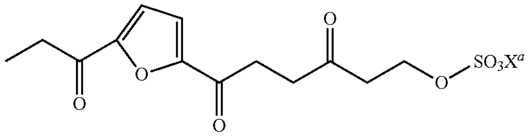

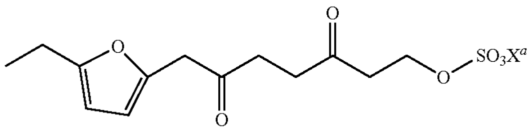

-continued

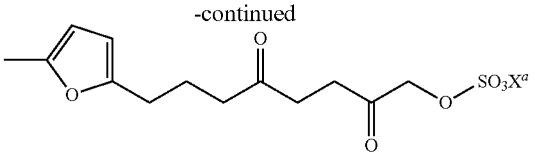

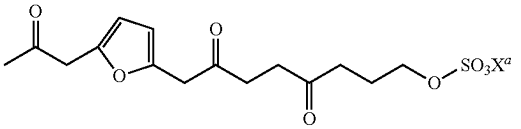

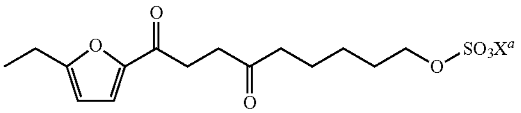

Next, the surfactant (b) is described below.

In the formula (b), $R^{1b}$ is a linear or branched alkyl group having a carbon number of 1 or greater and optionally containing a substituent or a cyclic alkyl having a carbon number of 3 or greater and optionally containing a substituent.

When having a carbon number of 3 or greater, the alkyl group may optionally contain a monovalent or divalent heterocycle, or may optionally form a ring. The heterocycle is preferably an unsaturated heterocycle, more preferably an oxygen-containing unsaturated heterocycle, and may be a furan ring, for example. In $R^{1b}$, a divalent heterocycle may be present between two carbon atoms, a divalent heterocycle may be present at an end and bind to —C(═O)—, or a monovalent heterocycle may be present at an end of the alkyl group.

The "carbon number" of the alkyl group as used herein includes the number of carbon atoms constituting the heterocycles.

The substituent which may be contained in the alkyl group for $R^{1b}$ is preferably a halogen atom, a C1-C10 linear or branched alkyl group, a C3-C10 cyclic alkyl group, or a hydroxy group, particularly preferably a methyl group or an ethyl group.

The alkyl group for $R^{1b}$ is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{1b}$ is preferably a C1-C10 linear or branched alkyl group optionally containing a substituent or a C3-C10 cyclic alkyl group optionally containing a substituent, more preferably a C1-C10 linear or branched alkyl group free from a carbonyl group or a C3-C10 cyclic alkyl group free from a carbonyl group, still more preferably a C1-C10 linear or branched alkyl group free from a substituent, further more preferably a C1-C3 linear or branched alkyl group free from a substituent, particularly preferably a methyl group ($-CH_3$) or an ethyl group ($-C_2H_5$), most preferably a methyl group ($-CH_3$).

In the formula (b), $R^{2b}$ and $R^{4b}$ are each independently H or a substituent; multiple $R^{2b}$s may be the same as or different from each other and multiple $R^{4b}$s may be the same as or different from each other.

The substituent for each of $R^{2b}$ and $R^{4b}$ is preferably a halogen atom, a C1-C10 linear or branched alkyl group, a C3-C10 cyclic alkyl group, or a hydroxy group, particularly preferably a methyl group or an ethyl group.

The alkyl group for each of $R^{2b}$ and $R^{4b}$ is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

The alkyl group for each of $R^{2b}$ and $R^{4b}$ is preferably a C1-C10 linear or branched alkyl group free from a carbonyl group or a C3-C10 cyclic alkyl group free from a carbonyl group, more preferably a C1-C10 linear or branched alkyl group free from a carbonyl group, still more preferably a C1-C3 linear or branched alkyl group free from a substituent, particularly preferably a methyl group ($—CH_3$) or an ethyl group ($—C_2H_5$).

$R^{2b}$ and $R^{4b}$ are preferably each independently H or a C1-C10 linear or branched alkyl group free from a carbonyl group, more preferably H or a C1-C3 linear or branched alkyl group free from a substituent, still more preferably H, a methyl group ($—CH_3$), or an ethyl group ($—C_2H_5$), particularly preferably H.

In the formula (b), $R^{3b}$ is a C1-C10 alkylene group optionally containing a substituent. When multiple $R^{3b}$s are present, they may be the same as or different from each other.

The alkylene group is preferably free from a carbonyl group.

In the alkylene group, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably contains no substituent.

The alkylene group is preferably a C1-C10 linear or branched alkylene group optionally containing a substituent or a C3-C10 cyclic alkylene group optionally containing a substituent, preferably a C1-C10 linear or branched alkylene group free from a carbonyl group or a C3-C10 cyclic alkylene group free from a carbonyl group, more preferably a C1-C10 linear or branched alkylene group free from a substituent, still more preferably a methylene group ($—CH_2—$), an ethylene group ($—C_2H_4—$), an isopropylene group ($—CH(CH_3)CH_2—$), or a propylene group ($—C_3H_6—$).

Any two of $R^{1b}$, $R^{2b}$, $R^{3b}$, and $R^{4b}$ are optionally bonded to each other to form a ring. Preferably, they do not form a ring.

In the formula (b), n is an integer of 1 or greater; n is preferably an integer of 1 to 40, more preferably an integer of 1 to 30, still more preferably an integer of 5 to 25, particularly preferably an integer of 5 to 9 and 11 to 25.

In the formula (b), p and q are each independently an integer of 0 or greater; p is preferably an integer of 0 to 10, more preferably 0 or 1, while q is preferably an integer of 0 to 10, more preferably an integer of 0 to 5.

The sum of n, p, and q is preferably an integer of 5 or greater. The sum of n, p, and q is more preferably an integer of 8 or greater. The sum of n, p, and q is also preferably an integer of 60 or smaller, more preferably an integer of 50 or smaller, still more preferably an integer of 40 or smaller.

In the formula (b), $X^b$ is H, a metal atom, $NR^{5b}_4$, imidazolium optionally containing a substituent, pyridinium optionally containing a substituent, or phosphonium optionally containing a substituent, where $R^{5b}$ is H or an organic group, and the four $R^{5b}$s are the same as or different from each other. The organic group for $R^{5b}$ is preferably an alkyl group. $R^{5b}$ is preferably H or a C1-C10 organic group, more preferably H or a C1-C4 organic group, still more preferably H or a C1-C4 alkyl group. The metal atom may be a monovalent or divalent metal atom, and examples thereof include alkali metals (Group 1) and alkaline earth metals (Group 2). Preferred is Na, K, or Li. $X^b$ may be a metal atom or $NR^{5b}_4$ where $R^{5b}$ is defined as described above.

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, most preferably $NH_4$ because it can be easily removed. When $X^b$ is $NH_4$, the surfactant has excellent solubility in an aqueous medium and the metal component is less likely to remain in PTFE or the final product.

In the formula (b), L is a single bond, $—CO_2—B—*$, $—OCO—B—*$, $—CONR^{6b}—B—*$, $—NR^{6b}CO—B—*$, or $—CO—$ (other than the carbonyl groups in $—CO_2—B—$, $—OCO—B—$, $—CONR^{6b}—B—$, and $—NR^{6}CO—B—$), with B being a single bond or a C1-C10 alkylene group optionally containing a substituent and $R^{6b}$ being H or a C1-C4 alkyl group optionally containing a substituent. The alkylene group more preferably has a carbon number of 1 to 5. $R^{6b}$ is more preferably H or a methyl group. The symbol * indicates the bond to $—OS_3X^b$ in the formula.

L is preferably a single bond.

The surfactant (b) is preferably a compound represented by the formula:

[Chem. 25]

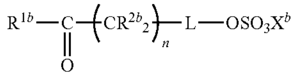

wherein $R^{1b}$, $R^{2b}$, L, n, and $X^b$ are as described above.

The surfactant (b) preferably has a $^1$H-NMR spectrum in which all peak intensities observed in a chemical shift range of 2.0 to 5.0 ppm give an integral value of 10 or greater.

The surfactant (b) preferably has a $^1$H-NMR spectrum in which all peak intensities observed in a chemical shift range of 2.0 to 5.0 ppm give an integral value within the above range. In this case, the surfactant preferably has a ketone structure in the molecule.

As for the surfactant (b), the integral value is more preferably 15 or greater, while preferably 95 or smaller, more preferably 80 or smaller, still more preferably 70 or smaller.

The integral value is determined using a heavy water solvent at room temperature. The heavy water content is adjusted to 4.79 ppm.

Examples of the surfactant (b) include $CH_3C(O)CH_2CH_2CH_2CH_2CH_2CH_2CH_2CH_2CH_2OSO_3Na$, $CH_3C(O)CH_2CH_2CH_2CH_2CH_2CH_2CH_2CH_2OSO_3Na$, $CH_3C(O)CH_2CH_2CH_2CH_2CH_2CH_2CH_2OSO_3Na$, $CH_3C(O)CH_2CH_2CH_2CH_2CH_2CH_2OSO_3Na$, $CH_3C(O)CH_2CH_2CH_2CH_2CH_2OSO_3Na$, $CH_3C(O)$ $CH_2CH_2CH_2CH_2OSO_3Na$, $(CH_3)_3CC(O)CH_2CH_2CH_2CH_2CH_2CH_2CH_2CH_2CH_2OSO_3Na$, $(CH_3)_2CHC(O)CH_2CH_2CH_2CH_2CH_2CH_2CH_2CH_2CH_2OSO_3Na$, $(CH_2)_5CHC(O)CH_2CH_2CH_2CH_2CH_2CH_2CH_2CH_2CH_2OSO_3Na$, $CH_3CH_2C(O)CH_2CH_2CH_2CH_2CH_2CH_2CH_2CH_2OSO_3Na$, $CH_3CH_2CH_2C(O)CH_2CH_2CH_2CH_2CH_2CH_2CH_2OSO_3Na$, $CH_3CH_2CH_2CH_2C(O)CH_2CH_2CH_2CH_2CH_2CH_2OSO_3Na$, $CH_3CH_2CH_2CH_2CH_2C(O)CH_2CH_2CH_2CH_2CH_2OSO_3Na$, $CH_3CH_2CH_2CH_2CH_2CH_2C(O)CH_2CH_2CH_2CH_2OSO_3Na$, $CH_3CH_2CH_2CH_2CH_2CH_2CH_2C(O)CH_2CH_2CH_2OSO_3Na$, $CH_3CH_2CH_2CH_2CH_2CH_2CH_2CH_2C(O)CH_2CH_2OSO_3Na$, $CH_3CH_2CH_2CH_2CH_2CH_2CH_2CH_2CH_2C(O)CH_2OSO_3Na$, $CH_3C(O)CH_2CH_2CH_2CH_2CH_2CH_2CH_2CH_2CH_2OCH_2CH_2OSO_3Na$, $CH_3C(O)CH_2CH_2CH_2CH_2CH_2CH_2CH_2CH_2CH_2C(O)NHCH_2OSO_3Na$, $CH_3C(O)CH_2CH_2CH_2CH_2CH_2CH_2CH_2CH_2CH_2NHC(O)CH_2OSO_3Na$, $CH_3C(O)CH_2CH_2CH_2CH_2CH_2CH_2CH_2CH_2CH_2C(O)OSO_3Na$, $CH_3C(O)CH_2CH_2CH_2CH_2CH_2CH_2CH_2CH_2CH_2C(O)OCH_2OSO_3Na$, $CH_3C(O)CH_2CH_2CH_2CH_2CH_2CH_2CH_2CH_2CH_2OC(O)CH_2OSO_3Na$, $CH_3C(O)CH_2CH_2CH_2CH_2CH_2CH_2CH_2CH_2CH_2OSO_3H$, $CH_3C(O)CH_2CH_2CH_2CH_2CH_2CH_2CH_2CH_2CH_2OSO_3Li$, $CH_3C(O)CH_2CH_2CH_2CH_2CH_2CH_2CH_2CH_2CH_2OSO_3K$, $CH_3C(O)CH_2CH_2CH_2CH_2CH_2CH_2CH_2CH_2CH_2OSO_3NH_4$, $CH_3C(O)CH_2CH_2CH_2CH_2CH_2CH_2CH_2CH_2CH(CH_3)_2OSO_3Na$, $CH_3C(O)CH_2CH_2CH_2CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2OSO_3Na$, $(CH_3)_3CC(O)CH_2CH_2CH_2CH_2CH_2CH_2CH_2CH_2CH_2CH_2CH_2CH_2CH_2CH_2CH_2CH_2CH_2OSO_3Na$, $(CH_3)_2CHC(O)CH_2CH_2CH_2CH_2CH_2CH_2CH_2CH_2CH_2CH_2CH_2CH_2CH_2CH_2CH_2CH_2CH_2OSO_3Na$, $(CH_2)_5CHC(O)CH_2CH_2CH_2CH_2CH_2CH_2CH_2CH_2CH_2CH_2CH_2CH_2CH_2CH_2CH_2CH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2OSO_3Na$, $CH_3CH_2CH_2CH_2CH_2C(O)CH_2CH_2CH_2CH_2CH_2CH_2CH_2CH_2CH_2CH_2CH_2CH_2CH_2OSO_3Na$, $CH_3CH_2CH_2CH_2CH_2CH_2CH_2CH_2C(O)CH_2CH_2CH_2CH_2CH_2CH_2CH_2CH_2CH_2CH_2OSO_3Na$, $CH_3CH_2CH_2CH_2CH_2CH_2CH_2CH_2CH_2CH_2CH_2C(O)CH_2CH_2CH_2CH_2CH_2CH_2CH_2OSO_3Na$, $CH_3CH_2CH_2CH_2CH_2CH_2CH_2CH_2CH_2CH_2CH_2CH_2CH_2CH_2C(O)CH_2CH_2CH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2OCH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2C(O)NHC\ H_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2NHC(O)C\ H_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2C(O)OCH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2OC(O)CH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2C(O)OSO_3Na$, $CH_3CH_2C(O)CH_2CH_2CH_2CH_2CH_2CH_2CH_2CH_2CH_2CH_2CH_2CH_2CH_2CH_2CH_2CH_2OSO_3H$, $CH_3CH_2C(O)CH_2CH_2CH_2CH_2CH_2CH_2CH_2CH_2CH_2CH_2CH_2CH_2CH_2CH_2CH_2CH_2OSO_3Li$, $CH_3CH_2C(O)CH_2CH_2CH_2CH_2CH_2CH_2CH_2CH_2CH_2CH_2CH_2CH_2CH_2CH_2CH_2CH_2OSO_3K$, $CH_3CH_2C(O)CH_2CH_2CH_2CH_2CH_2CH_2CH_2CH_2CH_2CH_2CH_2CH_2CH_2CH_2CH_2CH_2OSO_3NH_4$, and $CH_3C(O)CH_2CH_2CH_2CH_2CH_2CH_2CH_2CH_2CH_2CH_2CH_2CH_2CH_2CH_2CH_2CH_2CH_2CH_2CH_2CH_2CH_2OSO_3Na$.

The surfactant (c) is described below.

In the formula (c), $R^{1c}$ is a linear or branched alkyl group having a carbon number of 1 or greater or a cyclic alkyl having a carbon number of 3 or greater.

When having a carbon number of 3 or greater, the alkyl group may optionally contain a carbonyl group (—C(═O)—) between two carbon atoms. When having a carbon number of 2 or greater, the alkyl group may optionally contain a carbonyl group at an end of the alkyl group. In other words, the alkyl group encompasses an acyl group such as an acetyl group represented by $CH_3$—C(═O)—.

When having a carbon number of 3 or greater, the alkyl group may optionally contain a monovalent or divalent heterocycle, or may optionally form a ring. The heterocycle is preferably an unsaturated heterocycle, more preferably an oxygen-containing unsaturated heterocycle, and may be a furan ring, for example. In $R^{1c}$, a divalent heterocycle may be present between two carbon atoms, a divalent heterocycle may be present at an end and bind to —C(═O)—, or a monovalent heterocycle may be present at an end of the alkyl group.

The "carbon number" of the alkyl group as used herein includes the carbon atoms constituting the carbonyl groups and the carbon atoms constituting the heterocycles. For example, the carbon number of the group represented by $CH_3$—C(═O)—$CH_2$— is 3, the carbon number of the group represented by $CH_3$—C(═O)—$C_2H_4$—C(═O)—$C_2H_4$— is 7, and the carbon number of the group represented by $CH_3$—C(═O)— is 2.

In the alkyl group, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{101c}$ where $R^{101c}$ is an alkyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula (c), $R^{2c}$ and $R^{3c}$ are each independently a single bond or a divalent linking group.

Preferably, $R^{2c}$ and $R^{3c}$ are each independently a single bond, a linear or branched alkylene group having a carbon number of 1 or greater, or a cyclic alkylene group having a carbon number of 3 or greater.

The alkylene group constituting each of $R^{2a}$ and $R^{3a}$ is preferably free from a carbonyl group.

In the alkylene group, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{102c}$ where $R^{102c}$ is an alkyl group.

In the alkylene group, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The sum of the carbon numbers of $R^{1c}$, $R^{2c}$, and $R^{3c}$ is 5 or greater. The sum of the carbon numbers is preferably 7 or greater, more preferably 9 or greater, while preferably 20 or smaller, more preferably 18 or smaller, still more preferably 15 or smaller.

Any two of $R^{1c}$, $R^{2c}$, and $R^{3c}$ may be optionally bonded to each other to form a ring.

In the formula (c), Ac is —$COOX^c$ or —$SO_3X^c$ (where $X^c$ is H, a metal atom, $NR^{4c}_4$, imidazolium optionally containing a substituent, pyridinium optionally containing a substituent, or phosphonium optionally containing a substituent, with $R^{4c}$s each being H or an organic group and being the same as or different from each other). The organic group for $R^{4c}$ is preferably an alkyl group. $R^{4c}$ is preferably H or a C1-C10 organic group, more preferably H or a C1-C4 organic group, still more preferably H or a C1-C4 alkyl group. The metal atom may be a monovalent or divalent metal atom, and examples thereof include alkali metals (Group 1) and alkaline earth metals (Group 2). Preferred is Na, K, or Li.

$X^c$ is preferably H, an alkali metal (Group 1), an alkaline earth metal (Group 2), or $NR^{4c}_4$, more preferably H, Na, K, Li, or $NH_4$ because they are easily dissolved in water, still more preferably Na, K, or $NH_4$ because they are more easily dissolved in water, particularly preferably Na or $NH_4$, most preferably $NH_4$ because it can be easily removed. When $X^c$ is $NH_4$, the surfactant has excellent solubility in an aqueous medium and the metal component is less likely to remain in PTFE or the final product.

$R^{1c}$ is preferably a C1-C8 linear or branched alkyl group free from a carbonyl group, a C3-C8 cyclic alkyl group free from a carbonyl group, a C2-C45 linear or branched alkyl group containing 1 to 10 carbonyl groups, a C3-C45 cyclic alkyl group containing a carbonyl group, or a C3-C45 alkyl group containing a monovalent or divalent heterocycle.

$R^{1c}$ is more preferably a group represented by the following formula:

[Chem. 26]

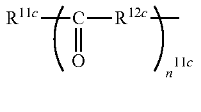

wherein $n^{11c}$ is an integer of 0 to 10; $R^{11c}$ is a C1-C5 linear or branched alkyl group or a C3-C5 cyclic alkyl group; $R^{12c}$ is a C0-C3 alkylene group; and when $n^{11c}$ is an integer of 2 to 10, $R^{12c}$ s are the same as or different from each other.

In the formula, $n^{11c}$ is preferably an integer of 0 to 5, more preferably an integer of 0 to 3, still more preferably an integer of 1 to 3.

The alkyl group for $R^{11c}$ is preferably free from a carbonyl group.

In the alkyl group for $R^{11c}$, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{103c}$ where $R^{103c}$ is an alkyl group.

In the alkyl group for $R^{11c}$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12c}$ is a C0-C3 alkylene group. The carbon number is preferably 1 to 3.

The alkylene group for $R^{12c}$ may be either linear or branched.

The alkylene group for $R^{12c}$ is preferably free from a carbonyl group. $R^{12c}$ is more preferably an ethylene group (—$C_2H_4$—) or a propylene group (—$C_3H_6$—).

In the alkylene group for $R^{12c}$, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{104c}$ where $R^{104c}$ is an alkyl group.

In the alkylene group for $R^{12c}$, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2c}$ and $R^{3c}$ are preferably each independently an alkylene group free from a carbonyl group and having a carbon number of 1 or greater, more preferably a C1-C3 alkylene group free from a carbonyl group, still more preferably an ethylene group (—$C_2H_4$—) or a propylene group (—$C_3H_6$—).

Examples of the surfactant (c) include the following surfactants. In each formula, $A^c$ is defined as described above.

[Chem. 27]

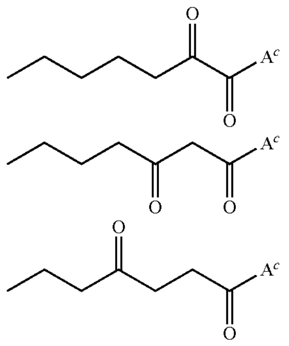

-continued
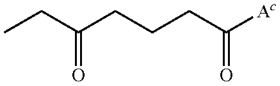
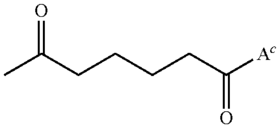
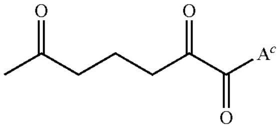
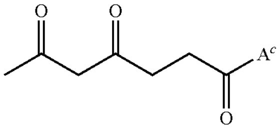
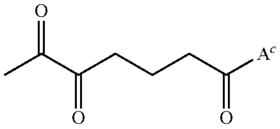
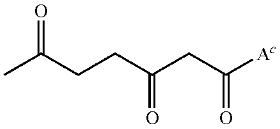
[Chem. 28]
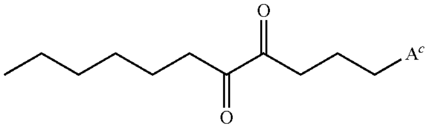
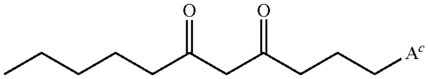
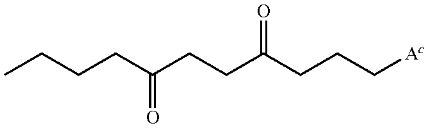
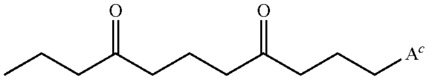
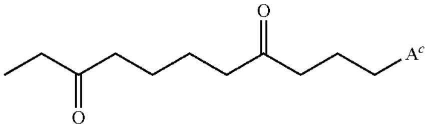
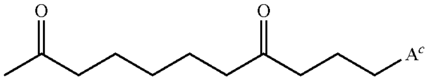
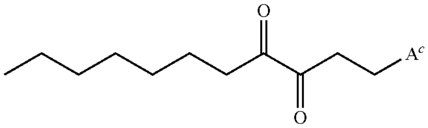
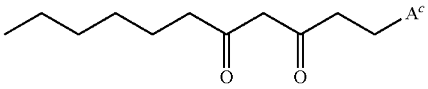
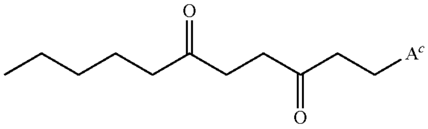
-continued
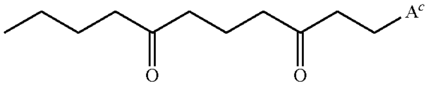
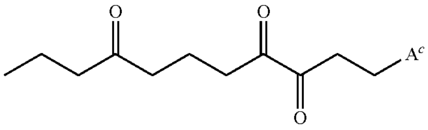
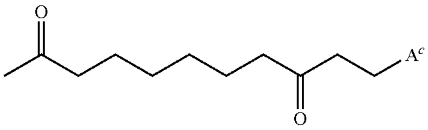
[Chem. 29]
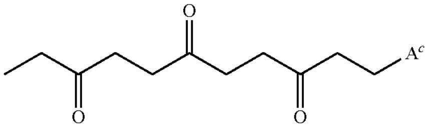
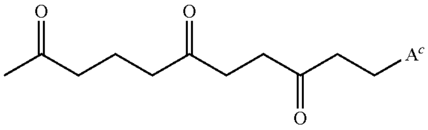
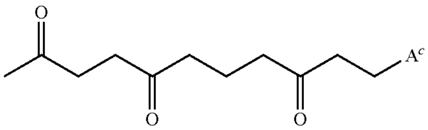
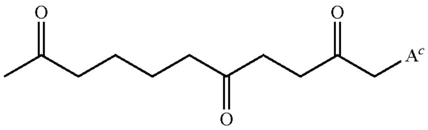
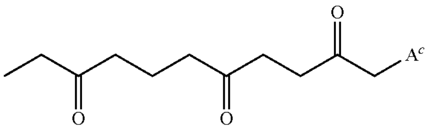
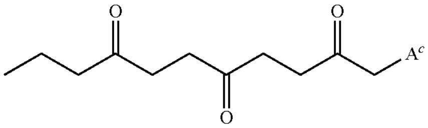
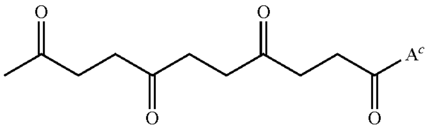
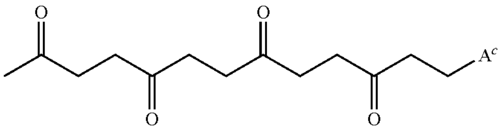
[Chem. 30]
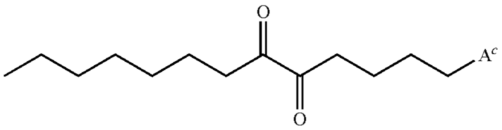
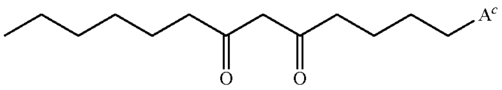

-continued
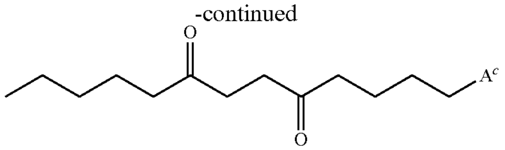
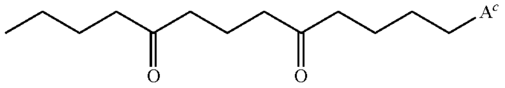
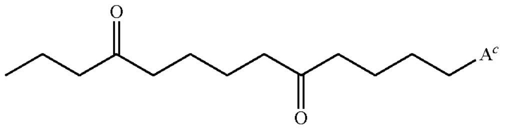
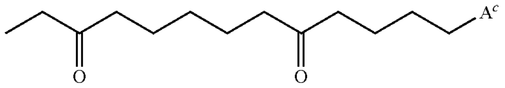
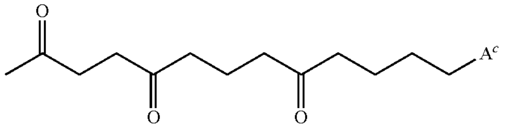
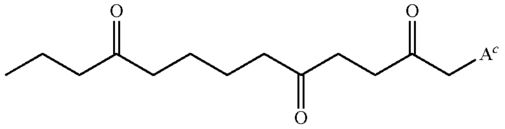
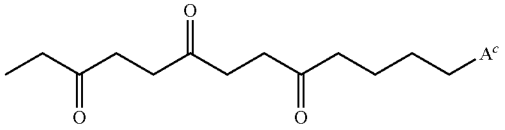
[Chem. 31]
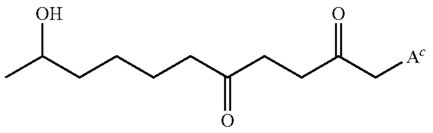
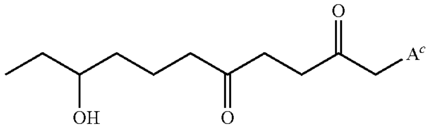
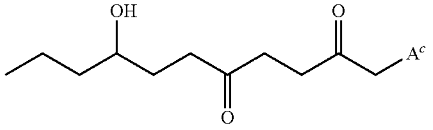
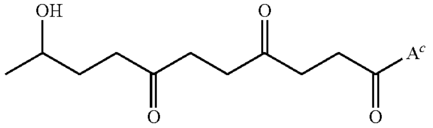
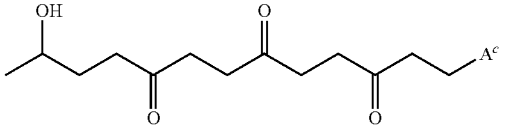
[Chem. 32]
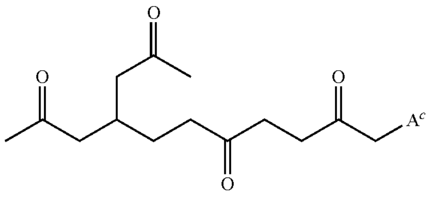
-continued
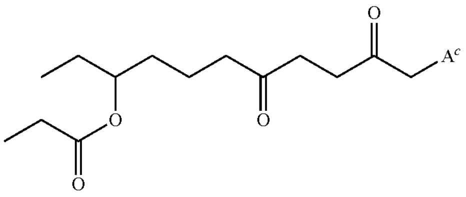
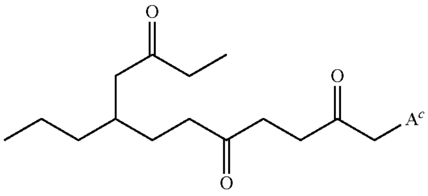
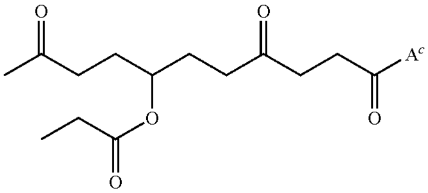
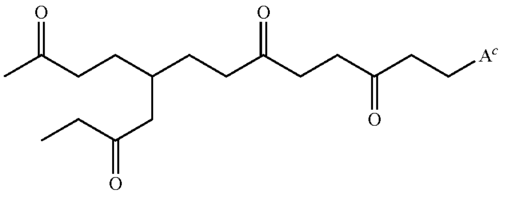
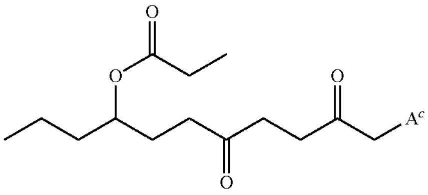
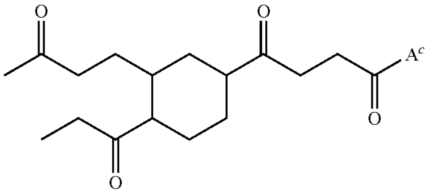
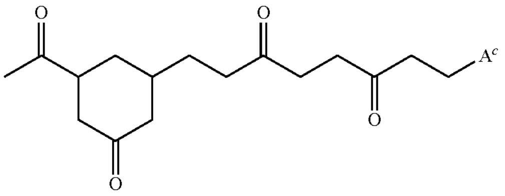
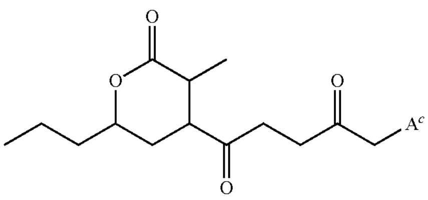

-continued

[Chem. 33]

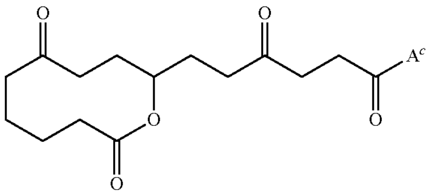

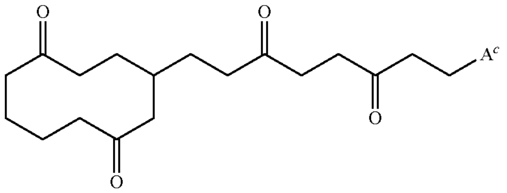

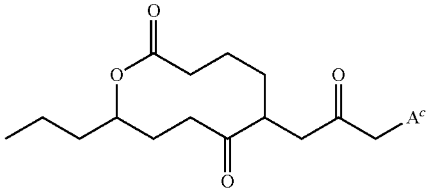

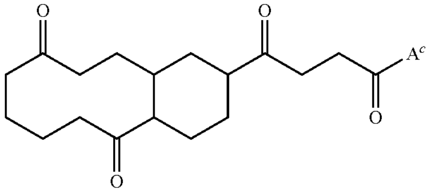

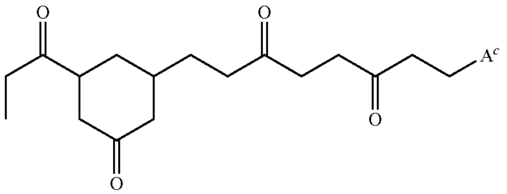

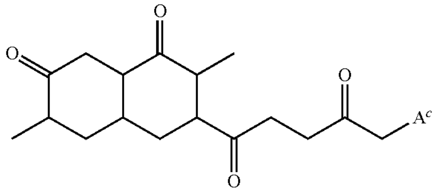

[Chem. 34]

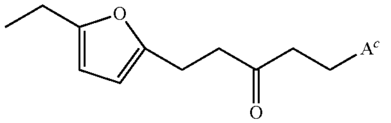

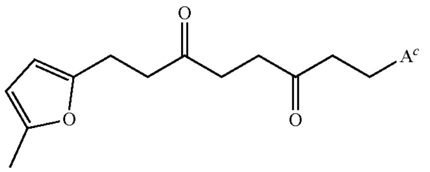

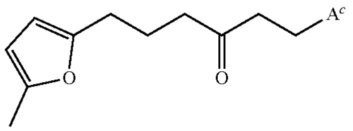

-continued

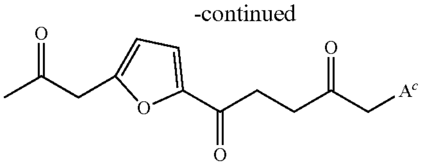

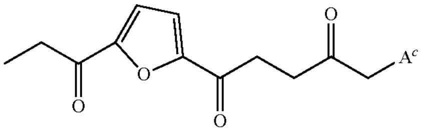

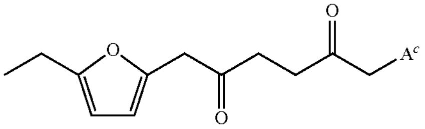

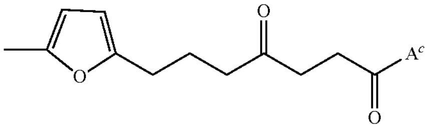

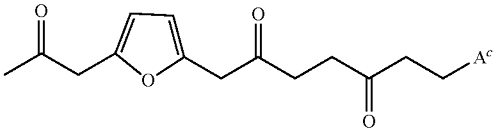

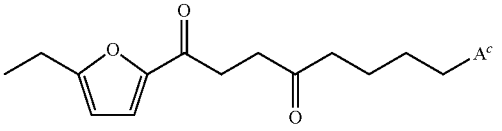

The surfactant (d) is described below.

In the formula (d), $R^{1d}$ is a linear or branched alkyl group having a carbon number of 1 or greater and optionally containing a substituent or a cyclic alkyl having a carbon number of 3 or greater and optionally containing a substituent.

When having a carbon number of 3 or greater, the alkyl group may optionally contain a monovalent or divalent heterocycle, or may optionally form a ring. The heterocycle is preferably an unsaturated heterocycle, more preferably an oxygen-containing unsaturated heterocycle, and may be a furan ring, for example. In $R^{1d}$, a divalent heterocycle may be present between two carbon atoms, a divalent heterocycle may be present at an end and bind to —C(═O)—, or a monovalent heterocycle may be present at an end of the alkyl group.

The "carbon number" of the alkyl group as used herein includes the carbon atoms constituting the heterocycles.

The substituent which may be contained in the alkyl group for $R^{1d}$ is preferably a halogen atom, a C1-C10 linear or branched alkyl group, a C3-C10 cyclic alkyl group, or a hydroxy group, particularly preferably a methyl group or an ethyl group.

The alkyl group for Rid is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{1d}$ is preferably a C1-C10 linear or branched alkyl group optionally containing a substituent or a C3-C10 cyclic alkyl group optionally containing a substituent, more preferably a C1-C10 linear or branched alkyl group free from a carbonyl group or a C3-C10 cyclic alkyl group free from a carbonyl group, still more preferably a C1-C10 linear or branched alkyl group free from a substituent, further more preferably a C1-C3 linear or branched alkyl group free from a substituent, particularly preferably a methyl group ($—CH_3$) or an ethyl group ($—C_2H_5$), most preferably a methyl group ($—CH_3$).

In the formula (d), $R^{2d}$ and $R^{4d}$ are each independently H or a substituent; multiple $R^{2d}$s may be the same as or different from each other and multiple Rods may be the same as or different from each other.

The substituent for each of $R^{2d}$ and $R^{4d}$ is preferably a halogen atom, a C1-C10 linear or branched alkyl group, a C3-C10 cyclic alkyl group, or a hydroxy group, particularly preferably a methyl group or an ethyl group.

The alkyl group for each of $R^{2d}$ and $R^{4d}$ is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

The alkyl group for each of $R^{2d}$ and $R^{4d}$ is preferably a C1-C10 linear or branched alkyl group free from a carbonyl group or a C3-C10 cyclic alkyl group free from a carbonyl group, more preferably a C1-C10 linear or branched alkyl group free from a carbonyl group, still more preferably a C1-C3 linear or branched alkyl group free from a substituent, particularly preferably a methyl group ($—CH_3$) or an ethyl group ($—C_2H_5$).

$R^{2d}$ and $R^{4d}$ are preferably each independently H or a C1-C10 linear or branched alkyl group free from a carbonyl group, more preferably H or a C1-C3 linear or branched alkyl group free from a substituent, still more preferably H, a methyl group ($—CH_3$), or an ethyl group ($—C_2H_5$), particularly preferably H.

In the formula (d), $R^{3d}$ is a C1-C10 alkylene group optionally containing a substituent. When multiple $R^{3d}$s are present, they may be the same as or different from each other.

The alkylene group is preferably free from a carbonyl group.

In the alkylene group, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably contains no substituent.

The alkylene group is preferably a C1-C10 linear or branched alkylene group optionally containing a substituent or a C3-C10 cyclic alkylene group optionally containing a substituent, preferably a C1-C10 linear or branched alkylene group free from a carbonyl group or a C3-C10 cyclic alkylene group free from a carbonyl group, more preferably a C1-C10 linear or branched alkylene group free from a substituent, still more preferably a methylene group ($—CH_2—$), an ethylene group ($—C_2H_4—$), an isopropylene group ($—CH(CH_3)CH_2—$), or a propylene group ($—C_3H_6—$).

Any two of $R^{1d}$, $R^{2d}$, $R^{3d}$, and $R^{4d}$ are optionally bonded to each other to form a ring.

In the formula (d), n is an integer of 1 or greater, and n is preferably an integer of 1 to 40, more preferably an integer of 1 to 30, still more preferably an integer of 5 to 25.

In the formula (d), p and q are each independently an integer of 0 or greater; p is preferably an integer of 0 to 10, more preferably 0 or 1, while q is preferably an integer of 0 to 10, more preferably an integer of 0 to 5.

The sum of n, p, and q is preferably an integer of 6 or greater. The sum of n, p, and q is more preferably an integer of 8 or greater. The sum of n, p, and q is also preferably an integer of 60 or smaller, more preferably an integer of 50 or smaller, still more preferably an integer of 40 or smaller.

In the formula (d), $A^d$ is $—SO_3X^d$ or $—COOX^d$ (where $X^d$ is H, a metal atom, $NR^{5d}_4$, imidazolium optionally containing a substituent, pyridinium optionally containing a substituent, or phosphonium optionally containing a substituent, with $R^{5d}$s each being H or an organic group and being the same as or different from each other). The organic group for $R^{5d}$ is preferably an alkyl group. $R^{5d}$ is preferably H or a C1-C10 organic group, more preferably H or a C1-C4 organic group, still more preferably H or a C1-C4 alkyl group. The metal atom may be a monovalent or divalent metal atom, and examples thereof include alkali metals (Group 1) and alkaline earth metals (Group 2). Preferred is Na, K, or Li. $X^d$ may be a metal atom or $NR^{5d}_4$ where $R^{5d}$ is defined as described above.

$X^d$ is preferably H, an alkali metal (Group 1), an alkaline earth metal (Group 2), or $NR^{5d}_4$, more preferably H, Na, K, Li, or $NH_4$ because they are easily dissolved in water, still more preferably Na, K, or $NH_4$ because they are more easily dissolved in water, particularly preferably Na or $NH_4$, most preferably $NH_4$ because it can be easily removed. When Xd is $NH_4$, the surfactant has excellent solubility in an aqueous medium and the metal component is less likely to remain in PTFE or the final product.

In the formula (d), L is a single bond, $—CO_2—B—*$, $—OCO—B—*$, $—CONR^{6d}—B—*$, $—NR^{6d}CO—B—*$, or $—CO—$ (other than the carbonyl groups in $—CO_2—B—$, $—OCO—B—$, $—CONR^{6d}—B—$, and $—NR^6CO—B—$), with B being a single bond or a C1-C10 alkylene group optionally containing a substituent and $R^{6d}$ being H or a C1-C4 alkyl group optionally containing a substituent. The alkylene group more preferably has a carbon number of 1 to 5. $R^{6d}$ is more preferably H or a methyl group. The symbol * indicates the bond to $A^d$ in the formula.

L is preferably a single bond.

The surfactant preferably has a $^1$H-NMR spectrum in which all peak intensities observed in a chemical shift range of 2.0 to 5.0 ppm give an integral value of 10 or greater.

The surfactant preferably has a $^1$H-NMR spectrum in which all peak intensities observed in a chemical shift range of 2.0 to 5.0 ppm give an integral value within the above range. In this case, the surfactant preferably has a ketone structure in the molecule.

As for the surfactant, the integral value is more preferably 15 or greater, while preferably 95 or smaller, more preferably 80 or smaller, still more preferably 70 or smaller.

The integral value is determined using a heavy water solvent at room temperature. The heavy water content is adjusted to 4.79 ppm.

Examples of the surfactant (d) include $CH_3C(O)CH_2CH_2CH_2CH_2CH_2CH_2CH_2CH_2COOK$, $CH_3C(O)CH_2CH_2CH_2CH_2CH_2CH_2CH_2COONa$, $CH_3C(O)CH_2CH_2CH_2CH_2CH_2CH_2COONa$, $CH_3C(O)CH_2CH_2CH_2CH_2CH_2COONa$, $CH_3C(O)$ $CH_2CH_2CH_2CH_2COONa$, $CH_3C(O)CH_2CH_2CH_2COONa$, $CH_3C(O)CH_2CH_2CH_2CH_2CH_2CH_2CH_2CH_2CH_2CH_2CH_2CH_2CH_2COONa$, $CH_3C(O)CH_2CH_2CH_2CH_2CH_2CH_2CH_2CH_2CH_2CH_2CH_2CH_2CH_2CH_2CH_2CH_2CH_2CH_2COONa$, $(CH_3)_3CC(O)CH_2CH_2CH_2CH_2CH_2CH_2CH_2CH_2COONa$, $(CH_3)_2CHC(O)CH_2CH_2CH_2CH_2CH_2CH_2CH_2CH_2COONa$, $(CH_2)_5CHC(O)CH_2CH_2CH_2CH_2CH_2CH_2CH_2CH_2COONa$, $CH_3CH_2C(O)CH_2CH_2CH_2CH_2CH_2CH_2CH_2COONa$, $CH_3CH_2CH_2C(O)CH_2CH_2CH_2CH_2CH_2CH_2COONa$, $CH_3CH_2CH_2CH_2C(O)CH_2CH_2CH_2CH_2CH_2COONa$, $CH_3CH_2CH_2CH_2CH_2C(O)CH_2CH_2CH_2CH_2COONa$, $CH_3CH_2CH_2CH_2CH_2CH_2C(O)CH_2CH_2CH_2COONa$, $CH_3CH_2CH_2CH_2CH_2CH_2CH_2C(O)CH_2CH_2COONa$, $CH_3CH_2CH_2CH_2CH_2CH_2CH_2CH_2C(O)CH_2COONa$, $CH_3C(O)CH_2CH_2CH_2CH_2CH_2CH_2CH_2CH_2OCH_2CH_2COONa$, $CH_3C(O)CH_2CH_2CH_2CH_2CH_2CH_2CH_2CH_2C(O)NHCH_2COOK$, $CH_3C(O)CH_2CH_2CH_2CH_2CH_2CH_2CH_2CH_2NHC(O)CH_2COOK$, $CH_3C(O)CH_2CH_2CH_2CH_2CH_2CH_2CH_2CH_2C(O)OCH_2COONa$, $CH_3C(O)CH_2CH_2CH_2CH_2CH_2CH_2CH_2CH_2OC(O)CH_2COONa$, $CH_3C(O)CH_2CH_2CH_2CH_2CH_2CH_2CH_2CH_2C(O)COONa$, $CH_3C(O)CH_2CH_2CH_2CH_2CH_2CH_2CH_2CH_2C(O)COOH$, $CH_3C(O)CH_2CH_2CH_2CH_2CH_2CH_2CH_2CH_2C(O)COOLi$, $CH_3C(O)CH_2CH_2CH_2CH_2CH_2CH_2CH_2CH_2C(O)COONH_4$, $CH_3C(O)CH_2CH_2CH_2CH_2CH_2CH_2CH_2C(O)COONa$, $CH_3C(O)CH_2CH_2CH_2CH_2CH_2CH_2CH_2C(CH_3)_2COOK$, $CH_3C(O)CH_2CH_2CH_2CH_2CH_2CH_2CH_2CH_2CH_2SO_3Na$, $CH_3C(O)CH_2CH_2CH_2CH_2CH_2CH_2CH_2CH_2SO_3Na$, $CH_3C(O)CH_2CH_2CH_2CH_2CH_2CH_2CH_2SO_3Na$, $CH_3C(O)CH_2CH_2CH_2CH_2CH_2CH_2SO_3Na$, $CH_3C(O)CH_2CH_2CH_2CH_2CH_2SO_3Na$, $CH_3C(O)CH_2CH_2CH_2CH_2SO_3Na$, $CH_3C(O)CH_2CH_2CH_2CH_2CH_2CH_2CH_2CH_2CH_2CH_2CH_2CH_2CH_2SO_3Na$, $CH_3C(O)CH_2CH_2CH_2CH_2CH_2CH_2CH_2CH_2CH_2CH_2CH_2CH_2CH_2CH_2CH_2CH_2CH_2CH_2SO_3Na$, $CH_3C(O)CH_2CH_2CH_2CH_2CH_2CH_2CH_2CH_2CH_2CH_2SO_3Na$, $(CH_3)_3CC(O)CH_2CH_2CH_2CH_2CH_2CH_2CH_2CH_2CH_2SO_3Na$, $(CH_3)_2CHC(O)CH_2CH_2CH_2CH_2CH_2CH_2CH_2CH_2CH_2SO_3Na$, $(CH_2)_5CHC(O)CH_2CH_2CH_2CH_2CH_2CH_2CH_2CH_2CH_2SO_3Na$, $CH_3C(O)CH_2CH_2CH_2CH_2CH_2CH_2CH_2CH_2SO_3Na$, $CH_3C(O)CH_2CH_2CH_2CH_2CH_2CH_2CH_2SO_3Na$, $CH_3C(O)CH_2CH_2CH_2CH_2CH_2CH_2SO_3Na$, $CH_3C(O)CH_2CH_2CH_2CH_2CH_2SO_3Na$, $CH_3C(O)CH_2CH_2CH_2CH_2SO_3Na$, $CH_3C(O)CH_2CH_2CH_2SO_3Na$, $CH_3C(O)CH_2CH_2SO_3Na$, $CH_3C(O)CH_2SO_3Na$, $CH_3C(O)CH_2CH_2CH_2CH_2CH_2CH_2CH_2CH_2CH_2OCH_2CH_2CH_2SO_3Na$, $CH_3C(O)CH_2CH_2CH_2CH_2CH_2CH_2CH_2CH_2CH_2C(O)NHCH_2SO_3Na$, $CH_3C(O)CH_2CH_2CH_2CH_2CH_2CH_2CH_2CH_2CH_2NHC(O)CH_2SO_3Na$, $CH_3C(O)CH_2CH_2CH_2CH_2CH_2CH_2CH_2CH_2CH_2C(O)SO_3Na$, $CH_3C(O)CH_2CH_2CH_2CH_2CH_2CH_2CH_2CH_2CH_2C(O)OCH_2SO_3Na$, $CH_3C(O)CH_2CH_2CH_2CH_2CH_2CH_2CH_2CH_2CH_2OC(O)CH_2SO_3Na$, $CH_3C(O)CH_2CH_2CH_2CH_2CH_2CH_2CH_2CH_2CH_2SO_3H$, $CH_3C(O)CH_2CH_2CH_2CH_2CH_2CH_2CH_2CH_2CH_2SO_3K$, $CH_3C(O)CH_2CH_2CH_2CH_2CH_2CH_2CH_2CH_2CH_2SO_3Li$, $CH_3C(O)CH_2CH_2CH_2CH_2CH_2CH_2CH_2CH_2CH_2SO_3NH_4$, and $CH_3C(O)CH_2CH_2CH_2CH_2CH_2CH_2CH_2CH_2C(CH_3)_2SO_3Na$.

An example of the anionic hydrocarbon surfactant is a surfactant (hereinafter, also referred to as a surfactant (1)) represented by the following formula (1-0):

[Chem. 35]

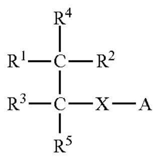

wherein $R^1$ to $R^5$ are each H or a monovalent substituent, with at least one selected from the group consisting of $R^1$ and $R^3$ being a group represented by the formula: —Y—$R^6$ and at least one selected from the group consisting of $R^2$ and $R^5$ being a group represented by the formula: —X-A or a group represented by the formula: —Y—$R^6$;

Xs in each case are the same as or different from each other and are each a divalent linking group or a bond;

A's in each case are the same as or different from each other and are each —COOM, —$SO_3M$, or —$OSO_3M$ (M is H, a metal atom, $NR^7_4$, imidazolium optionally containing a substituent, pyridinium optionally containing a substituent, or phosphonium optionally containing a substituent, with $R^7$ being H or an organic group);

Ys in each case are the same as or different from each other and are each a divalent linking group selected from the group consisting of —S(═O)$_2$—, —O—, —COO—, —OCO—, —CONR$^8$—, and —NR$^8$CO— or a bond, with $R^8$ being H or an organic group;

$R^6$s in each case are the same as or different from each other and are each an alkyl group having a carbon number of 2 or greater and optionally containing at least one selected from the group consisting of carbonyl, ester, amide, and sulfonyl groups between carbon atoms; and any two of $R^1$ to $R^5$ are optionally bonded to each other to form a ring.

The surfactant (1) is described below.

In the formula, $R^2$ to $R^5$ are each H or a monovalent substituent, with at least one selected from the group consisting of $R^2$ and $R^3$ being a group represented by the formula: —Y—$R^6$ and at least one selected from the group consisting of $R^2$ and $R^5$ being a group represented by the formula: —X-A or a group represented by the formula: —Y—$R^6$. Any two of $R^1$ to $R^5$ are optionally bonded to each other to form a ring.

The substituent which may be contained in the alkyl group for $R^1$ is preferably a halogen atom, a C1-C10 linear or branched alkyl group, a C3-C10 cyclic alkyl group, or a hydroxy group, particularly preferably a methyl group or an ethyl group.

The alkyl group for $R^1$ is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^1$ is preferably a C1-C10 linear or branched alkyl group optionally containing a substituent or a C3-C10 cyclic alkyl group optionally containing a substituent, more preferably a C1-C10 linear or branched alkyl group free from a carbonyl group or a C3-C10 cyclic alkyl group free from a carbonyl group, still more preferably a C1-C10 linear or branched alkyl group free from a substituent, further more preferably a C1-C3 linear or branched alkyl group free from a substituent, particularly preferably a methyl group ($—CH_3$) or an ethyl group (—C2H5), most preferably a methyl group ($—CH_3$).

The monovalent substituent is preferably a group represented by the formula: $—Y—R^6$, a group represented by the formula: —X-A, —H, a C1-C20 alkyl group optionally containing a substituent, $—NH_2$, $—NHR^9$, with $R^9$ being an organic group, —OH, —COORS, with $R^9$ being an organic group, or $—OR^9$, with $R^9$ being an organic group. The alkyl group preferably has a carbon number of 1 to 10.

$R^9$ is preferably a C1-C10 alkyl group or a C1-C10 alkyl carbonyl group, more preferably a C1-C4 alkyl group or a C1-C4 alkyl carbonyl group.

In the formula, Xs in each case are the same as or different from each other and are each a divalent linking group or a bond.

When $R^6$ is free from any of carbonyl, ester, amide, and sulfonyl groups, X is preferably a divalent linking group containing at least one selected from the group consisting of carbonyl, ester, amide, and sulfonyl groups.

X is preferably a divalent linking group containing at least one bond selected from the group consisting of —CO—, $—S(=O)_2—$, —O—, —COO—, —OCO—, $—S(=O)_2—O—$, $—O—S(=O)_2—$, $—CONR^8—$, and $—NR^8CO$, a C1-C10 alkylene group, or a bond. $R^8$ is H or an organic group.

The organic group for $R^8$ is preferably an alkyl group. $R^8$ is preferably H or a C1-C10 organic group, more preferably H or a C1-C4 organic group, still more preferably H or a C1-C4 alkyl group, further more preferably H.

In the formula, A's in each case are the same as or different from each other and are each —COOM, $—SO_3M$, or $—OSO_3M$ (M is H, a metal atom, $NR^7_4$, imidazolium optionally containing a substituent, pyridinium optionally containing a substituent, or phosphonium optionally containing a substituent, with $R^7$ being H or an organic group and the four $R^7$s being the same as or different from each other).

The organic group for $R^7$ is preferably an alkyl group. $R^7$ is preferably H or a C1-C10 organic group, more preferably H or a C1-C4 organic group, still more preferably H or a C1-C4 alkyl group.

Examples of the metal atom include alkali metals (Group 1) and alkaline earth metals (Group 2). Preferred is Na, K, or Li.

M is preferably H, a metal atom, or $—NR^7_4$, more preferably H, an alkali metal (Group 1), an alkaline earth metal (Group 2), or $NR^7_4$, still more preferably H, Na, K, Li, or $NH_4$, further more preferably Na, K, or $NH_4$, particularly preferably Na or $NH_4$, most preferably $NH_4$.

In the formula, Ys in each case are the same as or different from each other and are each a divalent linking group selected from the group consisting of $—S(=O)_2—$, —O—, —COO—, —OCO—, $—CONR^8—$, and $—NR^8CO—$ or a bond, with $R^8$ being H or an organic group.

Y is preferably a bond or a divalent linking group selected from the group consisting of —O—, —COO—, —OCO—, $—CONR^8—$, and $—NR^8CO—$, more preferably a bond or a divalent linking group selected from the group consisting of —COO— and —OCO—.

The organic group for $R^8$ is preferably an alkyl group. $R^8$ is preferably H or a C1-C10 organic group, more preferably H or a C1-C4 organic group, still more preferably H or a C1-C4 alkyl group, further mores preferably H.

In the formula, $R^6$s in each case are the same as or different from each other and are each an alkyl group having a carbon number of 2 or greater and optionally containing at least one selected from the group consisting of carbonyl, ester, amide, and sulfonyl groups between carbon atoms. The organic group for $R^6$ preferably has a carbon number of 2 to 20, more preferably 2 to 10.

The alkyl group for $R^6$ may contain one or two or more of at least one selected from the group consisting of carbonyl, ester, amide, and sulfonyl groups between carbon atoms, with none of these groups being present in an end of the alkyl group. In the alkyl group for $R^6$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^6$ is preferably a group represented by the formula: $—R^{10}—CO—R^{11}$, a group represented by the formula: $—R^{10}—COO—R^{11}$, a group represented by the formula: $—R^{11}$, a group represented by the formula: $—R^{10}—NR^8CO—R^{11}$, or a group represented by the formula: $—R^{10}—CONR^8—R^{11}$, wherein $R^8$ is H or an organic group, $R^{10}$ is an alkylene group, and $R^{11}$ is an alkyl group optionally containing a substituent.

More preferably, $R^6$ is a group represented by the formula: $—R^{10}—CO—R^{11}$.

The organic group for $R^8$ is preferably an alkyl group. $R^8$ is preferably H or a C1-C10 organic group, more preferably H or a C1-C4 organic group, still more preferably H or a C1-C4 alkyl group, further more preferably H.

The alkylene group for $R^{10}$ preferably has a carbon number of 1 or greater, more preferably 3 or greater, while preferably 20 or smaller, more preferably 12 or smaller, still more preferably 10 or smaller, particularly preferably 8 or smaller. The alkylene group for $R^{10}$ preferably has a carbon number of 1 to 20, more preferably 1 to 10, still more preferably 3 to 10.

The alkyl group for $R^{11}$ may have a carbon number of 1 to 20, preferably 1 to 15, more preferably 1 to 12, still more preferably 1 to 10, further more preferably 1 to 8, much more preferably 1 to 6, much more preferably 1 to 3, particularly preferably 1 or 2, most preferably 1. The alkyl group for $R^{11}$ preferably consists of a primary carbon, a secondary carbon, and a tertiary carbon, particularly preferably consists of a primary carbon and a secondary carbon. Specifically, $R^{11}$ is preferably a methyl group, an ethyl group, a n-propyl group, or an isopropyl group, most preferably a methyl group.

The surfactant (1) is preferably a compound represented by the formula (1-1), a compound represented by the formula (1-2), or a compound represented by the formula (1-3), more preferably a compound represented by the formula (1-1) or a compound represented by the formula (1-2).

The formula (1-1) is as follows:

[Chem. 36]

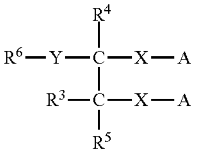

wherein $R^3$ to $R^6$, X, A, and Y are defined as described above.

The formula (1-2) is as follows:

[Chem. 37]

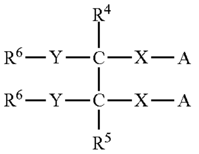

wherein $R^4$ to $R^6$, X, A, and Y are defined as described above.

The formula (1-3) is as follows:

[Chem. 38]

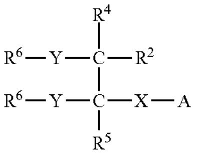

wherein $R^2$, $R^4$ to $R^6$, X, A, and Y are defined as described above.

The group represented by the formula: —X-A is preferably

—COOM,
—$R^{12}$COOM,
—$SO_3M$,
—$OSO_3M$,
—$R^{12}SO_3M$,
—$R^{12}OSO_3M$,
—OCO—$R^{12}$—COOM,
—OCO—$R^{12}$—$SO_3M$,
—OCO—$R^{12}$—$OSO_3M$,
—COO—$R^{12}$—COOM,
—COO—$R^{12}$—$SO_3M$,
—COO—$R^{12}$—$OSO_3M$,
—$CONR^8$—$R^{12}$—COOM,
—$CONR^8$—$R^{12}$—$SO_3M$,
—$CONR^8$—$R^{12}$—$OSO_3M$,
—$NR^8CO$—$R^{12}$—COOM,
—$NR^8CO$—$R^{12}$—$SO_3M$,
—$NR^8CO$—$R^{12}$—$OSO_3M$,
—OS(=O)$_2$—$R^{12}$—COOM,
—OS(=O)$_2$—$R^{12}$—$SO_3M$, or
—OS(=O)$_2$—$R^{12}$—$OSO_3M$, wherein $R^8$ and M are defined as described above and $R^{12}$ is a C1-C10 alkylene group.

In the alkylene group for $R^{12}$, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The group represented by the formula: —Y—$R^6$ is preferably a group represented by the formula: —$R^{10}$—CO—$R^{11}$,
a group represented by the formula: —OCO—$R^{10}$—CO—$R^{11}$,
a group represented by the formula: —COO—$R^{10}$—CO—$R^{11}$,
a group represented by the formula: —OCO—$R^{10}$—COO—$R^{11}$,
a group represented by the formula: —COO—$R^{11}$,
a group represented by the formula: —$NR^8CO$—$R^{10}$—CO—$R^{11}$, or
a group represented by the formula: —$CONR^8$—$R^{10}$—$NR^8CO$—$R^{11}$, where $R^8$, $R^{10}$, and $R^{11}$ are defined as described above.

In the formula, $R^4$ and $R^5$ are each preferably independently H or a C1-C4 alkyl group.

In the alkyl group for each of $R^4$ and $R^5$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^3$ in the formula (1-1) is preferably H or a C1-C20 alkyl group optionally containing a substituent, more preferably H or a C1-C20 alkyl group free from a substituent, still more preferably H.

In the alkyl group for $R^3$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^2$ in the formula (1-3) is preferably H, OH, or C1-C20 alkyl group optionally containing a substituent, more preferably H, OH, or a C1-C20 alkyl group free from a substituent, still more preferably H or OH.

In the alkyl group for $R^2$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

Another example of the anionic hydrocarbon surfactant is a surfactant (1-0A) represented by the following formula (1-0A):

[Chem. 39]

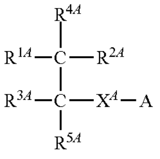

wherein $R^{1A}$ to $R^{5A}$ are each H, a monovalent hydrocarbon group optionally containing an ester group between carbon atoms, or a group represented by the formula: $—X^A$-A, with at least one selected from the group consisting of $R^{2A}$ and $R^{5A}$ being a group represented by the formula: $—X^A$-A;

$X^A$s in each case are the same as or different from each other and are each a divalent hydrocarbon group or a bond;

A's in each case are the same as or different from each other and are each —COOM (M is H, a metal atom, $NR^7_4$, imidazolium optionally containing a substituent, pyridinium optionally containing a substituent, or phosphonium optionally containing a substituent, with $R^7$ being H or an organic group); and any two of $R^{1A}$ to $R^{5A}$ are optionally bonded to each other to form a ring.

In the formula (1-0A), the monovalent hydrocarbon group optionally containing an ester group between carbon atoms for each of $R^{1A}$ to $R^{5A}$ preferably has a carbon number of 1 to 50, more preferably 5 to 20. Any two of $R^{1A}$ to $R^{5A}$ are optionally bonded to each other to form a ring. The monovalent hydrocarbon group optionally containing an ester group between carbon atoms is preferably an alkyl group.

In the formula, the divalent hydrocarbon group for $X^A$ preferably has a carbon number of 1 to 50, more preferably 5 to 20. Examples of the divalent hydrocarbon group include an alkylene group and an alkanediyl group. Preferred is an alkylene group.

In the formula (1-0A), either $R^{2A}$ or $R^{5A}$ is preferably a group represented by the formula: $—X^A$-A, with $R^{2A}$ being more preferably a group represented by the formula: $—X^A$-A.

In a preferred embodiment, in the formula (1-0A), $R^{2A}$ is a group represented by the formula: —XA-A, and $R^{1A}$, $R^{3A}$, $R^{4A}$, and $R^{5A}$ are each H. In this case, $X^A$ is preferably a bond or a C1-C5 alkylene group.

In a preferred embodiment, in the formula (1-0A), $R^{2A}$ is a group represented by the formula: —XA-A, $R^{1A}$ and $R^{3A}$ are each a group represented by —YA-$R^6$, YAs in each case are the same as or different from each other and are each —COO—, —OCO—, or a bond, and $R^6$s in each case are the same as or different from each other and are each an alkyl group having a carbon number of 2 or greater. In this case, $R^{4A}$ and $R^{5A}$ are each preferably H.

Examples of the hydrocarbon surfactant represented by the formula (1-0A) include glutaric acid and a salt thereof, adipic acid and a salt thereof, pimelic acid and a salt thereof, suberic acid and a salt thereof, azelaic acid and a salt thereof, and sebacic acid and a salt thereof.

An aliphatic carboxylic acid hydrocarbon surfactant represented by the formula (1-0A) may be a double-chain, double-hydrophilic-group synthetic surfactant, and examples thereof include gemini surfactants including Gemsurf (Chukyo Yushi Co., Ltd.) such as Gemsurf α142 (carbon number 12, lauryl group), Gemsurf α102 (carbon number 10), and Gemsurf α182 (carbon number 14).

The hydrocarbon surfactant may be one having been subjected to radical treatment or oxidation treatment.

The radical treatment is any treatment of generating radicals in the hydrocarbon surfactant. Specifically, it is a treatment in which a reactor is charged with deionized water and a hydrocarbon surfactant and is sealed, the inside of the system is purged with nitrogen, the reactor is heated and pressurized and charged with a polymerization initiator, the contents are stirred for a certain period of time, and the reactor is depressurized to atmospheric pressure and cooled. The oxidation treatment is a treatment of adding an oxidant to the hydrocarbon surfactant. Examples of the oxidant include oxygen, ozone, hydrogen peroxide water, manganese(IV) oxide, potassium permanganate, potassium dichromate, nitric acid, and sulfur dioxide.

In the production method of the disclosure, two or more of the hydrocarbon surfactants may be used at the same time.

In the production method of the disclosure, the polymerizing step may be performed in the presence of a fluorine-free nonionic surfactant. The nonionic surfactant preferably includes at least one selected from the group consisting of:

a block polymer represented by the formula (250):

$$H(OR^{251})_u(OR^{252})_vOH$$

(wherein $R^{251}$ and $R^{252}$ are each an alkylene group having a carbon number of 1 to 4 and are different from each other; and u and v are each an integer of 1 to 5);

a nonionic surfactant containing a hydrophobic group that contains a C8-C20 hydrocarbon group and a hydrophilic group that contains a polyalkylene oxide in a molecule; and a silicon compound represented by the formula (260):

$$R^{261}{}_m—Si—(OR^{262})_{4-m}$$

(wherein $R^{261}$ is a C1-C12 alkyl group; $R^{262}$ is a C1-C4 alkyl group; and m is an integer of 1 to 3).

Specific examples of the block polymer represented by the formula (250) include block polymers containing at least two segments selected from the group consisting of polyoxyethylene, polyoxypropylene, and polyoxybutylene. Examples thereof include polyoxyethylene-polyoxypropylene block polymers and polyoxyethylene-polyoxybutylene block polymers. Not only A-B block polymers but also A-B-A block polymers are preferred. More preferably, use of a polyoxyethylene-polyoxypropylene block polymer or a polyoxypropylene-polyoxyethylene-polyoxypropylene block polymer can lead to a stable fluoropolymer dispersion having a high concentration. In order to reduce generation of agglomerates possibly due to re-agglomeration, the polyoxyethylene segment preferably represents 10% to 50%. In order to provide a fluoropolymer dispersion having low viscosity, the polyoxyethylene segment preferably represents 20% to 40%. The polyoxyethylene segment may have a molecular weight of, but not limited to, 1000 to 7000 g/mol. In particular, the polyoxyethylene segment having a molecular weight of 2500 to 6500 g/mol can lead to a dispersion having low viscosity and excellent dispersibility.

The surfactant is preferably a compound free from a perfluoroalkyl group having a carbon number of 3 or greater. Specific examples thereof include compounds free from a perfluoroalkyl group having a carbon number of 3 or greater among the above-described hydrocarbon surfactants and the above-described fluorine-containing surfactants.

The surfactant is more preferably a compound free from a perfluoroalkyl group having a carbon number of 2 or greater, still more preferably a compound free from a perfluoroalkyl group having a carbon number of 1 or greater, further more preferably a fluorine-free compound.

In a preferred embodiment of the production method of the disclosure, the surfactant is a hydrocarbon surfactant. When a fluoropolymer having a large number of TFE units is produced using a hydrocarbon surfactant, the polymer is less likely to have a high molecular weight. Thus, a chain transfer agent, which reduces the molecular weight of the polymer, is not usually used. The inventors have found that polymerization can efficiently proceed surprisingly even in the production of a fluoropolymer having a large number of TFE units using a hydrocarbon surfactant, thereby completing the production method of the disclosure.

The hydrocarbon surfactant is preferably an anionic hydrocarbon surfactant, more preferably includes at least one selected from the group consisting of the compound (α), the surfactant (a), the surfactant (b), the surfactant (c), the surfactant (d), the surfactant (1), the surfactant (1-0A), and surfactants each prepared by radical treatment or oxidation treatment on any of these surfactants, still more preferably includes at least one selected from the group consisting of the compound (α), the surfactant (b), the surfactant (d), the surfactant (1), and surfactants each prepared by radical treatment or oxidation treatment on any of these surfactants, particularly preferably includes at least one selected from the group consisting of the compound (α) and the surfactant (b).

The surfactant may be added in the form of an aqueous solution containing water. The upper limit of the concentration of the surfactant in the aqueous solution is preferably 50% by mass, more preferably 30% by mass, still more preferably 20% by mass, further more preferably 100000 ppm, much more preferably 50000 ppm, particularly preferably 10000 ppm, most preferably 5000 ppm. The lower limit thereof is preferably 1 ppm, more preferably 10 ppm, still more preferably 50 ppm.

The surfactant is preferably a surfactant for polymerization for use in production of a fluoropolymer or an aqueous solution of a surfactant for polymerization for use in production of a fluoropolymer.

In the production method of the disclosure, the surfactant may be added to the aqueous medium before the start (kickoff) of the polymerization reaction, at the start of the polymerization reaction, or after the start of the polymerization reaction.

In order to promote the polymerization of the fluoromonomer and thereby obtain a fluoropolymer having a higher molecular weight, preferably, the surfactant is not substantially added before the start of the polymerization reaction, but is added after the start of the polymerization reaction.

More preferably, the surfactant is not substantially added before the end of a period during which an initial dispersion of the fluoropolymer particles in the aqueous medium is prepared (hereinafter also referred to as an initial period), but is added after the initial period.

At the start of the polymerization reaction (preferably, during the initial period), the amount of the surfactant in the aqueous medium is, for example, preferably 50 ppm or less, more preferably 40 ppm or less, still more preferably 30 ppm or less, further more preferably 20 ppm or less, particularly preferably 15 ppm or less, relative to the aqueous medium.

At the start of the polymerization reaction (preferably, during the initial period), the amount of the surfactant in the aqueous medium is, for example, preferably 50 ppm or less, more preferably 40 ppm or less, still more preferably 30 ppm or less, further more preferably 20 ppm or less, particularly preferably 15 ppm or less, most preferably 5 ppm or less, relative to the aqueous medium.

At the start of the addition of the surfactant, the concentration of the fluoropolymer in the aqueous medium is preferably 0.6% by mass or more, more preferably 0.7% by mass or more, still more preferably 0.8% by mass or more, further more preferably 1.0% by mass or more, particularly preferably 1.2% by mass or more, relative to the aqueous medium.

When the fluoropolymer is a melt-fabricable fluororesin (e.g., FEP or PFA) to be described later, the concentration is preferably 2.0% by mass or more.

When the fluoropolymer is a non melt-processible fluororesin (e.g., PTFE) to be described later, the concentration is preferably 1.0% by mass or more, more preferably 1.6% by mass or more.

The surfactant is preferably added to the aqueous medium at a supply rate of 0.005 to 1.4 g/l-h, more preferably 0.005 to 1.0 g/l-h, still more preferably 0.01 to 0.8 g/l-h.

In the unit "g/l-h", the letter "g" represents grams of the mass of the surfactant itself, the letter "1" represents liters of the volume of a polymerization reactor, and the letter "h" represents time.

The surfactant is preferably added at least every 20 minutes, more preferably at least every 10 minutes, still more preferably at least every 5 minutes, most preferably added in a continuous manner until the polymerization reaction is completed.

The polymerizing step is a step of providing a fluoropolymer containing more than 80 mol % of a polymerized unit based on TFE (hereinafter, also referred to as "TFE unit"). Here, the phrase "more than 80 mol %" means a range above 80 mol %, not including 80 mol %.

The fluoropolymer obtainable by the polymerizing step contains more than 80 mol % of the TFE unit. The fluoropolymer may be a TFE homopolymer or may be one containing more than 80 mol % of the TFE unit and less than 20 mol % of a polymerized unit based on a monomer other than TFE. The fluoropolymer is preferably one containing more than 90 mol % of the TFE unit. The fluoropolymer is preferably a TFE homopolymer consisting of the TFE unit, preferably one containing less than 20 mol % of the polymerized unit based on a monomer other than TFE, more preferably one containing less than 10 mol % of the polymerized unit based on a monomer other than TFE.

The monomer other than TFE may be a fluoromonomer, which contains a fluorine atom, or may be a fluorine-free monomer.

The fluoromonomer is preferably one containing at least one double bond.

The fluoromonomer preferably includes at least one selected from the group consisting of hexafluoropropylene (HFP), chlorotrifluoroethylene (CTFE), vinyl fluoride, vinylidene fluoride (VDF), trifluoroethylene, fluoroalkyl vinyl ether, fluoroalkyl ethylene, trifluoropropylene, pentafluoropropylene, trifluorobutene, tetrafluoroisobutene, hexafluoroisobutene, a fluoromonomer represented by the formula (100): $CH_2{=}CFRf^{101}$ (where $Rf^{101}$ is a C1-C12 linear or branched fluoroalkyl group), a fluorinated vinyl heterocycle, fluorinated methylenedioxolane, a monomer giving a crosslinking site, and a fluorine-containing acrylate monomer.

The fluoroalkyl vinyl ether preferably includes at least one selected from the group consisting of:

a fluoromonomer represented by the formula (110):

$$CF_2{=}CF{-}ORf^{111}$$

wherein $Rf^{111}$ is a perfluoroorganic group;

a fluoromonomer represented by the formula (120):

$$CF_2{=}CF{-}OCH_2{-}Rf^{121}$$

wherein $Rf^{121}$ is a Cl-05 perfluoroalkyl group;

a fluoromonomer represented by the formula (130):

$$CF_2{=}CFOCF_2ORf^{131}$$

wherein $Rf^{131}$ is a C1-C6 linear or branched perfluoroalkyl group, a C5-C6 cyclic perfluoroalkyl group, or a C2-C6 linear or branched perfluorooxyalkyl group containing 1 to 3 oxygen atoms;

a fluoromonomer represented by the formula (140):

$$CF_2{=}CFO(CF_2CF(Y^{141})O)_m(CF_2)_nF$$

wherein $Y^{141}$ is a fluorine atom or a trifluoromethyl group; m is an integer of 1 to 4; and n is an integer of 1 to 4; and a fluoromonomer represented by the formula (150):

$$CF_2{=}CF{-}O{-}(CF_2CFY^{151}{-}O)_n{-}(CFY^{152})_m{-}A^{151}$$

wherein $Y^{151}$ is a fluorine atom, a chlorine atom, a $-SO_2F$ group, or a perfluoroalkyl group, the perfluoroalkyl group optionally containing ether oxygen and a $-SO_2F$ group; n is an integer of 0 to 3; n $Y^{151}$s are the same as or different from each other; $Y^{152}$ is a fluorine atom, a chlorine atom, or a $-SO_2F$ group; m is an integer of 1 to 5; m $Y^{152}$s are the same as or different from each other; $A^{151}$ is $-SO_2X^{151}$, $-COZ^{151}$, or $-POZ^{152}Z^{153}$; $X^{151}$ is F, Cl, Br, I, $-OR^{151}$, or $-NR^{152}R^{153}$; $Z^{151}$, $Z^{152}$, and $Z^{153}$ are the same as or different from each other, and are each $-NR^{154}R^{155}$ or $-OR^{156}$; $R^{151}$, $R^{152}$, $R^{153}$, $R^{154}$, $R^{155}$, and $R^{156}$ are the same as or different from each other, and are each H, ammonium, an alkali metal, or an alkyl group, aryl group, or sulfonyl-containing group optionally containing a fluorine atom.

The "perfluoroorganic group" as used herein means an organic group in which all hydrogen atoms binding to any of the carbon atoms are replaced by fluorine atoms. The perfluoroorganic group optionally contains ether oxygen.

An example of the fluoromonomer represented by the formula (110) is a fluoromonomer in which $Rf^{111}$ is a C1-C10 perfluoroalkyl group. The perfluoroalkyl group preferably has a carbon number of 1 to 5.

Examples of the perfluoroorganic group in the formula (110) include a perfluoromethyl group, a perfluoroethyl group, a perfluoropropyl group, a perfluorobutyl group, a perfluoropentyl group, and a perfluorohexyl group.

The examples of the fluoromonomer represented by the formula (110) also include those represented by the formula (110) in which $Rf^{111}$ is a C4-C9 perfluoro(alkoxyalkyl) group; those in which $Rf^{111}$ is a group represented by the following formula:

[Chem. 40]

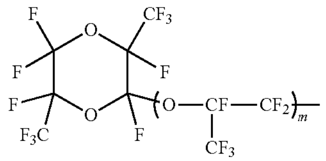

(wherein m is 0 or an integer of 1 to 4); and those in which $Rf^{111}$ is a group represented by the following formula:

[Chem. 41]

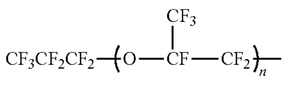

(wherein n is an integer of 1 to 4).

The fluoroalkyl vinyl ether preferably includes at least one selected from the group consisting of fluoromonomers represented by any of the formulas (110), (130), and (140).

The fluoromonomer represented by the formula (110) preferably includes at least one selected from the group consisting of perfluoro(methyl vinyl ether), perfluoro(ethyl vinyl ether), and perfluoro(propyl vinyl ether), more preferably at least one selected from the group consisting of perfluoro(methyl vinyl ether) and perfluoro(propyl vinyl ether).

The fluoromonomer represented by the formula (130) preferably includes at least one selected from the group consisting of $CF_2{=}CFOCF_2OCF_3$, $CF_2{=}CFOCF_2OCF_2CF_3$, and $CF_2{=}CFOCF_2OCF_2CF_2OCF_3$.

The fluoromonomer represented by the formula (140) preferably includes at least one selected from the group consisting of $CF_2{=}CFOCF_2CF(CF_3)O(CF_2)_3F$, $CF_2{=}CFO(CF_2CF(CF_3)O)_2(CF_2)_3F$, and $CF_2{=}CFO(CF_2CF(CF_3)O)_2(CF_2)_2F$.

The fluoromonomer represented by the formula (150) preferably includes at least one selected from the group consisting of $CF_2{=}CFOCF_2CF_2SO_2F$, $CF_2{=}CFOCF_2CF(CF_3)OCF_2CF_2SO_2F$, $CF_2{=}CFOCF_2CF(CF_2CF_2SO_2F)OCF_2CF_2SO_2F$, and $CF_2{=}CFOCF_2CF(SO_2F)_2$.

The fluoromonomer represented by the formula (100) is preferably a fluoromonomer in which $Rf^{101}$ is a linear fluoroalkyl group, more preferably a fluoromonomer in which $Rf^{101}$ is a linear perfluoroalkyl group. $Rf^{101}$ preferably has a carbon number of 1 to 6. Examples of the fluoromonomer represented by the formula (100) include $CH_2{=}CFCF_3$, $CH_2{=}CFCF_2CF_3$, $CH_2{=}CFCF_2CF_2CF_3$, $CH_2{=}CFCF_2CF_2CF_2H$, and $CH_2{=}CFCF_2CF_2CF_2CF_3$. Preferred among these is 2,3,3,3-tetrafluoropropylene represented by $CH_2{=}CFCF3$.

The fluoroalkyl ethylene is preferably a fluoroalkyl ethylene represented by the following formula (170):

$$CH_2{=}CH{-}(CF_2)_n{-}X^{171}$$

(wherein $X^{171}$ is H or F; and n is an integer of 3 to 10), more preferably includes at least one selected from the group consisting of $CH_2{=}CH{-}C_4F_9$ and $CH_2{=}CH{-}C_6F_{13}$.

An example of the fluorinated vinyl heterocycle is a fluorinated vinyl heterocycle represented by the following formula (230):

[Chem. 42]

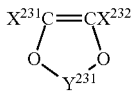

wherein $X^{231}$ and $X^{232}$ are each independently F, Cl, a methoxy group, or a fluorinated methoxy group; and $Y^{231}$ is represented by the following formula $Y^{232}$ or $Y^{233}$:

[Chem. 43]

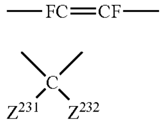

$(Y^{232})$ $(Y^{233})$ (wherein $Z^{231}$ and $Z^{232}$ are each independently F or a C1-C3 fluorinated alkyl group).

The monomer giving a crosslinking site preferably includes at least one selected from the group consisting of:

a fluoromonomer represented by the following formula (180):

$$CX^{181}_2{=}CX^{182}{-}R_f^{181}CHR^{181}X^{183}$$

wherein $X^{181}$ and $X^{182}$ are each independently a hydrogen atom, a fluorine atom, or $CH_3$; $R_f^{181}$ is a fluoroalkylene group, a perfluoroalkylene group, a fluoro(poly)oxyalkylene group, or a perfluoro(poly)oxyalkylene group; $R^{181}$ is a hydrogen atom or $CH_3$; and $X^{183}$ is an iodine atom or a bromine atom;

a fluoromonomer represented by the following formula (190):

$$CX^{191}_2{=}CX^{192}{-}R_f^{191}X^{193}$$

wherein $X^{191}$ and $X^{192}$ are each independently a hydrogen atom, a fluorine atom, or $CH_3$; $R_f^{191}$ is a fluoroalkylene group, a perfluoroalkylene group, a fluoropolyoxyalkylene group, or a perfluoropolyoxyalkylene group; and $X^{193}$ is an iodine atom or a bromine atom;

a fluoromonomer represented by the following formula (200):

$$CF_2{=}CFO(CF_2CF(CF_3)O)_m(CF_2)_n{-}X^{201}$$

wherein m is an integer of 0 to 5; n is an integer of 1 to 3; and $X^{201}$ is a cyano group, a carboxy group, an alkoxycarbonyl group, an iodine atom, a bromine atom, or $-CH_2I$;

a fluoromonomer represented by the following formula (210):

$$CH_2{=}CFCF_2O(CF(CF_3)CF_2O)_m(CF(CF_3))_n{-}X^{211}$$

wherein m is an integer of 0 to 5; n is an integer of 1 to 3; and $X^{211}$ is a cyano group, a carboxy group, an alkoxycarbonyl group, an iodine atom, a bromine atom, or $-CH_2OH$; and a monomer represented by the following formula (220):

$$CR^{221}R^{222}{=}CR^{223}{-}Z^{221}{-}CR^{224}{=}CR^{225}R^{226}$$

wherein $R^{221}$, $R^{222}$, $R^{223}$, $R^{224}$, $R^{225}$, and $R^{226}$ are the same as or different from each other, and are each a hydrogen atom or a C1-05 alkyl group; $Z^{221}$ is a C1-C18 linear or branched alkylene group optionally containing an oxygen atom, a C3-C18 cycloalkylene group, an at least partially fluorinated C1-C10 alkylene or oxyalkylene group, or a (per) fluoropolyoxyalkylene group having a molecular weight of 500 to 10000 represented by the following formula:

$$-(Q)_p-CF_2O-(CF_2CF_2O)_m(CF_2O)_n-CF_2-(Q)_p-$$

(wherein Q is an alkylene group or an oxyalkylene group; p is 0 or 1; and m/n is 0.2 to 5).

$X^{183}$ and $X^{193}$ are each preferably an iodine atom. $R_f^{181}$ and $R_f^{191}$ are each preferably a C1-C5 perfluoroalkylene group. $R^{181}$ is preferably a hydrogen atom. $X^{201}$ is preferably a cyano group, an alkoxycarbonyl group, an iodine atom, a bromine atom, or $-CH_2I$. $X^{211}$ is preferably a cyano group, an alkoxycarbonyl group, an iodine atom, a bromine atom, or $-CH_2OH$.

The fluorinated methylenedioxolane is preferably a compound represented by the following formula:

[Chem. 44]

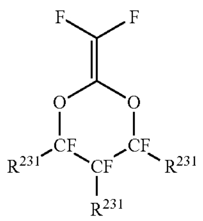

(wherein $R^{231}$ is a hydrogen atom, a fluorine atom, a C1-C10 fluoroalkyl group, perfluoroalkyl group, fluoro(poly)oxyalkyl group, or perfluoro(poly)oxyalkyl group), more preferably includes at least one selected from the group consisting of compounds represented by any of the following formulas:

[Chem. 45]

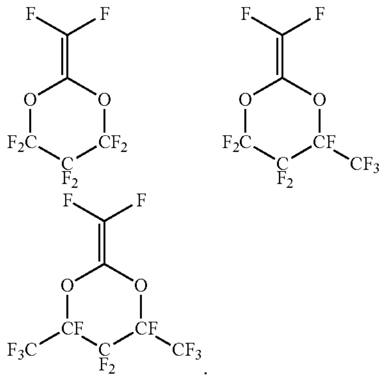

The monomer giving a crosslinking site preferably includes at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN$, more preferably includes at least one selected from the group consisting of $CF_2{=}CFOCF_2CF(CF_3)OCF_2CF_2CN$ and $CF_2{=}CFOCF_2CF_2CH_2I$.

The fluorine-containing acrylate monomer is preferably represented by the formula (240):

$$CH_2{=}C({-}X^{241}){-}C({=}O){-}O{-}Y^{241}{-}Rf^{241}$$

wherein $X^{241}$ is H, $CH_3$, F, or Cl; $Y^{241}$ is a single bond or an aliphatic group having a carbon number of 1 or greater; and $Rf^{241}$ is a C1-C8 aliphatic group or a C1-C8 fluoroalkyl group.

$Y^{241}$ may be, for example, a C1-C20 linear or branched aliphatic group, particularly an alkylene group, and may be a group represented by the formula $-(CH_2)_x-$ where x is 1 to 10.

$Rf^{241}$ is preferably a perfluoroalkyl group. $Rf^{241}$ preferably has a carbon number of 4 to 8, more preferably 4 to 6. Examples of $Rf^{241}$ include $-CF_2CF_2CF_2CF_3$, $-CF_2CF$ $(CF_3)_2$, $—C(CF_3)_3$, $—(CF_2)_4CF_3$, $—(CF_2)_2CF(CF_3)_2$, $—CF_2C(CF_3)_3$, $—CF(CF_3)CF_2CF_2CF_3$, $—(CF_2)_5CF_3$, $—(CF_2)_3CF(CF_3)_2$, $—(CF_2)_4CF(CF_3)_2$, and $—C_8F_{17}$.

Non-limiting specific examples of the fluorine-containing acrylate monomer include monomers represented by any of the following formulas:

$CH_2=C(—H)—C(=O)—O—(CH_2)_2—Rf^{241}$, $CH_2=C(—CH_3)—C(=O)—O—(CH_2)_2—Rf^{241}$, and $CH_2=C(—Cl)—C(=O)—O—(CH_2)_2—Rf^{241}$, where $Rf^{241}$ is as described above.

An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (other than a monomer giving a crosslinking site). Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; carboxy group-containing fluorine-free monomers such as itaconic acid, succinic acid, succinic anhydride, fumaric acid, fumaric anhydride, crotonic acid, maleic acid, maleic anhydride, and perfluorobutenoic acid; glycidyl group-containing fluorine-free monomers such as glycidyl vinyl ether and glycidyl allyl ether; amino group-containing fluorine-free monomers such as aminoalkyl vinyl ether and aminoalkyl allyl ether; and amide group-containing fluorine-free monomers such as (meth)acrylamide and methylol acrylamide.

The amide bond-containing fluorine-free monomer is preferably a monomer containing $—CONR^k_2$, $—NR^xCOR^y$, or a group having a C2-C7 lactam structure, for example. The amide bond indicates a bond between a carbonyl group and a nitrogen atom.

Examples of the amide bond-containing fluorine-free monomer include N-vinyl lactam compounds such as N-vinyl-β-propiolactam, N-vinyl-2-pyrrolidone, N-vinyl-γ-valerolactam, N-vinyl-2-piperidone, and N-vinyl-heptolactam; acyclic N-vinylamide compounds such as N-vinyl formamide and N-methyl-N-vinyl acetamide; acyclic N-allylamide compounds such as N-allyl-N-methylformamide and allyl urea; N-allyl lactam compounds such as 1-(2-propenyl)-2-pyrrolidone; and acrylamide compounds such as (meth)acrylamide, N,N-dimethylacrylamide, and N-isopropylacrylamide.

Examples of the amide bond-containing fluorine-free monomer also include a compound represented by the following formula:

[Chem. 46]

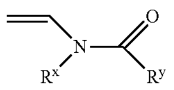

(wherein $R^x$ and $R^y$ are each independently H or a C1-C10 alkyl group) and a compound represented by the following formula:

[Chem. 47]

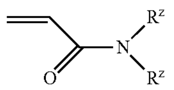

(wherein $R^z$s are each independently H or a C1-C10 alkyl group).

Preferred among these amide bond-containing fluorine-free monomers are N-vinyl lactam compounds and acyclic N-vinylamide compounds, more preferred is at least one selected from the group consisting of N-vinyl-β-propiolactam, N-vinyl-2-pyrrolidone, N-vinyl-γ-valerolactam, N-vinyl-2-piperidone, and N-vinyl-heptolactam, still more preferred is at least one selected from the group consisting of N-vinyl-2-pyrrolidone and N-vinyl-2-piperidone, and particularly preferred is N-vinyl-2-pyrrolidone.

Preferably, the monomer other than TFE includes at least one selected from the group consisting of a monomer represented by the following formula (1) and a monomer represented by the following formula (2), the formula (1) is as follows:

$CF_2=CR^pR^q$ wherein $R^p$ is H or F; $R^q$ is —Cl, $—CF_3$, $—R^a$, $—COOR^b$, $—OCOR^c$, $—CONR^d_2$, —CN, $—COR^e$, $—Rf^a$, or $—ORf^b$; $R^a$, $R^b$, $R^c$, $R^d$, and $R^e$ are the same as or different from each other and are each H or a substituent; $Rf^a$ is a fluorine-containing alkyl group or fluorine-containing vinyl group optionally containing a substituent and optionally containing an oxygen atom between carbon atoms; $Rf^b$ is a fluorine-containing alkyl group; and $R^p$ and $R^q$ are optionally bonded to each other to form a ring; and the formula (2) is as follows:

$CH_2=CR^sR^t$ wherein $R^s$ is $R^g$, $CF_3$, or F; $R^t$ is —Cl, $—R^h$, $—COOR^i$, $—OCOR^j$, $—CONR^k_2$, —CN, $—COR^m$, or $Rf^c$; $R^g$ and $R^h$ are the same as or different from each other and are each H or a hydrocarbon group or heterocyclic group optionally containing a substituent; $R^i$, $R^j$, $R^k$, and $R^m$ are the same as or different from each other and are each H or a substituent; $Rf^c$ is a fluorine-containing alkyl group, fluorine-containing vinyl group, or fluorine-containing alkoxy group optionally containing a substituent and optionally containing an oxygen atom between carbon atoms; and $R^s$ and $R^t$ are optionally bonded to each other to form a ring.

$R^a$, $R^b$, $R^c$, $R^d$, and $R^e$ in the formula (1) are the same as or different from each other and are each H or a substituent. Examples of the substituent include those described above. In particular, an aliphatic group, an acyl group, an aromatic group, or a heterocyclic group is preferred, an aliphatic group, an acyl group, or a heterocyclic group is more preferred, and an aliphatic group or an acyl group is still more preferred. $R^a$, $R^b$, $R^c$, $R^d$, and $R^e$ each preferably have a carbon number of 1 to 10, more preferably 1 to 8, still more preferably 1 to 5. The aliphatic group, the acyl group, the aromatic group, and the heterocyclic group each optionally contain a substituent and optionally contain an oxygen atom between carbon atoms. In these groups, any or all of the hydrogen atoms binding to any of the carbon atoms may be replaced by fluorine atoms (e.g., a fluorine-containing alkyl group, particularly a perfluoroalkyl group).

$R^a$, $R^b$, $R^c$, $R^d$, and $R^e$ each may be linear or branched and each may contain a cyclic structure.

$R^a$ in the formula (1) may be a substituent other than —$CF_3$. For example, when $R^a$ is a perfluoroalkyl group, $R^a$ may have a carbon number of 2 or greater.

Examples of $Rf^a$ in the formula (1) include a fluorine-containing alkyl group, a fluorine-containing vinyl group, a fluorine-containing alkoxy group, and a fluorine-containing alkyloxyalkyl group, each of which optionally contains a substituent and optionally contains an oxygen atom between carbon atoms. $Rf^a$ preferably has a carbon number of 1 to 10, more preferably 1 to 8, still more preferably 1 to 6.

$Rf^a$ may be linear or branched and may contain a cyclic structure.

$Rf^b$ in the formula (1) is a fluorine-containing alkyl group. $Rf^b$ preferably has a carbon number of 1 to 10, more preferably 1 to 8, still more preferably 1 to 6, further more preferably 1 to 3. $Rf^b$ may be linear or branched and may contain a cyclic structure. Preferably, $Rf^b$ is linear.

$R^q$ is preferably —H, a C1-C10 fluorine-containing alkyl group optionally containing a substituent, a C1-C10 fluorine-containing alkoxy group optionally containing a substituent, —Cl, a C1-C10 fluorine-free alkyl group optionally containing a substituent, a carboxy group, a C1-C10 alkyl ester group optionally containing a substituent, or a C1-C10 fluorine-containing alkyl oxyalkyl group optionally containing a substituent, preferably —H, —$CF_3$, —$OCF_3$, —$OCF_2CF_2SO_2F$, —Cl, —$CH_3$, —$OCH_2CF_3$, —COOH, —$COOCH_3$, —$OCF_2OCF_3$, —$OCF_2CF_2OCF_3$, —$OCF_2CF_2CF_2OCF_3$, or —$OC_3F_7$, more preferably —H, —$CF_3$, —$OCF_3$, —$OC_3F_7$, or —$OCF_2CF_2SO_2F$, still more preferably —H, —$CF_3$, or —$OCF_3$.

The monomer represented by the formula (1) preferably includes at least one selected from the group consisting of HFP, CTFE, VDF, trifluoroethylene, fluoroalkyl vinyl ether, trifluoropropylene, pentafluoropropylene, trifluorobutene, tetrafluoroisobutene, and hexafluoroisobutene.

Examples of the fluoroalkyl vinyl ether include those listed above.

The monomer represented by the formula (1) may also be a monomer represented by the formula (200) or a monomer represented by the formula (210). In the formulas (200) and (210), n is preferably an integer of 5 or smaller. $X^1$ is preferably —$CF_3$.

$R^7$ is preferably H or a C1-C10 organic group, more preferably H or a C1-C4 organic group, still more preferably H or a C1-C4 alkyl group.

Examples of the metal atom include alkali metals (Group 1) and alkaline earth metals (Group 2). Preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$.

The monomer represented by the formula (1) may also be a monomer represented by the formula (270):

[Chem. 48]

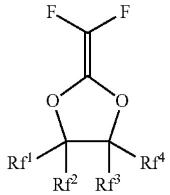

(270)

(wherein $Rf^1$, $Rf^2$, $Rf^3$, and $Rf^4$ are the same as or different from each other and are each F or a C1-C10 perfluoroalkyl group) or a monomer represented by the following formula (280):

[Chem. 49]

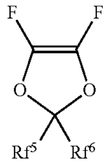

(280)

(wherein $Rf^5$ and $Rf^6$ are each F or a C1-C10 perfluoroalkyl group).

The monomer represented by the formula (1) is preferably VDF, HFP, perfluoro(methyl vinyl ether), perfluorosulfonyl vinyl ether, trifluoroethylene, CTFE, or trifluoropropylene, more preferably VDF, HFP, perfluoro(methyl vinyl ether), perfluorosulfonyl vinyl ether, or trifluoropropylene, still more preferably VDF, HFP, perfluoro(methyl vinyl ether), or perfluorosulfonyl vinyl ether.

The monomer represented by the formula (1) is a monomer different from TFE.

In the formula (2), $R^g$ and $R^h$ are the same as or different from each other and are each H, a hydrocarbon group optionally containing a substituent, or a heterocyclic group optionally containing a substituent. Examples of the hydrocarbon group include an alkyl group, an alkylene group, an aryl group, and a vinyl group. The hydrocarbon group preferably has a carbon number of 1 to 20, more preferably 1 to 15, still more preferably 1 to 10.

The heterocyclic group is preferably a group containing a C2-C7 lactam structure, more preferably a group containing a C3-C6 lactam structure, still more preferably a group containing a C4 lactam structure.

$R^g$ and $R^h$ may be linear or branched and may contain a cyclic structure.

$R^i$, $R^j$, $R^k$, and $R^m$ in the formula (2) are the same as or different from each other and are each H or a substituent. Examples of the substituent include the groups described above. In particular, an aliphatic group, an acyl group, an aromatic group, or a heterocyclic group is preferred, an aliphatic group, an acyl group, or a heterocyclic group is more preferred, and an aliphatic group or an acyl group is still more preferred. The aliphatic group, the acyl group, the aromatic group, and the heterocyclic group each optionally contain a substituent and optionally contain an oxygen atom between carbon atoms. $R^i$, $R^j$, $R^k$, and $R^m$ each preferably have a carbon number of 1 to 20, more preferably 1 to 15, still more preferably 1 to 10.

$R^i$, $R^j$, $R^k$, and $R^m$ each may be linear or branched and each may contain a cyclic structure.

Examples of $Rf^c$ in the formula (2) include a fluorine-containing alkyl group, a fluorine-containing vinyl group, a fluorine-containing alkoxy group, and a fluorine-containing alkyl oxyalkyl group, each of which optionally contains a substituent and optionally contains an oxygen atom between carbon atoms. $Rf^c$ preferably has a carbon number of 1 to 10, more preferably 1 to 8, still more preferably 1 to 6.

$Rf^c$ may be linear or branched and may contain a cyclic structure.

$R^s$ is preferably H, F, $CH_3$, or $CF_3$, more preferably H, F, or $CF_3$.

$R^t$ is preferably a C1-C10 fluorine-free alkyl group optionally containing a substituent, a C1-C10 fluorine-containing alkyl group optionally containing a substituent, —$COOR^i$, —$OCOR^i$, —$CONR^k_2$, —$NR^xCOR^Y$, —$NR^z_2$, or a group having a C2-C7 lactam structure.

$R^x$, $R^y$, and $R^z$ are the same as or different from each other and are each H or a C1-C10 alkyl group.

Examples of the monomer represented by the formula (2) include alkenes such as ethylene, propylene, butylene, and isobutylene; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl-para-t-butylbenzoate, vinyl cyclohexanecarboxylate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The examples of the monomer represented by the formula (2) also include (meth)acrylic acid esters such as methyl acrylate, ethyl acrylate, methyl methacrylate, and ethyl methacrylate; itaconic acid; glycidyl group-containing fluorine-free monomers such as glycidyl vinyl ether and glycidyl allyl ether; amino group-containing fluorine-free monomers such as aminoalkyl vinyl ethers and aminoalkyl allyl ethers; and the above-described amide bond-containing fluorine-free monomers such as (meth)acrylamide and methylol acrylamide.

The examples of the monomer represented by the formula (2) also include vinyl fluoride, a fluoroalkyl ethylene, a fluoromonomer represented by the formula (100), a fluoromonomer represented by the formula (300): $CH_2$═$CFCF_2$—O—$(CF(CF_3)CF_2O)_n$—$CF(CF_3)$-A (wherein n is 0 or an integer of 1 to 10, A is —$CH_2OH$, —COOM, —$SO_3M$, or —$OSO_3M$, where M is —H, a metal atom, —$NR^7_4$, an imidazolium optionally containing a substituent, a pyridinium optionally containing a substituent, or a phosphonium optionally containing a substituent, with $R^7$ being H or an organic group), and a fluorine-containing acrylate monomer.

In the formula (300), n is preferably 0 or an integer of 1 to 5, more preferably 0, 1, or 2, still more preferably 0 or 1. $R^7$ is preferably H or a C1-C10 organic group, more preferably H or a C1-C4 organic group, still more preferably H or a C1-C4 alkyl group. Examples of the metal atom include alkali metals (Group 1) and alkaline earth metals (Group 2). Preferred is Na, K, or Li. M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$.

$R^t$ is preferably —$OCOCH_3$, —H, —$COOCH_3$, —NH$(C_3H_7)$, —$C_4F_9$, —$CH_3$, or a group represented by the following formula (3):

[Chem. 50]

(3)

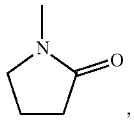

, more preferably —$OCOCH_3$, —H, —$COOCH_3$, or a group represented by the formula (3), still more preferably —$OCOCH_3$, —H, or the group represented by the formula (3).

The monomer represented by the formula (2) is preferably a vinyl ester, a (meth)acrylic acid ester, an alkene, an amide bond-containing fluorine-free monomer, a fluoroalkyl ethylene, or a fluorine-containing acrylate monomer, more preferably a vinyl ester, a (meth)acrylic acid ester, an alkene, a N-acrylamide compound, a N-vinylamide compound, a N-vinyl lactam compound, a fluoroalkyl ethylene, or a fluorine-containing acrylate monomer, still more preferably vinyl acetate, N-vinylpyrrolidone, ethylene, methyl acrylate, N-isopropylacrylamide, or $CH_2$═CH—$C_4F_9$, particularly preferably vinyl acetate, N-vinylpyrrolidone, ethylene, or methyl acrylate.

In particular, the monomer other than TFE preferably includes at least one selected from the group consisting of HFP, CTFE, VDF, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth)acrylic acid esters, alkenes, amide bond-containing fluorine-free monomers, fluoroalkylethylenes, and fluorine-containing acrylate monomers; more preferably includes at least one selected from the group consisting of HFP, CTFE, VDF, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth)acrylic acid esters, acrylamide, alkenes, vinylamide, fluoroalkylethylenes, and fluorine-containing acrylate monomers; still more preferably includes at least one selected from the group consisting of HFP, CTFE, VDF, fluoroalkyl vinyl ethers, trifluoropropylene, pentafluoropropylene, trifluorobutene, tetrafluoroisobutene, hexafluoroisobutene, vinyl esters, (meth)acrylic acid esters, N-acrylamide compounds, alkenes, N-vinylamide compounds, N-vinyl lactam compounds, fluoroalkyl ethylenes, and fluorine-containing acrylate monomers; further more preferably includes at least one selected from the group consisting of HFP, VDF, perfluoro(methyl vinyl ether), perfluorosulfonyl vinyl ether, ethylene, N-vinylamide compounds, N-vinyl lactam compounds, and vinyl acetate; particularly preferably includes at least one selected from the group consisting of HFP, VDF, perfluoro(methyl vinyl ether), perfluorosulfonyl vinyl ether, ethylene, N-vinylamide compounds, N-vinylpyrrolidone, and vinyl acetate.

In the production method of the disclosure, the monomer other than TFE may be a compound containing a functional group reactive in radical polymerization and a hydrophilic group. Examples thereof include:

a compound represented by the following formula (270a):

$$CF_2{=}CF{-}(CF_2)_{n271a}{-}Y^{271}$$

wherein n271a is an integer of 1 to 10; $Y^{271}$ is $-SO_3M^{271}$ or $-COOM^{271}$; and $M^{271}$ is H, $NH_4$, or an alkali metal;

a compound represented by the following formula (270b):

$$CF_2{=}CF{-}(CF_2C(CF_3)F)_{n271b}Y^{271}$$

wherein n271b is an integer of 1 to 5; and $Y^{271}$ is defined as described above;

a compound represented by the following formula (270c):

$$CF_2{=}CF{-}O{-}(CFX^{271})_{n271c}{-}Y^{271}$$

wherein $X^{271}$ is F or $CF_3$; n271c is an integer of 1 to 10; and $Y^{271}$ is defined as described above;

a compound represented by the following formula (270d):

$$CF_2{=}CF{-}O{-}(CF_2CFX^{271}O)_{n271d}{-}CF_2CF_2{-}Y^{271}$$

wherein n271d is an integer of 1 to 10; and $Y^{271}$ and $X^{271}$ are defined as described above; and a compound represented by the following formula (270e):

$$CX^{272}{}_2{=}CFCF_2{-}O{-}(CF(CF_3)CF_2O)_{n271e}{-}CF(CF_3){-}Y^{271}$$

wherein $X^{272}$s are the same as each other and are each F or H; n271e is 0 or an integer of 1 to 10; and $Y^{271}$ is defined as described above.

The polymerizing step may include producing a modified PTFE containing 99.0% by mass or more of the TFE unit and 1.0% by mass or less of a polymerized unit based on a monomer other than TFE. Preferably, the polymerizing step includes polymerization such that the total amount of the polymerized unit based on a monomer other than TFE is 0.00001 to 1.0% by mass. The lower limit of the total amount is more preferably 0.0001% by mass, still more preferably 0.001% by mass, further more preferably 0.005% by mass, particularly preferably 0.009% by mass. The upper limit thereof is preferably 0.90% by mass, more preferably 0.50% by mass, still more preferably 0.40% by mass, further more preferably 0.30% by mass, particularly preferably 0.10% by mass.

In this case, the monomer other than TFE may be a monomer represented by the formula (1) or the formula (2), more preferably includes at least one selected from the group consisting of HFP, VDF, perfluoro(methyl vinyl ether), perfluorosulfonyl vinyl ether, ethylene, a N-vinylamide compound, N-vinylpyrrolidone, and vinyl acetate.

The production method of the disclosure may include a step of forming lipophilic nucleating sites in the aqueous medium (hereinafter, also referred to as "nucleating site-forming step").

Polymerization in the presence of the lipophilic nucleating sites effectively proceeds even when the surfactant is added after the start of the polymerization reaction. This case can also provide a fluoropolymer having a smaller primary particle size than the case of polymerization in the absence of the lipophilic nucleating sites.

The nucleating site-forming step is a step of providing an aqueous dispersion of the lipophilic nucleating sites.

The nucleating site-forming step is preferably performed before the start of the polymerization reaction in the polymerizing step.

The lipophilic nucleating sites are preferably free from polymerized monomers.

The lipophilic nucleating sites are dispersed in the aqueous medium, and fluoropolymer particles can grow at the sites. The formation of the fluoropolymer particles at the lipophilic nucleating sites can provide an initial dispersion of the fluoropolymer particles.

The lipophilic nucleating sites can be formed, for example, by decomposition of a nucleating agent, preferably formed by addition of a nucleating agent and a decomposition agent to the aqueous medium.

An example of the nucleating agent is a water-soluble hydrocarbon-containing compound containing a hydrophobic moiety and a hydrophilic moiety, such as dicarboxylic acid, perfluoropolyether (PFPE) acid or a salt thereof, or a hydrocarbon-containing surfactant. The nucleating agent is preferably free from an aromatic ring, and is preferably an aliphatic compound.

The hydrocarbon-containing surfactant as the nucleating agent is preferably different from the surfactants in the polymerizing step, and is preferably a nonionic surfactant.

A preferred amount of the nucleating agent may be appropriately selected in accordance with the type of the nucleating agent. For example, the amount thereof is preferably 1000 ppm or less, more preferably 500 ppm or less, still more preferably 100 ppm or less, particularly preferably 50 ppm or less, more particularly preferably 10 ppm or less, relative to the aqueous medium.

The amount of the dicarboxylic acid is preferably 1000 ppm or less, more preferably 500 ppm or less, still more preferably 100 ppm or less, relative to the aqueous medium.

The perfluoropolyether (PFPE) acid or a salt thereof may have any chain structure containing oxygen atoms separated by a C1-C3 saturated carbon fluoride group in the main chain of the molecule. Two or more carbon fluoride groups may be present in the molecule. Typical structures thereof contain any of the repeating units represented by any of the following formulas:

$$(-CFCF_3-CF_2-O-)_n \quad (VII);$$

$$(-CF_2-CF_2-CF_2-O-)_n \quad (VIII);$$

$$(-CF_2-CF_2-O-)_n-(-CF_2-O-)_m \quad (IX); \text{ and}$$

$$(-CF_2-CFCF_3-O-)_n-(-CF_2-O-)_m \quad (X).$$

These structures are described in Kasai, J. Appl. Polymer Sci., 57,797 (1995). As disclosed in this literature, the PFPE acid or a salt thereof may contain a carboxylic acid group or a salt thereof at one or each end. The PFPE acid or a salt thereof may also contain a sulfonic acid group, a phosphonic acid group, or a salt thereof at one or each end. The PFPE acid or a salt thereof may contain different groups at the respective ends. For a monofunctional PFPE, the other end of the molecule is usually perfluorinated, but may contain a hydrogen or chlorine atom. The PFPE acid or a salt thereof contains at least two ether oxygen atoms, preferably at least four ether oxygen atoms, still more preferably at least six ether oxygen atoms. Preferably, at least one carbon fluoride group separating ether oxygen atoms contains two or three carbon atoms, and more preferably, at least two such carbon fluoride groups each contain two or three carbon atoms. Still more preferably, at least 50% of the carbon fluoride groups separating ether oxygen atoms contain two or three carbon atoms. Also preferably, the PFPE acid or a salt thereof contains at least 15 carbon atoms in total. For example, the minimum value of n or n+m in the repeating unit structure is preferably at least 5. Two or more of the PFPE acids and salts thereof containing an acid group at one or each end may be used in the production method of the disclosure. The PFPE acid or a salt thereof preferably has a number average molecular weight of less than 6000 g/mol.

The hydrocarbon-containing surfactant is preferably added in an amount of 40 ppm or less, more preferably 30 ppm or less, still more preferably 20 ppm or less, relative to the aqueous medium. The amount (ppm) of the lipophilic nucleating sites in the aqueous medium is presumably smaller than the above-described amount of the hydrocarbon-containing surfactant added. Accordingly, the amount of the lipophilic nucleating sites is smaller than 50 ppm, 40 ppm, 30 ppm, or 20 ppm. The lipophilic nucleating sites are considered to be present in the form of molecules, and thus, even a very small amount of the hydrocarbon-containing surfactant can generate a large amount of lipophilic nucleating sites. Thus, addition of only about 1 ppm of the hydrocarbon-containing surfactant to the aqueous medium can achieve a beneficial effect. The lower limit is preferably 0.01 ppm, more preferably 0.1 ppm.

The hydrocarbon-containing surfactant includes nonionic surfactants and cationic surfactants, including siloxane surfactants such as those disclosed in U.S. Pat. No. 7,897,682 B (Brothers et al.) and U.S. Pat. No. 7,977,438 B (Brothers et al.).

The hydrocarbon-containing surfactant is preferably a nonionic hydrocarbon surfactant. In other words, the nucleating surfactant is preferably a nonionic hydrocarbon surfactant. The nonionic hydrocarbon surfactant is preferably free from an aromatic moiety.

Examples of the nonionic hydrocarbon surfactant include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, and derivatives thereof. Specifically, examples of the polyoxyethylene alkyl ethers include polyoxyethylene lauryl ether, polyoxyethylene cetyl ether, polyoxyethylene stearyl ether, polyoxyethylene oleyl ether, and polyoxyethylene behenyl ether; examples of the polyoxyethylene alkyl phenyl ethers include polyoxyethylene nonyl phenyl ether and polyoxyethylene octyl phenyl ether; examples of the polyoxyethylene alkyl esters include polyethylene glycol monolaurylate, polyethylene glycol monooleate, and polyethylene glycol monostearate; examples of the sorbitan alkyl esters include polyoxyethylene sorbitan monolaurylate, polyoxyethylene sorbitan monopalmitate, polyoxyethylene sorbitan monostearate, and polyoxyethylene sorbitan monooleate; examples of the polyoxyethylene sorbitan alkyl esters include polyoxyethylene sorbitan monolaurylate, polyoxyethylene sorbitan monopalmitate, and polyoxyethylene sorbitan monostearate; and examples of the glycerol esters include glycerol monomyristate, glycerol monostearate, and glycerol monooleate. Examples of the derivatives thereof include polyoxyethylene alkylamines, polyoxyethylene alkyl phenyl-formaldehyde condensates, and polyoxyethylene alkyl ether phosphates. Particularly preferred are polyoxyethylene alkyl ethers and polyoxyethylene alkyl esters. Examples of such ethers and esters include those having an HLB value of 10 to 18. Specific examples thereof include polyoxyethylene lauryl ether (EO: 5 to 20, EO means an ethylene oxide unit), polyethylene glycol monostearate (EO: 10 to 55), and polyethylene glycol monooleate (EO: 6 to 10).

Preferred examples of the nonionic hydrocarbon surfactant include octylphenol ethoxylates such as the following Triton® X series available from Dow Chemical Company.

[Chem. 51]

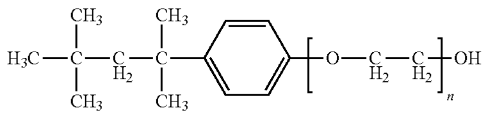

Triton®

X15: n=1.5 (avg)

X45: n=4.5 (avg)

Preferred examples of the nonionic hydrocarbon surfactant also include branched alcohol ethoxylates such as the following Tergitol® 15-S series available from Dow Chemical Company and branched secondary alcohol ethoxylates such as the following Tergitol® TMN series also available from Dow Chemical Company.

[Chem. 52]

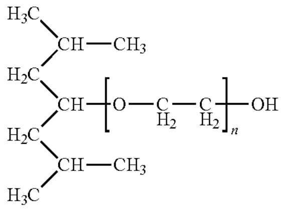

Tergitol®

TMN-6: n=8 (avg)

TMN-10: n=11 (avg)

TMN-100: n=10 (avg)

Ethylene oxide/propylene oxide copolymers such as Tergitol® L series surfactants available from Dow Chemical Company are also useful as the above nonionic hydrocarbon surfactants.

Examples of preferred nonionic hydrocarbon surfactants in the group of useful ones include the following bifunctional block copolymers such as Pluronic® R series available from BASF.

[Chem. 53]

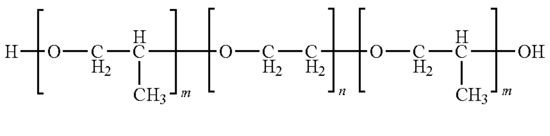

Pluronic®

31R1: m=26 (avg), n=8 (avg)

17R2: m=14 (avg), n=9 (avg)

10R5: m=8 (avg), n=22 (avg)

25R4: m=22 (avg), n=23 (avg)

Preferred nonionic hydrocarbon surfactants in another group include tridecyl alcohol alkoxylates such as Iconol® TDA series available from BASF Corporation.

[Chem. 54]

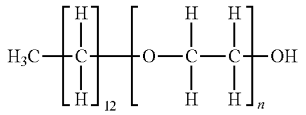

Iconol®

TDA-6: n=6 (avg)

TDA-9: n=9 (avg)

TDA-10: n=19 (avg)

The cationic surfactants are also usable as nucleating surfactants. Typical cationic surfactants contain a positively charged hydrophilic moiety such as an alkyl ammonium halide, including an alkyl ammonium bromide, and a hydrophobic moiety such as a long-chain fatty acid.

Nucleating agents in another group to be used include hydrocarbon-containing siloxane surfactants, preferably hydrocarbon surfactants. The carbon atoms of the hydrocarbyl groups are fully substituted with hydrogen atoms where they can be substituted by halogen such as fluorine. Thus, these siloxane surfactants can also be regarded as hydrocarbon surfactants, i.e. the monovalent substituents on the carbon atoms of the hydrocarbyl groups are hydrogen. The nucleating agent is preferably a hydrocarbon siloxane containing a nonionic moiety, i.e., a nonionic hydrocarbon (siloxane) surfactant.

The decomposition agent for use in the decomposition of the nucleating agent is preferably an oxidant, more preferably a radical polymerization initiator also usable in the polymerization of the fluoromonomer.

Examples of the polymerization initiator include highly active water-soluble salts of inorganic initiators such as inorganic peracids, with persulfates such as ammonium persulfate and potassium persulfate being preferred. The persulfates are preferably substantially free from a metal ion, more preferably ammonium salts.

A water-soluble organic azo compound such as an azo amidine compound is also useful as the polymerization initiator.

The polymerization initiator may be the same as or different from a polymerization initiator for use in the polymerization of the fluoromonomer.

The amount of the decomposition agent added to the aqueous medium is preferably smaller than that required to initiate the polymerization reaction. The amount is preferably 50 ppm or less, more preferably 40 ppm or less, still more preferably 30 ppm or less, further more preferably 20 ppm or less, most preferably 15 ppm or less, relative to the aqueous medium. The lower limit of the amount of the decomposition agent is, for example, 1 ppm.

The decomposition of the nucleating agent is preferably performed in the presence of an inorganic salt. This can increase the number of the lipophilic nucleating sites formed and can provide a fluoropolymer having a smaller primary particle size.

The inorganic salt may be a water-soluble inorganic salt, and examples thereof include those each containing a cation such as an alkali metal (e.g., Na, K) cation or $NH_4^+$ and an anion such as $—SO_3$, $—HSO_3$, $—NO_3^-$, $—Cl^-$, $—CO_3^-$, $—B_4O_y^-$, or $—HPO_4^-$. When a fluoropolymer prepared by polymerization is processed by melt-extrusion, the salt is preferably an ammonium salt.

At the time of the decomposition (oxidation) reaction of the nucleating agent, the inorganic salt is present in the aqueous medium in an amount of preferably 100 ppm or less, more preferably 75 ppm or less, still more preferably 50 ppm or less, most preferably 25 ppm or less, relative to the aqueous medium. The lower limit of the amount thereof used may be 1 ppm.

In the production method of the disclosure, the surfactant and a different compound having an interfacial activity used as needed are added, and an additive may be used to stabilize these compounds. Examples of the additive include a buffer, a pH adjuster, a stabilizing aid, and a dispersion stabilizer.

Preferred examples of the stabilizing aid include paraffin wax, fluorine-based oil, a fluorine-based solvent, and silicone oil. One stabilizing aid may be used alone, or two or more stabilizing aids may be used in combination. The stabilizing aid is more preferably paraffin wax. The paraffin wax may be in the form of liquid, semi-solid, or solid at room temperature, and is preferably a saturated hydrocarbon having a carbon number of 12 or greater. The paraffin wax usually preferably has a melting point of 40° C. to 65° C., more preferably 50° C. to 65° C.

The stabilizing aid is preferably used in an amount of 0.1 to 12% by mass, more preferably 0.1 to 8% by mass, relative to the mass of the aqueous medium used. Preferably, the stabilizing aid is sufficiently hydrophobic, to be completely separated from the PTFE aqueous emulsion after emulsion polymerization of TFE, and does not serve as a contaminant.

In the production method of the disclosure, the polymerizing step is performed as follows: a polymerization reactor is charged with an aqueous medium, TFE, and required additives such as a chain transfer agent and an initiator; the contents in the reactor are stirred; the reactor is maintained at a predetermined polymerization temperature; and a predetermined amount of the initiator is added to initiate the polymerization reaction. After the start of the polymerization reaction, components such as the monomer(s), the initiator, and the chain transfer agent may additionally be added in accordance with the purposes thereof. The timing of adding the surfactant may be determined according to the purpose, and the surfactant may be added before, at, or after the start of the polymerization reaction, or may be added at two or more of these timings.

In the polymerization, the polymerization temperature is usually 5° C. to 120° C., preferably 10° C. to 100° C., more preferably 20° C. to 90° C. The polymerization pressure is usually 0.05 to 10 MPaG, preferably 0.1 to 5.0 MPaG, more preferably, 0.2 to 3.0 MPaG. The polymerization temperature and the polymerization pressure are determined as appropriate in accordance with the types of the monomers used, the molecular weight of the target fluoropolymer, and the reaction rate.

The surfactant is preferably added in a total amount of 0.0001 to 10% by mass relative to 100% by mass of the aqueous medium. The lower limit thereof is more preferably 0.001% by mass, while the upper limit thereof is more preferably 1% by mass. Less than 0.0001% by mass of the surfactant may cause insufficient dispersibility. More than 10% by mass of the surfactant may fail to give the effects corresponding to its amount; on the contrary, such an amount of the surfactant may cause a reduction in the polymerization rate or even stop the reaction. The amount of the surfactant is appropriately determined in accordance with factors such as the types of the monomers used and the molecular weight of the target fluoropolymer.

The aqueous medium is a reaction medium that allows polymerization of TFE to proceed, and means a liquid containing water. The aqueous medium may be any medium containing water, and it may be one containing water and, for example, a fluorine-free organic solvent such as an alcohol, an ether, or a ketone, and/or a fluorine-containing organic solvent having a boiling point of 40° C. or lower.

The fluoropolymer obtainable by the production method of the disclosure may be a TFE homopolymer or may be a copolymer containing more than 80 mol % of the TFE unit and less than 20 mol % of the polymerized unit based on a monomer other than TFE.

An example of the fluoropolymer obtainable by the production method of the disclosure is a fluoropolymer of the disclosure described below.

The fluoropolymer of the disclosure is represented by the following formula:

Af-CRP wherein Af is a fluoropolymer segment containing more than 80 mol % of a polymerized unit based on TFE; and CRP is any of the following formulas (CRP1) to (CRP5), the formula (CRP1) being as follows:

$—SC(S)Z^{c11}$ wherein $Z^{c11}$ is an alkyl group or an aryl group;

the formula (CRP2) being as follows:

$SC(S)SZ^{c12}$ wherein $Z^{c12}$ is an alkyl group or an aryl group;

the formula (CRP3) being as follows:

$—SC(S)SR^{c11}$ wherein $R^{c11}$ is a monovalent organic group;

the formula (CRP4) being as follows:

$—SC(S)NZ^{c13}{}_2$ wherein $Z^{c13}$s are (i) each independently an alkyl group, an aryl group, or a 4-pyridyl group or (ii) groups bonded to each other to form a heterocycle together with a N atom in the formula; and the formula (CRP5) being as follows:

$—SC(S)OZ^{c14}$ wherein $Z^{c14}$ is an alkyl group or an aryl group.

Block copolymerization has been difficult to apply to TFE-based polymers. The fluoropolymer of the disclosure, which contains any of the specific groups described above at an end, can be produced by block copolymerization. Such a fluoropolymer of the disclosure is useful as an intermediate to produce block copolymers.

The fluoropolymer of the disclosure can be used not only as an intermediate but also as it is for applications described above.

Examples of $Z^{c11}$ in the formula (CRP1) include those for $Z^{c1}$ in the formula (c1-1).

Examples of $Z^{c12}$ in the formula (CRP2) include those for $Z^{c2}$ in the formula (c1-2).

Examples of $R^{c11}$ in the formula (CRP3) include those for $R^{r}$ in the formula (c1-2').

Examples of $Z^{c13}$ in the formula (CRP4) include those for $Z^{c3}$ and $Z^{c4}$ in the formula (c1-3).

Examples of $Z^{c14}$ in the formula (CRP5) include those for $Z^{c5}$ in the formula (c1-4).

The CRP is preferably (CRP5) from the viewpoint of polymerization rate.

The groups of the formulas (CRP1) to (CRP5) are groups derived from the chain transfer agents described for the production method of the disclosure. In other words, the groups of the formulas (CRP1) to (CRP5) each constitute a portion in which at least part of the structure of a chain transfer agent is incorporated in a fluoropolymer (preferably in a main chain end of a fluoropolymer).

The fluoropolymer of the disclosure contains more than 80 mol % of the TFE unit. The amount of the TFE unit is preferably 90 mol % or more, more preferably more than 90 mol %, still more preferably 95 mol % or more, further more preferably 99 mol % or more.

The fluoropolymer of the disclosure may also be a modified PTFE containing 99.0% by mass or more of the polymerized unit based on TFE and 1.0% by mass or less of the polymerized unit based on a monomer other than TFE.

In a preferred embodiment, Af is a fluoropolymer segment consisting of a monomer unit derived from TFE.

Specifically, the fluoropolymer of the disclosure is represented by the following formula:

Bf-CRP wherein Bf is a fluoropolymer segment consisting of a polymerized unit based on TFE; and CRP is defined as described above.

A fluoropolymer in which Af is a fluoropolymer segment consisting of a monomer unit derived from TFE is so-called PTFE. The following describes PTFE.

PTFE obtained by the production method of the disclosure may be a low-molecular-weight PTFE or a high-molecular-weight PTFE.

A low-molecular-weight PTFE having a molecular weight of 600,000 or less (also referred to as PTFE micropowder) has excellent chemical stability and a very low surface energy, and is less likely to generate fibrils. Thus, such a low-molecular-weight PTFE can suitably be used as an additive for improving the lubricity and the texture of the film surface in production of plastics, inks, cosmetics, coating materials, greases, parts of office automation equipment, and toners (e.g., see JP H10-147617 A).

In order to use the low-molecular-weight PTFE obtained by the polymerization as powder, the PTFE dispersion can be formed into powder particles by agglomeration.

The high-molecular-weight PTFE as used herein means a PTFE having non melt-processability and a fibrillation ability. The low-molecular-weight PTFE as used herein means a PTFE having melt-fabricability and no fibrillation ability.

The non melt-processability means a feature of a polymer that the melt flow rate thereof cannot be measured at a temperature higher than the crystal melting point in conformity with ASTM D1238 and D2116.

The presence or absence of the fibrillation ability can be determined by "paste extrusion", a representative method of molding a "high-molecular-weight PTFE powder" which is a powder of a TFE polymer. The ability of the high-molecular-weight PTFE to be paste-extruded is usually caused by its fibrillation ability. When a non-sintered molded article obtained by paste extrusion shows substantially no strength or elongation (e.g., when it shows an elongation of 0% and is broken when stretched), it can be considered as non-fibrillatable.

The high-molecular-weight PTFE preferably has a standard specific gravity (SSG) of 2.130 to 2.280. The standard specific gravity is determined by the water replacement method in conformity with ASTM D792 using a sample prepared in conformity with ASTM D4895-89. The "high-molecular-weight" means that the standard specific gravity is within the above range.

The low-molecular-weight PTFE has a complex viscosity of $1\times10^2$ to $7\times10^5$ Pa·s at 380° C. The "low-molecular-weight" means that the complex viscosity is within the above range.

The high-molecular-weight PTFE has a complex viscosity significantly higher than that of the low-molecular-weight PTFE, and the complex viscosity thereof is difficult to measure accurately. The complex viscosity of the low-molecular-weight PTFE is measurable, but the low-molecular-weight PTFE has difficulty in providing a molded article to be used in measurement of the standard specific gravity. Thus, the standard specific gravity thereof is difficult to measure accurately. Accordingly, the standard specific gravity is used as an index of the molecular weight of the high-molecular-weight PTFE, while the complex viscosity is used as an index of the molecular weight of the low-molecular-weight PTFE. For both the high-molecular-weight PTFE and the low-molecular-weight PTFE, no measurement methods for directly specifying the molecular weight have been known so far.

The high-molecular-weight PTFE preferably has a peak temperature of 333° C. to 347° C., more preferably 335° C. to 345° C. The low-molecular-weight PTFE preferably has a peak temperature of 322° C. to 333° C., more preferably 324° C. to 332° C. The peak temperature is the temperature corresponding to the maximum value on a heat-of-fusion curve with a temperature-increasing rate of 10° C./min using a differential scanning calorimeter (DSC) for a PTFE which has never been heated up to 300° C. or higher.

Preferably, the high-molecular-weight PTFE has at least one endothermic peak in a temperature range of 333° C. to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290° C. to 350° C. calculated from the heat-of-fusion curve.

The PTFE can be used in the form of an aqueous dispersion or fine powder.

The PTFE fine powder is preferred for molding. Examples of preferred applications thereof include tubes for hydraulic systems or fuel systems of aircraft or automobiles, flexible hoses for chemicals or vapors, and electric wire coating.

The aqueous dispersion of the PTFE may be mixed with a nonionic surfactant so that the aqueous dispersion is stabilized and more concentrated. In accordance with the purpose, preferably, such an aqueous dispersion may be mixed with organic or inorganic filler to form a composition and used in a variety of applications. The composition, when applied to a metal or ceramic substrate, can provide a film surface having non-stickiness, a low coefficient of friction, and excellent gloss, smoothness, abrasion resistance, weather resistance, and heat resistance. Thus, the composition is suitable for, for example, coating of rolls and cooking utensils and impregnation of glass cloth.

The aqueous dispersion may be formed into an organosol of the PTFE. The organosol can contain the PTFE and an organic solvent. Examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone, dimethyl acetamide, and the like. The organosol may be prepared by the method disclosed in WO 2012/002038, for example.

The aqueous dispersion of the PTFE or the fine powder of the PTFE is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the PTFE or the fine powder of the PTFE is also preferably used as a binding agent for batteries or used for dustproof applications.

The PTFE fine powder obtained by the production method of the disclosure may be used to produce unsintered tape (green tape).

The aqueous dispersion of the PTFE or the fine powder of the PTFE is also preferably combined with a resin other than the PTFE to form a processing aid before use. The aqueous dispersion or the fine powder is suitable as a material of the PTFEs disclosed in JP H11-49912 A, U.S. Pat. No. 5,804,654 B, JP H11-29679 A, and JP 2003-2980 A. The processing aid containing the aqueous dispersion or the fine powder is nothing inferior to the processing aids disclosed in the above literatures.

The aqueous dispersion of the PTFE is also preferably mixed with an aqueous dispersion of a melt-fabricable fluororesin so that the components agglomerate to form co-agglomerated powder. The co-agglomerated powder is suitable as a processing aid.

Examples of the melt-fabricable fluororesin include FEP, PFA, ETFE, and ethylene/TFE/HFP copolymers (EFEPs). Preferred is FEP.

The aqueous dispersion also preferably contains a melt-fabricable fluororesin. Examples of the melt-fabricable fluororesin include FEP, PFA, ETFE, and EFEP. The aqueous dispersion containing the melt-fabricable fluororesin may be used as a coating material. The melt-fabricable fluororesin enables sufficient fusion of the PTFE particles, improving the film-formability and giving gloss to the resulting film.

The co-agglomerated powder may be added to a fluorine-free resin in the form of powder, pellets, or emulsion. In order to achieve sufficient mixing of the resins, the addition is preferably performed by a known method such as extrusion kneading or roll kneading under a shearing force.

The aqueous dispersion of the PTFE is also preferably used as a dust control agent. The dust control agent may be used in a method in which the dust control agent is mixed with a dust-generating substance and the mixture is subjected to a compression-shear effect at a temperature of 20° C. to 200° C. to form fibrils of the PTFE, thereby reducing dust of dust-generating substances, such as the methods disclosed in JP 2827152 B and JP 2538783 B.

The aqueous dispersion of the PTFE can suitably be used for the dust control agent composition disclosed in WO 2007/004250, and can also suitably be used for a method of dust control treatment disclosed in WO 2007/000812.

The dust control agent can suitably be used for dust control treatment in the field of construction materials, the field of soil stabilizers, the field of solidification materials, the field of fertilizers, the field of reclamation of ash and hazardous materials, the field of explosion protection, or the field of cosmetics, or for pet toilet sand typified by cat litter.

The aqueous dispersion of the PTFE is also preferably used as a material for producing PTFE fibers by a dispersion spinning method. The dispersion spinning method is a method in which the aqueous dispersion of the PTFE and an aqueous dispersion of a matrix polymer are mixed and the mixture is extruded to form an intermediate fiber structure, and then the intermediate fiber structure is fired to decompose the matrix polymer and sinter the PTFE particles, thereby providing PTFE fibers.

The high-molecular-weight PTFE powder obtainable by the polymerization has stretchability and non melt-processability and is thus also useful as a material of a PTFE stretched article (PTFE porous article).

The stretched article in the form of a film (PTFE stretched film or PTFE porous film) can be formed by stretching by a known PTFE stretching method. Stretching enables easy formation of fibrils of high-molecular-weight PTFE, resulting in a PTFE porous article (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched article is a porous article having a high porosity, and can suitably be used as a filter material for a variety of microfiltration membranes such as air filters and chemical filters and a support member for polymer electrolyte membranes.

The PTFE stretched article is also useful as a material of products used in the textile field, the medical treatment field, the electrochemical field, the sealant field, the air filter field, the ventilation/internal pressure adjustment field, the liquid filter field, and the consumer goods field.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), absorbent-attached filters (for HDD embedment), absorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/internal pressure adjustment field Examples of the applications in this field include materials for freeze drying such as containers for freeze drying, ventilation materials for automobiles for electronic circuits and lamps, applications relating to containers such as container caps, applications relating to protective ventilation for electronic devices, including small devices such as tablet terminals and mobile phone terminals, and applications relating to ventilation for medical treatment.

Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial drainage).

Consumer Goods Field

Examples of the applications in this field include clothes, cable guides (movable wires for motor bikes), clothes for motor cyclists, cast liners (medical supporters), filters for cleaners, bagpipes (musical instrument), cables (signal cables for guitars, for example), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (extending articles), artificial blood vessels, catheters, general surgical operations (tissue reinforcing materials), products for head and neck (dura mater alternatives), oral health (tissue regenerative medicine), and orthopedics (bandages).

When containing more than 80 mol % of the polymerized unit based on TFE, Af may contain a polymerized unit based on a monomer other than TFE. The monomer other than TFE is the same as that described for the production method of the disclosure.

In an embodiment of the disclosure, the polymerized unit based on a monomer other than TFE is a fluoropolymer segment prepared by randomly copolymerizing a monomer unit derived from at least one selected from the group consisting of a monomer represented by the formula (1) and a monomer represented by the formula (2).

The monomer represented by the formula (1) and the monomer represented by the formula (2) are the same as those described for the production method of the disclosure.

In this case, Af preferably contains more than 80 mol % and less than 100 mol % of the polymerized unit based on TFE. Af preferably contains 81 mol % or more, more preferably 90 mol % or more, still more preferably more than 90 mol %, further more preferably 95 mol % or more, particularly preferably 99 mol % or more, of the polymerized unit based on TFE.

When Af is a fluoropolymer segment prepared by randomly copolymerizing a monomer unit derived from TFE and a monomer unit derived from at least one selected from the group consisting of a monomer represented by the formula (1) and a monomer represented by the formula (2), the fluoropolymer is a copolymer of TFE and at least one selected from the group consisting of a monomer represented by the formula (1) and a monomer represented by the formula (2). Examples thereof include melt-fabricable fluororesins such as a TFE-HFP copolymer (FEP), a TFE-perfluoro(alkyl vinyl ether) copolymer (PFA), an ethylene-TFE copolymer (ETFE), and a TFE-VDF copolymer.

Af may also be a modified PTFE containing TFE and a monomer other than TFE (modifying monomer). In this case, the monomer other than TFE is preferably 1% by mass or less.

The FEP preferably has a monomer composition ratio (% by mass) of TFE:HFP=(80 to 95):(5 to 20), more preferably (85 to 92):(8 to 15). The FEP may be one modified with a perfluoro(alkyl vinyl ether) as a third component within a range of 0.1 to 2% by mass of all monomers.

The FEP may be used in production of a variety of molded articles such as coating materials for electric wires, foamed electric wires, cables, and wires, tubes, films, sheets, and filaments.

The PFA preferably has a monomer composition ratio (mol %) of TFE:perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2=CFORf^4$ where $Rf^4$ is a C1-C6 perfluoroalkyl group.

The PFA can provide a variety of molded articles. Examples of the molded articles include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires. Preferred among these are tubes, pipes, tanks, connectors, and the like to be used for a variety of chemical reaction devices, semiconductor manufacturing devices, and acidic or alkaline chemical feeding devices each requiring chemical impermeability.

Also, the PFA alone or the PFA combined, if needed, with polyethersulfone, polyamide-imide, polyimide, metal powder, or the like, is dissolved or dispersed in an organic solvent, and thereby a primer composition can be obtained. This primer composition can be used for a method for coating a metal surface with a fluororesin, the method including applying the primer composition to a metal surface, applying a melt-fabricable fluororesin composition to the resulting primer layer, and firing the melt-fabricable fluororesin composition layer together with the primer layer.

The ETFE preferably has a monomer composition ratio (mol %) of TFE:ethylene=(80 to 99):(20 to 1). The ETFE may be one modified with a third monomer within a range of 0 to 20% by mass of all monomers. Preferably, the ETFE has a monomer composition ratio of TFE:ethylene:third monomer=(80 to 94):(19 to 2):(1 to 10). The third monomer preferably includes any of perfluorobutyl ethylene, perfluorobutyl ethylene, 3,3,4,4,5,5,6,6,7,7,8,8,8-tridecafluorooct-1-ene, 2,3,3,4,4,5,5-heptafluoro-1-pentene ($CH_2=CFCF_2CF_2CF_2H$), and 2-trifluoromethyl-3,3,3-trifluoropropene ($(CF_3)_2C=CH_2$).

The ETFE may be extrusion-molded into a sheet. Specifically, powder or pellets of ETFE in a molten state may be continuously extruded through a die and then cooled to provide a sheet-shaped molded article. The ETFE may be mixed with an additive.

The additive used as appropriate may be a known one. Specific examples thereof include ultraviolet absorbers, photostabilizers, antioxidants, infrared absorbers, flame retarders, flame-retardant filler, organic pigments, inorganic pigments, and dyes. In order to achieve excellent weather resistance, an inorganic additive is preferred.

The additive in the ETFE sheet is preferably present in an amount of 20% by mass or less, particularly preferably 10% by mass or less, relative to the whole mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, container inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

The TFE/VDF copolymer preferably has a monomer composition ratio (mol %) of TFE:VDF=(81 to 90):(10 to 19). The TFE/VDF copolymer may be one modified with a third monomer within a range of 0 to 10 mol % of all monomers.

The third monomer is preferably a monomer, other than TFE and VDF, represented by the formula:

$$CX^{11}X^{12}=CX^{13}(CX^{14}X^{15})_{n11}X^{16}$$

(wherein $X^{11}$ to $X^{16}$ are the same as or different from each other and are each H, F, or Cl, and n11 is an integer of 0 to 8) or a monomer represented by the formula: $CX^{21}X^{22}=CX^{23}-O(CX^{24}X^{25})_{n21}X^{26}$ (wherein $X^{21}$ to $X^{26}$ are the same as or different from each other and are each H, F, or Cl, and n21 is an integer of 0 to 8).

The third monomer may be a fluorine-free ethylenic monomer. In order to maintain the heat resistance and the chemical resistance, the fluorine-free ethylenic monomer is preferably selected from ethylenic monomers having a carbon number of 6 or smaller. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

The TFE/VDF copolymer may be brought into contact with ammonia water, ammonia gas, or a nitrogen compound that can generate ammonia, and thereby may be amidated.

The TFE/VDF copolymer may also preferably be used as a material for providing TFE/VDF copolymer fibers by a spinning-drawing method. The spinning-drawing method is a method in which the TFE/VDF copolymer is melt-spun and then cool-solidified to provide undrawn yarn, and the undrawn yarn is passed through a heating cylinder and thereby drawn, so that TFE/VDF copolymer fibers are obtained.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and low-boiling-point general-purpose organic solvents such as solvent mixtures of any of these. The solution may be used as a binder for batteries.

The aqueous dispersion of the TFE/VDF copolymer may preferably be used to coat a porous substrate formed from a polyolefin resin to provide a composite porous film. The aqueous dispersion may also preferably contain inorganic particles and/or organic particles dispersed therein and be used to coat a porous substrate to provide a composite porous film. The composite porous film thereby obtained may be used as a separator for lithium secondary batteries.

The powder of the melt-fabricable fluororesin is suitably used as a powdery coating material. When applied to a substrate, the powdery coating material containing the melt-fabricable fluororesin powder can provide a film having a smooth surface. The melt-fabricable fluororesin powder having an average particle size of not smaller than 1 μm but smaller than 100 μm is particularly suitable as a powdery coating material used for electrostatic coating.

The melt-fabricable fluororesin powder having an average particle size of 100 μm or greater and 1000 μm or smaller is particularly suitable as a powdery coating material used for rotational coating or rotational molding.

The melt-fabricable fluororesin powder can be produced by a method in which the melt-fabricable fluororesin obtained by the production method of the disclosure is dried and powdered.

When Af is a polymer segment prepared by random copolymerization of TFE and a monomer other than TFE, the fluoropolymer obtained may be a modified PTFE containing 99.0% by mass or more of a polymerized unit based on TFE and 1.0% by mass or less of a polymerized unit based on a modifying monomer other than TFE.

A total amount of the modifying monomer is preferably 0.00001 to 1.0% by mass relative to the fluoropolymer obtained through the step (ii). The lower limit of the total amount is more preferably 0.0001% by mass, still more preferably 0.001% by mass, further more preferably 0.005% by mass, particularly preferably 0.009% by mass. The upper limit thereof is preferably 0.90% by mass, more preferably 0.50% by mass, still more preferably 0.40% by mass, further more preferably 0.30% by mass, particularly preferably 0.10% by mass.

Examples of the modifying monomer include a monomer represented by the formula (1) and a monomer represented by the formula (2). In particular, the modifying monomer preferably includes at least one selected from the group consisting of HFP, VDF, perfluoro(methyl vinyl ether), perfluoro(propyl vinyl ether), perfluorosulfonyl vinyl ether, ethylene, a N-vinylamide compound, N-vinylpyrrolidone, and vinyl acetate.

The fluoropolymer of the disclosure preferably has a number average molecular weight of 1000 or greater from the viewpoint of reducing environmental impact. The fluoropolymer of the disclosure more preferably has a number average molecular weight of 3000 or greater, still more preferably 5000 or greater, particularly preferably 10000 or greater.

For example, in the case of PTFE, the number average molecular weight is calculated from the degree of polymerization n estimated from a ratio of the integral value of the peak of the $CF_2$ chain derived from the TFE monomer chain to the integral value of the peak derived from the chain transfer agent section at a polymer chain end, which are obtained by solid $^{19}$F-NMR analysis. The number average molecular weight of the polymer can be calculated as the product of the molecular weight m of the monomer and the degree of polymerization n (m×n).

In the case of a polymer soluble in a solvent, the number average molecular weight may be, for example, a number average molecular weight obtained by GPC measurement.

The disclosure also relates to a composition containing a fluoropolymer represented by the following formula:

Af-CRP wherein Af is a fluoropolymer segment containing more than 80 mol % of a polymerized unit based on TFE; and CRP is any of the following formulas (CRP1) to (CRP5), the formula (CRP1) being as follows:

$—SC(S)Z^{c11}$ wherein $Z^{c11}$ is an alkyl group or an aryl group;

the formula (CRP2) being as follows:

$—SC(S)SZ^{c12}$ wherein $Z^{c12}$ is an alkyl group or an aryl group;

the formula (CRP3) being as follows:

$—SC(S)SR^{c11}$ wherein $R^{c11}$ is a monovalent organic group;

the formula (CRP4) being as follows:

$—SC(S)NZ^{c13}{}_2$ wherein $Z^{c13}$s are (i) each independently an alkyl group, an aryl group, or a 4-pyridyl group or (ii) groups bonded to each other to form a heterocycle together with a N atom in the formula; and the formula (CRP5) being as follows:

$—SC(S)OZ^{c14}$ wherein $Z^{c14}$ is an alkyl group or an aryl group.

The fluoropolymer in the composition in the disclosure is the same as the above-described fluoropolymer of the disclosure.

The fluoropolymer can be produced by the above-described production method of the disclosure.

The composition in the disclosure preferably further contains the surfactant. Examples of the surfactant include surfactants for use in the above-described production method of the disclosure. The surfactant may be either a fluorine-containing surfactant or a hydrocarbon surfactant, and is preferably a hydrocarbon surfactant.

The composition in the disclosure may be in the form of an aqueous dispersion, powder, or pellets. The aqueous dispersion may be a dispersion immediately after the polymerization, or may be one obtained by processing the dispersion immediately after the polymerization. For example, the aqueous dispersion may contain a nonionic surfactant for improved mechanical stability and storage stability. The nonionic surfactant, when added, is preferably in an amount of 0.5 to 25% by mass relative to the fluoropolymer. The lower limit of the amount added is more preferably 1% by mass, still more preferably 3% by mass. The upper limit thereof is more preferably 20% by mass, still more preferably 15% by mass, particularly preferably 10% by mass.

The aqueous dispersion is a dispersion system in which an aqueous medium serves as a dispersion medium and the fluoropolymer serves as a dispersoid. The aqueous medium may be any liquid containing water, and may contain, in addition to water, an organic solvent such as an alcohol, an ether, a ketone, or paraffin wax.

The lower limit of the amount of the surfactant in the composition is preferably 10 ppb, more preferably 100 ppb, still more preferably 1 ppm, further more preferably 10 ppm, particularly preferably 50 ppm, relative to the fluoropolymer. The upper limit thereof is preferably 100000 ppm, more preferably 50000 ppm, still more preferably 10000 ppm, particularly preferably 5000 ppm, relative to the fluoropolymer.

The disclosure also relates to a molded article obtainable by molding the composition. The composition for use in molding is preferably powder or pellets.

The composition may be molded by any technique, and examples of the technique include compression molding, extrusion molding, transfer molding, injection molding, blow molding, rotational molding, rotational lining, and electrostatic coating.

The molded article may have any shape, such as a hose, a pipe, a tube, a sheet, a seal, a gasket, a packing, a film, a tank, a roller, a bottle, or a container.

The disclosure also provides a method for producing a fluoropolymer (hereinafter, also referred to as "a second production method of the disclosure"), the method including a polymerizing step of polymerizing TFE in an aqueous medium in the presence of an initiator, a chain transfer agent, and a surfactant to provide a fluoropolymer containing more than 80 mol %, preferably more than 90 mol %, of a polymerized unit based on TFE, and a block polymerizing step of block copolymerizing a monomer other than TFE in an aqueous medium containing the fluoropolymer obtained in the polymerizing step, the chain transfer agent including at least one selected from the group consisting of a dithioester compound, a dithiocarbamate compound, a trithiocarbonate compound, and a xanthate compound.

The initiator, the chain transfer agent, the surfactant, the aqueous medium, and the monomer other than TFE in the second production method of the disclosure are the same as those in the production method of the disclosure. The polymerizing step is the same as that in the production method of the disclosure. The polymerizing step can provide a polymer terminated with CRP like the above-described fluoropolymer of the disclosure, which can lead to the block copolymerization of the monomer other than TFE.

In the second production method of the disclosure, the polymerizing step may be performed once or more than once. A block copolymer containing multiple blocks (segments) can be produced by performing the polymerizing step more than once.

In the second production method of the disclosure, the polymerizing step and the block polymerizing step may be performed continuously, or alternatively, a polymer obtained in the polymerizing step is collected and added to the aqueous medium, and the monomer other than TFE is added thereto, followed by polymerization.

The temperature of the block polymerizing step may be any temperature that enables block copolymerization and may be, for example, 0° C. to 150° C., preferably 20° C. to 130° C., more preferably 40° C. to 110° C.

The pressure of the block polymerizing step may be any pressure that enables block copolymerization and may be, for example, 0 to 9.8 MPaG, preferably 0.2 to 6.0 MPaG, more preferably 0.5 to 3.0 MPaG.

In the block polymerizing step, the concentration of the monomer other than TFE relative to the aqueous medium is preferably 0.1 to 20 mol/L, more preferably 0.3 to 18 mol/L, still more preferably 0.5 to 15 mol/L.

The block polymerizing step may be performed once or more than once. A block copolymer containing multiple blocks (segments) can be produced by performing the block polymerizing step more than once.

An example of the fluoropolymer obtainable by the second production method of the disclosure is a second fluoropolymer of the disclosure described below.

The disclosure also provides a fluoropolymer (hereinafter, also referred to as "a second fluoropolymer of the disclosure") containing a segment A that contains more than 80 mol % of a polymerized unit based on TFE and a segment B that contains a polymerized unit based on a monomer other than TFE. The monomer other than TFE preferably includes, but not limited to, at least one selected from the group consisting of a monomer represented by the formula (1) and a monomer represented by the formula (2).

The segment A contains more than 80 mol % of a monomer unit derived from TFE. The segment A preferably contains more than 90 mol % of the monomer unit derived from TFE, more preferably consists of a polymerized unit based on TFE. The segment A is preferably a polymer segment containing a TFE homopolymer (PTFE) and can have all the properties of the above-described PTFE.

The segment B contains a polymerized unit based on a monomer other than TFE, preferably contains a polymerized unit based on at least one selected from the group consisting of a monomer represented by the formula (1) and a monomer represented by the formula (2). In particular, the segment B preferably includes at least one selected from the group consisting of HFP, CTFE, VDF, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth)acrylic acid esters, alkenes, amide bond-containing fluorine-free monomers, fluoroalkylethylenes, and fluorine-containing acrylate monomers; more preferably includes at least one selected from the group consisting of HFP, CTFE, VDF, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth) acrylic acid esters, acrylamide, alkenes, vinylamide, fluoroalkylethylenes, and fluorine-containing acrylate monomers; still more preferably includes at least one selected from the group consisting of HFP, CTFE, VDF, fluoroalkyl vinyl ethers, trifluoropropylene, pentafluoropropylene, trifluorobutene, tetrafluoroisobutene, hexafluoroisobutene, vinyl esters, (meth)acrylic acid esters, N-acrylamide compounds, alkenes, N-vinylamide compounds, N-vinyl lactam compounds, fluoroalkyl ethylenes, and fluorine-containing acrylate monomers; further more preferably includes at least one selected from the group consisting of HFP, VDF, perfluoro(methyl vinyl ether), perfluorosulfonyl vinyl ether, ethylene, N-vinylamide compounds, N-vinyl lactam compounds, and vinyl acetate; particularly preferably includes at least one selected from the group consisting of HFP, VDF, perfluoro(methyl vinyl ether), perfluorosulfonyl vinyl ether, ethylene, N-vinylamide compounds, N-vinylpyrrolidone, and vinyl acetate.

The segment B includes a polymer that contains a polymerized unit based on a monomer other than TFE, preferably includes a polymer that contains a polymerized unit based on at least one selected from the group consisting of a monomer represented by the formula (1) and a monomer represented by the formula (2). Particularly preferred examples thereof include polyvinyl esters such as polyvinyl acetate; polyvinylamides such as poly(N-vinylpyrrolidone); and polyfluoroolefins such as PVDF.

The second fluoropolymer of the disclosure contains the segment A and the segment B. The second fluoropolymer of the disclosure preferably has a structure represented by the following formula:

-A-L-B- wherein A is the segment A; B is the segment B; and L is a linking group.

L may be a single bond or a divalent organic group. Examples of the divalent organic group for L include an alkylene group and an oxyalkylene group.

Preferably, L is a single bond.

The second fluoropolymer of the disclosure preferably contains a -A-B- structure in which the segment A and the segment B are bonded to each other via a single bond.

The expression "the segment A and the segment B are bonded to each other via a single bond" means that a polymerized unit (e.g., a polymerized unit derived from TFE) constituting an end portion of the segment A directly binds to a polymerized unit (e.g., a polymerized unit based on at least one selected from the group consisting of a monomer represented by the formula (1) and a monomer represented by the formula (2)) constituting an end portion of the segment B. This structure can be achieved by the second production method of the disclosure.

The second fluoropolymer of the disclosure has at least one -A-L-B- structure and may have two or three or more of the structures. Specifically, a third fluoropolymer of the disclosure includes at least one segment A and at least one segment B which are bonded to each other via L, preferably via a single bond, and may have a structure in which two or three or more -A-L-B- units are repeated. Examples of the structure include -A-L-B-, -B-L-A-, -A-L-B-L-A-, -B-L-A-L-B-, -A-L-B-L-A-L-B-, and -B-L-A-L-B-L-A-.

In the second fluoropolymer of the disclosure, the segment A and the segment B are present in a mass ratio (A/B) of 99/1 to 1/99.

The second fluoropolymer of the disclosure can have both the properties of the segment A containing a monomer unit based on a monomer derived from TFE and the properties of the segment B containing a monomer unit based on at least one selected from the group consisting of a monomer represented by the formula (1) and a monomer represented by the formula (2). Such a fluoropolymer is expected to be used for adhesives or compatibilizing agents that are used to provide fluororesin composites, for example.

The second fluoropolymer of the disclosure can also be used for the applications described for the first and second fluoropolymers of the disclosure.

The disclosure relates to a method for producing a fluoropolymer (hereinafter, also referred to as "a first production method of the disclosure"; the production method of the disclosure as used herein means the "first production method of the disclosure"), the method including:

a polymerizing step of polymerizing tetrafluoroethylene in an aqueous medium in the presence of an initiator, a chain transfer agent, and a surfactant to provide a fluoropolymer containing more than 80 mol % of a polymerized unit based on tetrafluoroethylene, the chain transfer agent including at least one selected from the group consisting of a dithioester compound, a dithiocarbamate compound, a trithiocarbonate compound, and a xanthate compound.

Preferably, the fluoropolymer contains more than 90 mol % of the polymerized unit based on tetrafluoroethylene.

Preferably, the fluoropolymer consists only of the polymerized unit based on tetrafluoroethylene.

The fluoropolymer may further contain a polymerized unit based on a monomer other than tetrafluoroethylene.

Preferably, the monomer other than tetrafluoroethylene includes at least one selected from the group consisting of a monomer represented by the following formula (1) and a monomer represented by the following formula (2), the formula (1) is as follows:

$CF_2{=}CR^pR^q$ wherein $R^p$ is H or F; $R^q$ is —Cl, —$CF_3$, —$R^a$, —$COOR^b$, —$OCOR^c$, —$CONR^d{}_2$, —CN, —$COR^e$, —$Rf^a$, or —$ORf^b$; $R^a$, $R^b$, $R^c$, $R^d$, and $R^e$ are the same as or different from each other and are each H or a substituent; $Rf^a$ is a fluorine-containing alkyl group or fluorine-containing vinyl group optionally containing a substituent and optionally containing an oxygen atom between carbon atoms; $Rf^b$ is a fluorine-containing alkyl group; and $R^p$ and $R^q$ are optionally bonded to each other to form a ring; and the formula (2) is as follows:

$CH_2{=}CR^sR^t$ wherein $R^s$ is $R^g$, —$CF_3$, or F; $R^t$ is —Cl, —Rh, —$COOR^i$, —$OCOR^i$, —$CONR^k{}_2$, —CN, —$COR^m$, or $Rf^c$; $R^g$ and $R^h$ are the same as or different from each other and are each H or a hydrocarbon group or heterocyclic group optionally containing a substituent; $R^i$, $R^j$, $R^k$, and $R^m$ are the same as or different from each other and are each H or a substituent; $Rf^c$ is a fluorine-containing alkyl group, fluorine-containing vinyl group, or fluorine-containing alkoxy group optionally containing a substituent and optionally containing an oxygen atom between carbon atoms; and $R^s$ and $R^t$ are optionally bonded to each other to form a ring.

Preferably, the monomer other than tetrafluoroethylene includes at least one selected from the group consisting of hexafluoropropylene, chlorotrifluoroethylene, vinylidene fluoride, vinyl fluoride, trifluoroethylene, a fluoroalkyl vinyl ether, trifluoropropylene, pentafluoropropylene, trifluorobutene, tetrafluoroisobutene, hexafluoroisobutene, a vinyl ester, a (meth)acrylic acid ester, acrylamide, an alkene, vinylamide, a fluoroalkylethylene, and a fluorine-containing acrylate monomer.

Preferably, the chain transfer agent is a xanthate compound.

Preferably, in the polymerizing step, the chain transfer agent has a concentration of $0.1\times10^{-3}$ to 0.01 mol/L relative to the aqueous medium.

Preferably, the surfactant is free from a perfluoroalkyl group having a carbon number of 3 or greater.

The disclosure also relates to a fluoropolymer represented by the following formula:

Af-CRP wherein Af is a fluoropolymer segment containing more than 80 mol % of a polymerized unit based on TFE; and CRP is any of the following formulas (CRP1) to (CRP5), the formula (CRP1) being as follows:

—$SC(S)Z^{c11}$ wherein $Z^{c11}$ is an alkyl group or an aryl group;

the formula (CRP2) being as follows:

$SC(S)SZ^{c12}$ wherein $Z^{c12}$ is an alkyl group or an aryl group;

the formula (CRP3) being as follows:

$—SC(S)SR^{c11}$ wherein $R^{c11}$ is a monovalent organic group;

the formula (CRP4) being as follows:

$—SC(S)NZ^{c13}{}_2$ wherein $Z^{c13}$s are (i) each independently an alkyl group, an aryl group, or a 4-pyridyl group or (ii) groups bonded to each other to form a heterocycle together with a N atom in the formula; and the formula (CRP5) being as follows:

$—SC(S)OZ^{c14}$ wherein $Z^{c14}$ is an alkyl group or an aryl group.

Preferably, Af in the formula contains more than 90 mol % of the polymerized unit based on tetrafluoroethylene.

Preferably, the fluoropolymer of the disclosure is represented by the following formula:

Bf-CRP wherein Bf is a fluoropolymer segment consisting only of the polymerized unit based on tetrafluoroethylene; and CRP is defined as described above.

Preferably, the fluoropolymer of the disclosure has a molecular weight of 3000 or higher.

EXAMPLES

The disclosure is described in more detail below with reference to, but not limited to, examples.

In the examples, a surfactant used was sodium 10-oxoundecyl sulfate represented by the following formula.

[Chem. 55]

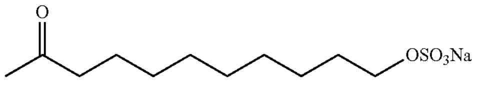

Example 1

An autoclave was charged with 550 g of water, 0.019 g of sodium 10-oxoundecyl sulfate, 30 g of paraffin, and 0.10 g of O-ethyl-S-(1-methoxycarbonylethyl)dithiocarbonate. The system was sufficiently purged with nitrogen gas, and the pressure in the system was reduced. The system was purged with TFE and heated to 70° C. Then, 0.11 g of ammonium persulfate (APS) was fed to initiate polymerization. The polymerization pressure was set at 0.83 MPa, and the polymerization was performed with stirring while TFE was continuously fed to compensate a reduction in the pressure during the polymerization. After completion of the polymerization, a fluoropolymer dispersion was dried to give 3.0 g of a dried fluoropolymer. Solid $^{19}F$-NMR analysis (high-speed MAS) was performed, and as a result thereof, a peak derived from $—CF_2—S—$ appeared at −85 ppm based on a peak of a $CF_2$ chain ($CF_2CF_2CF_2$=−120 ppm) derived from a TFE monomer chain. This confirmed introduction of a chain transfer agent section A ($—SC(S)OC_2H_5$) to a polymer chain end. A section B ($—CF_2H$) was also confirmed. The degree of polymerization, which was estimated from the ratio between the integral value of the peak derived from the $CF_2$ chain and the integral value of the peaks of sections A and B, was 249.

Example 2

An autoclave was charged with 550 g of water, 0.019 g of sodium 10-oxoundecyl sulfate, 30 g of paraffin, and 0.10 g of O-ethyl-S-(1-methoxycarbonylethyl)dithiocarbonate. The system was sufficiently purged with nitrogen gas, and the pressure in the system was reduced. The system was purged with the TFE/VDF monomer mixture (91/9 (mol %)) and heated to 70° C. Then, 0.11 g of ammonium persulfate (APS) was fed to initiate polymerization. The polymerization pressure was set at 0.90 MPa, and the polymerization was performed with stirring while a TFE/VDF monomer mixture (91/9 (mol %)) was continuously fed to compensate a reduction in the pressure during the polymerization. After completion of the polymerization, a fluoropolymer dispersion was dried to give 3.3 g of a dried fluoropolymer. The monomer composition ratio, which was estimated from solid $^{19}F$-NMR analysis and elemental analysis, was TFE/VDF: 92/8 (mol %).

Example 3

Polymerization was performed as in Example 1 except that 0.3 g of HFP was added. The resulting fluoropolymer dispersion was dried to give 3.1 g of a dried fluoropolymer. FT-IR analysis confirmed that the monomer composition ratio, which was estimated by multiplying the ratio of (infrared absorbance at 982 $cm^{-1}$)/(infrared absorbance at 935 $cm^{-1}$) by 0.3, was TFE/HFP:94/6 (mol %).

Example 4

Polymerization was performed as in Example 1 except that 0.2 g of perfluoro(methyl vinyl ether) (PMVE) was added. The resulting fluoropolymer dispersion was dried to give 3.0 g of a dried fluoropolymer. Solid $^{19}F$-NMR analysis confirmed that the monomer composition ratio, which was estimated from the integral value of the peak of the $CF_2$ chain ($CF_2CF_2CF_2$=−120 ppm) derived from the TFE monomer chain and the integral value of the peak (−52 ppm) derived from CF of PMVE, was TFE/PMVE:95/5 (mol %).

Example 5

Polymerization was performed as in Example 1 except that 0.3 g of perfluoro(propyl vinyl ether) (PPVE) was added. The resulting fluoropolymer dispersion was dried to give 3.1 g of a dried fluoropolymer. Solid $^{19}F$-NMR analysis confirmed that the monomer composition ratio, which was estimated from the integral value of the peak of the $CF_2$ chain ($CF_2CF_2CF_2$=−120 ppm) derived from the TFE monomer chain and the integral value of the peak (−52 ppm) derived from CF of PPVE, was TFE/PPVE:95/5 (mol %).

The invention claimed is:

1. A method for producing a fluoropolymer, the method comprising:

a polymerizing step of polymerizing tetrafluoroethylene in an aqueous medium in the presence of an initiator, a chain transfer agent, and a surfactant to provide a fluoropolymer containing more than 92 mol % of a polymerized unit based on tetrafluoroethylene, the chain transfer agent including at least one selected from the group consisting of a dithioester compound, a dithiocarbamate compound, a trithiocarbonate compound, and a xanthate compound, wherein the fluoropolymer further contains a polymerized unit based on a monomer other than tetrafluoroethylene.

2. The production method according to claim 1, wherein the fluoropolymer contains more than 95 mol % of the polymerized unit based on tetrafluoroethylene.

3. The production method according to claim 1, wherein the monomer other than tetrafluoroethylene includes at least one selected from the group consisting of a monomer represented by the following formula (1) and a monomer represented by the following formula (2), the formula (1) is as follows:

$CF_2{=}CR^pR^q$ wherein $R^p$ is H or F; $R^q$ is —Cl, —$CF_3$, —$R^a$, —$COOR^b$, —$OCOR^C$, —$CONR^d{}_2$, —CN, —$COR^e$, —$Rf^a$ or —$ORf^b$; $R^a$, $R^b$, $R^c$, $R^d$, and $R^e$ are the same as or different from each other and are each H or a substituent; $Rf^a$ is a fluorine-containing alkyl group or fluorine-containing vinyl group optionally containing a substituent and optionally containing an oxygen atom between carbon atoms; $Rf^b$ is a fluorine-containing alkyl group; and $R^p$ and $R^q$ are optionally bonded to each other to form a ring; and the formula (2) is as follows:

$CH_2{=}CR^sR^t$ wherein $R^s$ is $R^g$, $CF_3$, or F; $R^t$ is —Cl, —$R^h$, —$COOR^i$, —$OCOR^i$, —$CONR^k{}_2$, —CN, —$COR^m$ or $Rf^c$; $R^g$ and $R^h$ are the same as or different from each other and are each H or a hydrocarbon group or heterocyclic group optionally containing a substituent; $R^i$, $R^j$, $R^k$, and $R^m$ are the same as or different from each other and are each H or a substituent; $Rf^c$ is a fluorine-containing alkyl group, fluorine-containing vinyl group, or fluorine-containing alkoxy group optionally containing a substituent and optionally containing an oxygen atom between carbon atoms; and $R^s$ and $R^t$ are optionally bonded to each other to form a ring.

4. The production method according to claim 1, wherein the monomer other than tetrafluoroethylene includes at least one selected from the group consisting of hexafluoropropylene, chlorotrifluoroethylene, vinylidene fluoride, vinyl fluoride, trifluoroethylene, a fluoroalkyl vinyl ether, trifluoropropylene, pentafluoropropylene, trifluorobutene, tetrafluoroisobutene, hexafluoroisobutene, a vinyl ester, a (meth)acrylic acid ester, acrylamide, an alkene, vinylamide, a fluoroalkylethylene, and a fluorine-containing acrylate monomer.

5. The production method according to claim 1, wherein the chain transfer agent is a xanthate compound.

6. The production method according to claim 1, wherein in the polymerizing step, the chain transfer agent has a concentration of $0.1\times10^{-3}$ to 0.01 mol/L relative to the aqueous medium.

7. The production method according to claim 1, wherein the surfactant is free from a perfluoroalkyl group having a carbon number of 3 or greater.

8. The production method according to claim 1, wherein the fluoropolymer is a fluorinated copolymer.

* * * * *